(12) United States Patent
Xu et al.

(10) Patent No.: US 12,160,849 B2
(45) Date of Patent: Dec. 3, 2024

(54) BEAM DETERMINATION PROCEDURES IN WIRELESS NETWORKS

(71) Applicant: Comcast Cable Communications, LLC, Philadelphia, PA (US)

(72) Inventors: Kai Xu, Herndon, VA (US); Hua Zhou, Herndon, VA (US); Esmael Hejazi Dinan, Herndon, VA (US); Yunjung Yi, Vienna, VA (US); Ali Cagatay Cirik, Herndon, VA (US); Hyoungsuk Jeon, Centreville, VA (US); Jonghyun Park, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 356 days.

(21) Appl. No.: 17/583,835

(22) Filed: Jan. 25, 2022

(65) Prior Publication Data
US 2022/0240224 A1 Jul. 28, 2022

Related U.S. Application Data

(60) Provisional application No. 63/141,090, filed on Jan. 25, 2021.

(51) Int. Cl.
 *H04W 72/02* (2009.01)
 *H04W 72/044* (2023.01)
 *H04W 72/21* (2023.01)
 *H04W 72/542* (2023.01)
 *H04W 74/0833* (2024.01)

(52) U.S. Cl.
 CPC ......... *H04W 72/02* (2013.01); *H04W 72/046* (2013.01); *H04W 72/21* (2023.01); *H04W 72/542* (2023.01); *H04W 74/0833* (2013.01)

(58) Field of Classification Search
 CPC ... H04W 72/02; H04W 72/046; H04W 72/21; H04W 72/542; H04W 74/0833
 See application file for complete search history.

(56) References Cited

U.S. PATENT DOCUMENTS

| | | |
|---|---|---|
| 2019/0306867 A1 | 10/2019 | Cirik et al. |
| 2019/0306909 A1 | 10/2019 | Zhou et al. |

(Continued)

OTHER PUBLICATIONS

R1-2009288 3GPP TSG-RAN WG1 Meeting #103-e, Online, Oct. 26-Nov. 13, 2020, Source: Ericsson, Title: Enhancements on Multi-beam Operation.

(Continued)

*Primary Examiner* — Michael A Keller
(74) *Attorney, Agent, or Firm* — Banner & Witcoff, Ltd.

(57) ABSTRACT

Beam determination may be used in wireless communications, for example, in a beam failure recovery procedure. One or more parameters may be communicated and/or used to indicate an association between resources and a corresponding control resource set (CORESET) pool index of multiple CORESET pool indices. For each of the multiple CORESET pool indices, a reference signal associated with the CORESET pool index may be determined. Wireless communications may be performed by selecting a reference signal for each of the multiple CORESET pool indices, and resources associated with a corresponding CORESET pool index may be communicated based on the selected reference.

20 Claims, 38 Drawing Sheets

(56) References Cited

U.S. PATENT DOCUMENTS

| | | | |
|---|---|---|---|
| 2019/0349061 A1 | 11/2019 | Cirik et al. | |
| 2019/0379506 A1 | 12/2019 | Cheng | |
| 2023/0041109 A1* | 2/2023 | Ling | H04L 5/0023 |
| 2023/0328830 A1* | 10/2023 | Yi | H04W 76/19 370/329 |
| 2023/0363041 A1* | 11/2023 | Jeon | H04W 76/27 |
| 2024/0023026 A1* | 1/2024 | Deghel | H04W 52/146 |

OTHER PUBLICATIONS

R1-2009250 3GPP TSG RAN WG1 Meeting #103-e, Oct. 26-Nov. 13, 2020, Source: Qualcomm Incorporated, Title: Enhancements on Multi-beam Operation.

R1-2009174 3GPP TSG RAN WG1 Meeting #103-e, e-Meeting, Oct. 26-Nov. 13, 2020, Source: NTT Docomo, Inc, Title: Discussion on multi-beam operation.

R1-2009158 3GPP TSG-RAN WG1 Meeting #103-e, e-Meeting, Oct. 26-Nov. 13, 2020, Source: Convida Wireless, Title: Multi-beam Enhancements.

R1-209155 3GPP TSG RAN WG1 Meeting #103-e, e-Meeting, Oct. 26-Nov. 13, 2020, Source: ASUSTek, Title: Discussion on multi-beam operation.

R1-2009141 3GPP TSG RAN WG1 Meeting #103-e, e-Meeting, Oct. 26-Nov. 13, 2020, Source: Spreadtrum Communications, Title: Enhancements on Multi-beam Operation.

R1-2009129 3GPP TSG RAN WG1 Meeting #103-e, e-Meeting, Oct. 26-Nov. 13, 2020, Source: Sharp, Title: Enhancements on Multi-beam Operation.

R1-2009060 3GPP TSG RAN WG1 Meeting #103-e, e-Meeting, Oct. 26-Nov. 13, 2020, Source: Asia Pacific Telecom, Title: Discussion on Enhancements for Multi-beam Operation.

R1-2009027 3GPP TSG RAN WG1 Meeting #103-e, e-Meeting, Oct. 26-Nov. 13, 2020, Source: Xiaomi, Title: Enhancements on multi-beam operation.

R1-2008977 3GPP TSG RAN WG1 Meeting #103-e, e-Meeting, Oct. 26-Nov. 13, 2020, Source: Intel Corporation, Title: Enhancements on Multi-Beam Operation.

R1-2008956 3GPP TSG RAN WG1 Meeting #103-e, e-Meeting, Oct. 26-Nov. 13, 2020, Source: MediaTek Inc., Title: Enhancement on multi-beam operation.

R1-2008943 3GPP TSG RAN WG1 Meeting #103-e, e-Meeting, Oct. 26-Nov. 13, 2020, Source: NEC, Title: Discussion on multi-beam operation.

R1-2008910 3GPP TSG RAN WG1 Meeting #103-e, e-Meeting, Oct. 26-Nov. 13, 2020, Source: Lenovo, Motorola Mobility, Title: Enhancements on Multi-beam Operation.

R1-2008903 3GPP TSG RAN WG1 Meeting #103-e, e-Meeting, Oct. 26-Nov. 13, 2020, Source: Nokia, Nokia Shanghai Bell, Title: Enhancements on Multi-beam Operation.

R1-2008899 3GPP TSG RAN WG1 Meeting #103-e, E-meeting, Nov. 2-13, 2020, Source: Fraunhofer IIS, Fraunhofer HHI, Title: Enhancements on multi-beam operation.

R1-2008573 3GPP TSG RAN WG1 Meeting #103-e, e-Meeting, Oct. 26-Nov. 13, 2020, Source: LG Electronics, Title: Enhancements on Multi-beam Operation.

R1-2008438 3GPP TSG RAN WG1 Meeting #103-e, e-Meeting, Oct. 26-Nov. 13, 2020, Source: Apple Inc., Title: On Beam Management Enhancement.

R1-208346 3GPP TSG RAN WG1 Meeting #103e, E-meeting, Oct. 26-Nov. 13, 2020, Source: Sony, Title: Considerations on the enhancement of multi-beam operation.

R1-2008308 3GPP TSG RAN WG1 Meeting #103e, Oct. 26-Nov. 13, 2020, Source: AT&T, Title: Enhancements on Beam Management for Multi-TRP.

R1-2008217 3GPP TSG RAN WG1 Meeting #103-e, e-Meeting, Oct. 26-Nov. 13, 2020, Source: OPPO, Title: Enhancements on Multi-Beam Operation.

R1-2008148 3GPP TSG RAN WG1 Meeting #103-e, e-Meeting, Oct. 26-Nov. 13, 2020, Source: Samsung, Title: Multi-beam enhancements.

R1-2008147 3GPP TSG RAN WG1 Meeting #103-e, e-Meeting, Oct. 26-Nov. 13, 2020, Source: Moderator (Samsung), Title: Moderator summary for multi-beam enhancement.

R1-2008000 3GPP TSG RAN WG1 Meeting #103-e, e-Meeting, Oct. 26-Nov. 13, 2020, Source: CMCC, Title: Enhancements on multi-beam operation.

R1-2007824 3GPP TSG RAN WG1 Meeting #103-e, e-Meeting, Oct. 26-Nov. 13, 2020, Source: CATT, Title: Discussion on enhancement on multi-beam operation.

R1-2007770 3GPP TSG RAN WG1 Meeting #103-e, e-Meeting, Oct. 26-Nov. 13, 2020, Source: ZTE, Title: Further details on Multi-beam and Multi-TRP operation.

R1-2007763 3GPP TSG RAN WG1 Meeting #103-e, e-Meeting, Oct. 26-Nov. 13, 2020, Source: ZTE, Title: Enhancements on Multi-beam Operation.

R1-2007644 3GPP TSG RAN WG1 Meeting #103-e, e-Meeting, Oct. 26-Nov. 13, 2020, Source: vivo, Title: Further discussion on multi beam enhancement.

R1-2007626 3GPP TSG RAN WG1 Meeting #103-e, e-Meeting, Aug. 17-28, 2020, Source: InterDigital, Inc., Title: Discussions on Multi-beam Enhancement.

R1-2007586 3GPP TSG RAN WG1 Meeting #103-e, e-Meeting, Oct. 26-Nov. 13, 2020, Source: Huawei, HiSilicon, Title: Enhancements on multi-beam operation in Rel-17.

R1-2007546 3GPP TSG RAN WG1 Meeting #103-e, e-Meeting, Oct. 26-Nov. 13, 2020, Source: Futurewei, Title: Enhancement on multi-beam operation.

3GPP TS 38.214 V16.3.0 (Sep. 2020) 3rd Generation Partnership Project; Technical Specification Group Radio Access Network; NR; Physical layer procedures for data (Release 16).

3GPP TS 38.213 V16.3.0 (Sep. 2020) 3rd Generation Partnership Project; Technical Specification Group Radio Access Network; NR; Physical layer procedures for control (Release 16).

3GPP TSG RAN WG1 Meeting #104-e R1-2100288, Jan. 25-Feb. 5, 2021, e-Meeting, Source: ZTE Title: Enhancements on beam management for multi-TRP.

3GPP TSG RAN WG1 Meeting #104-e R1-2100780, Jan. 25-Feb. 5, 2021, e-Meeting, Source: AT&T Title: Views on Beam Management Enhancements for Multi-TRP.

Jul. 4, 2022—EP Search Report—EP App. No. 22153232.8.

* cited by examiner

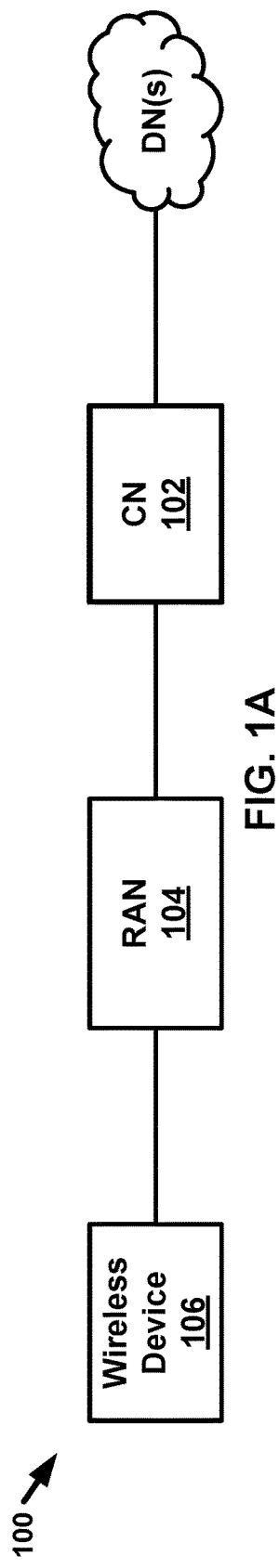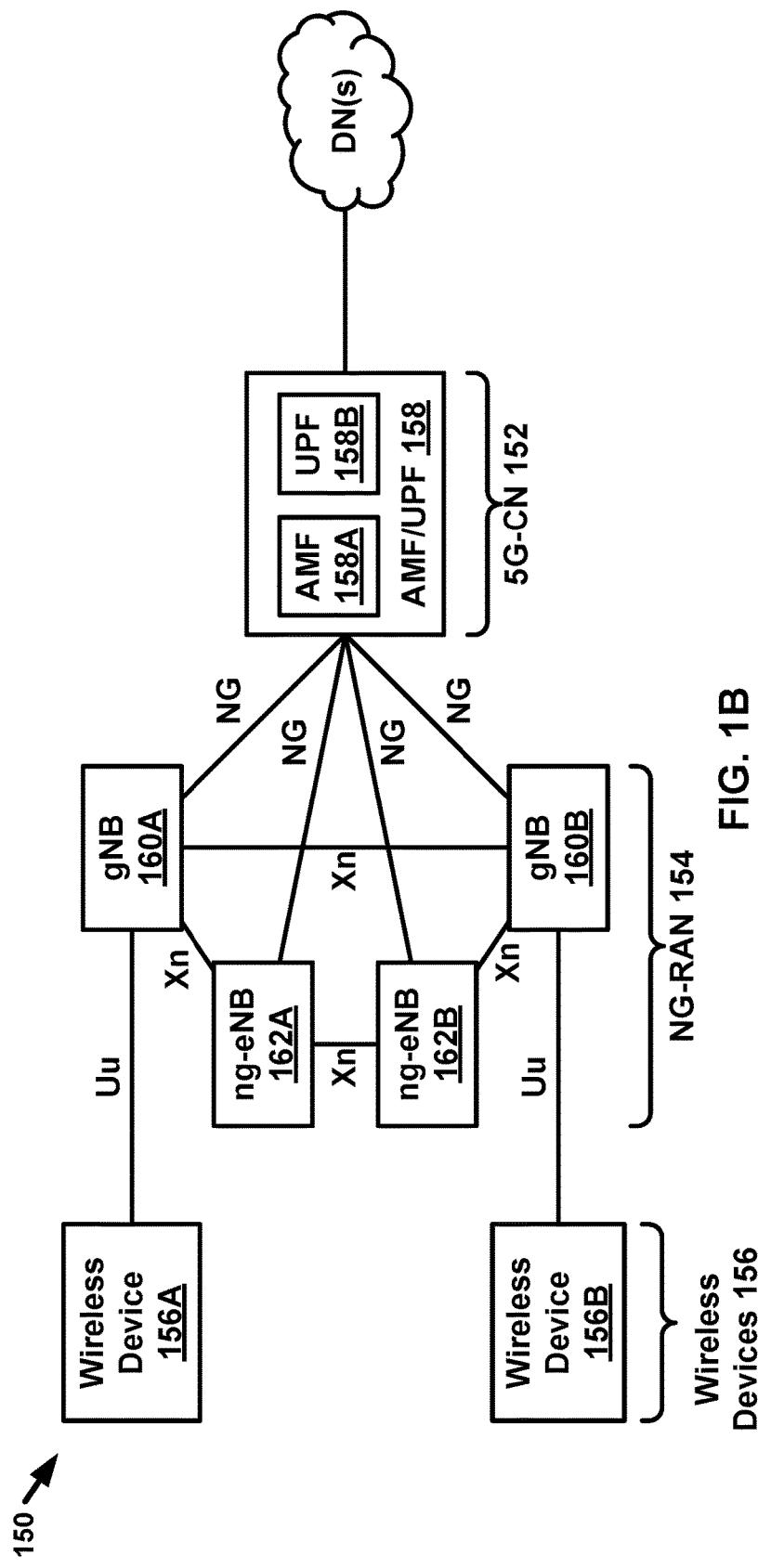

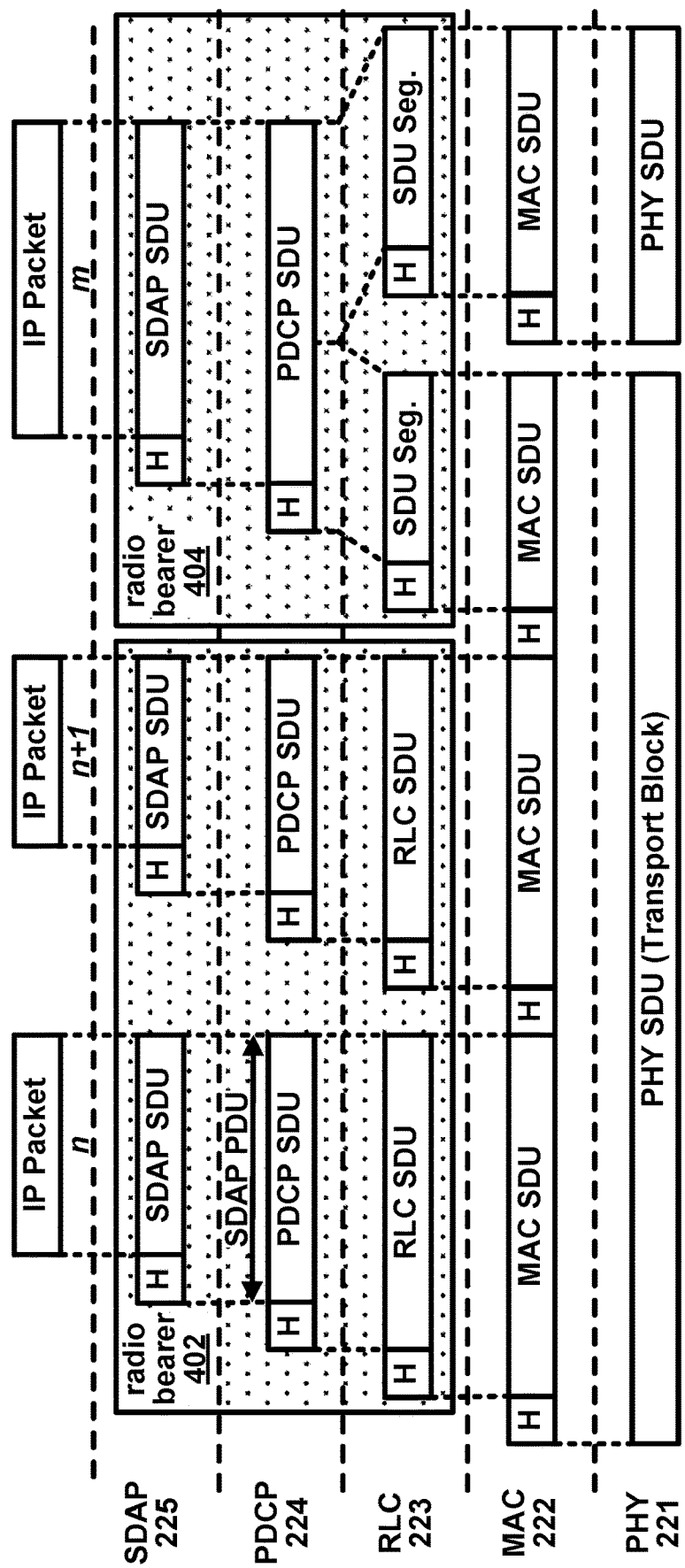
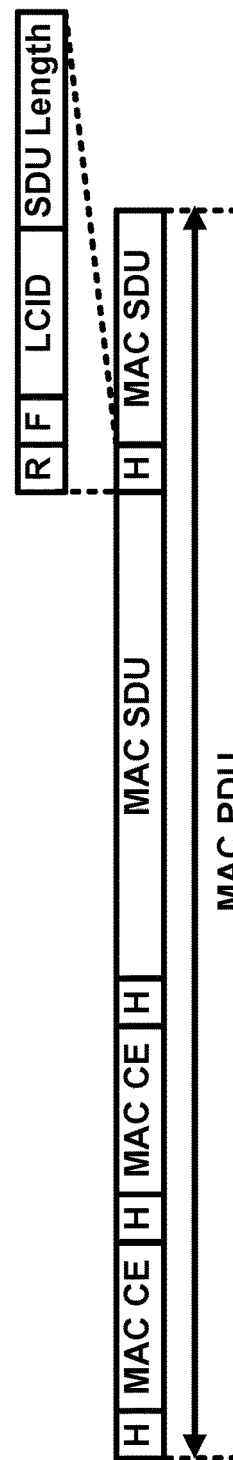
FIG. 4A
FIG. 4B

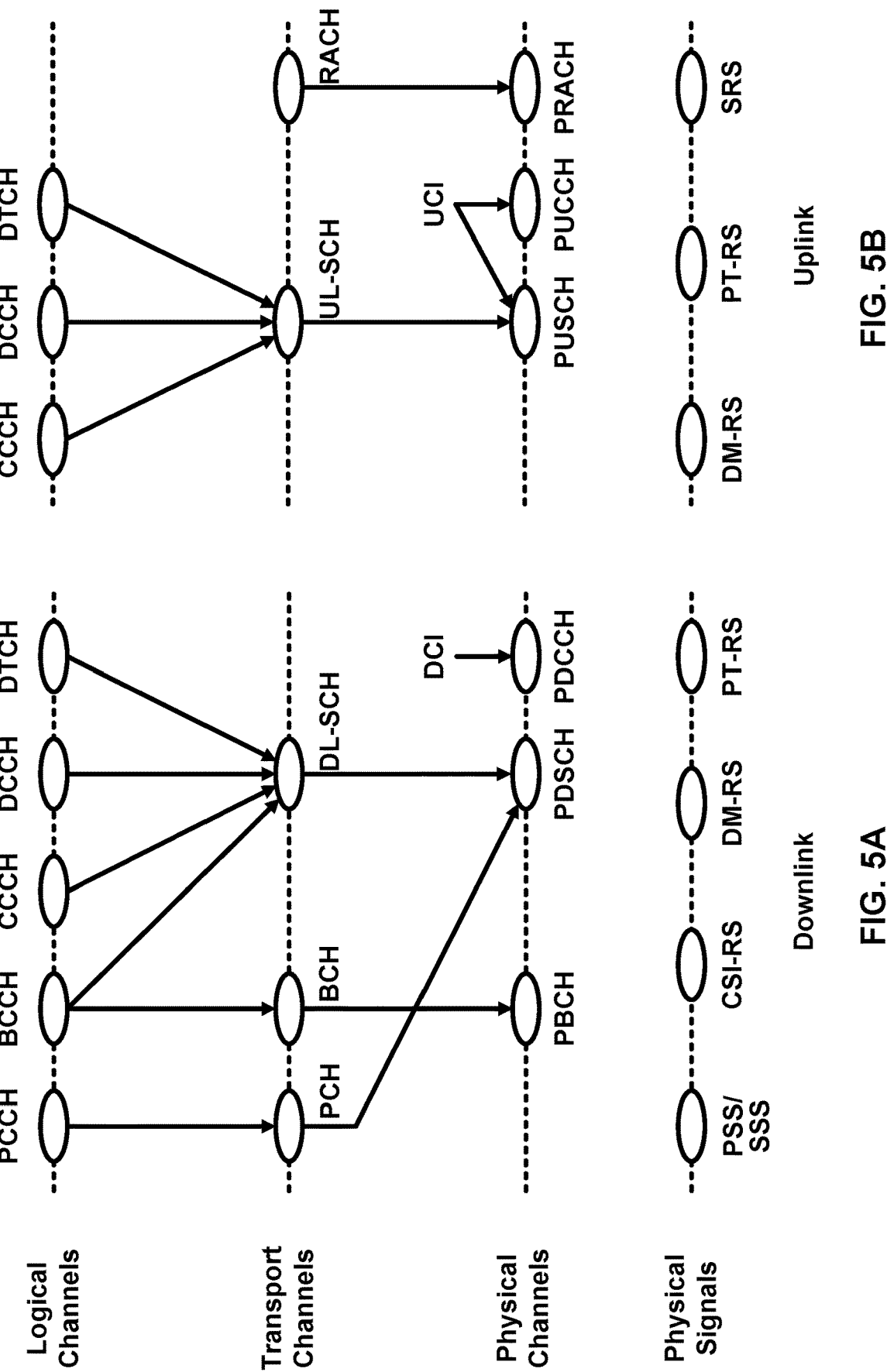

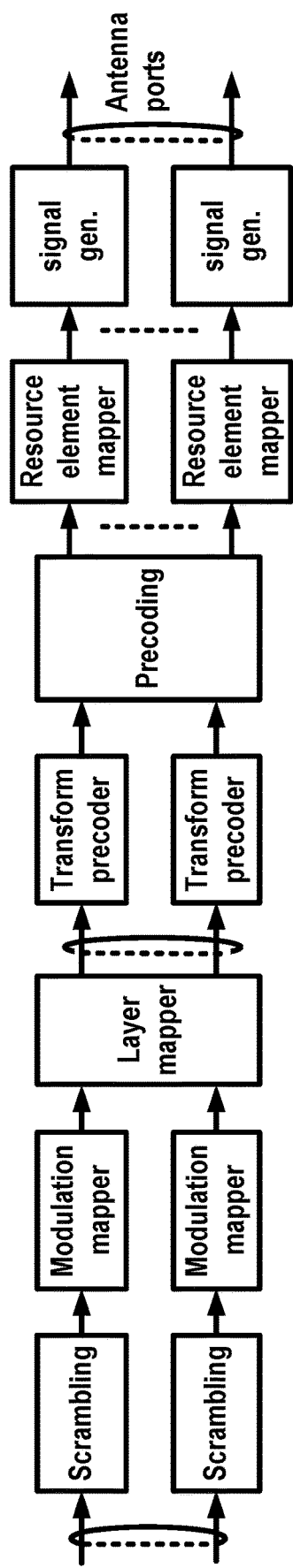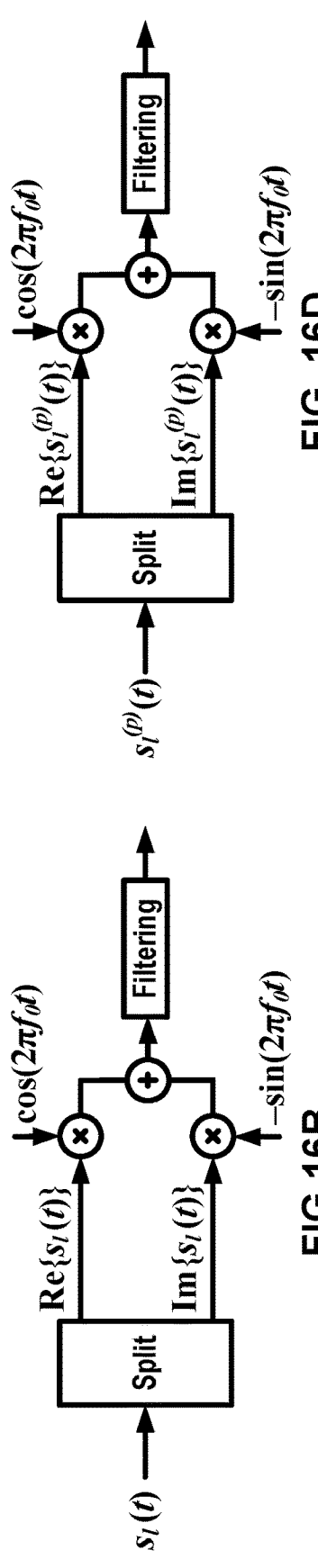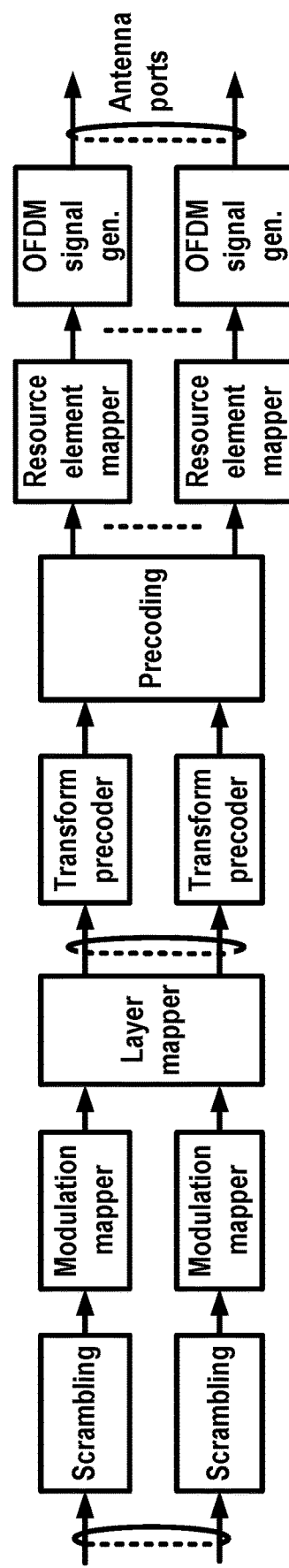

```
┌─────────────────────────────────────────────────────────┐
│ Receive configuration parameter(s) indicating: TCI state(s) for │
│ PDCCHs; 1st PDCCH(s) associated with 1st CORESET pool index; │
│   and 2nd PDCCH(s) associated with 2nd CORESET pool index │
│                          2360                           │
└─────────────────────────────────────────────────────────┘
                             │
                             ▼
┌─────────────────────────────────────────────────────────┐
│ Determine a 1st RS of 1st RS(s) and a 2nd RS of 2nd RS(s) based │
│      on measurements of the 1st RS(s) and the 2nd RS(s)  │
│                          2362                           │
└─────────────────────────────────────────────────────────┘
                             │
                             ▼
┌─────────────────────────────────────────────────────────┐
│   Receive 1st PDCCH(s) associated with 1st CORESET pool index │
│                       based on 1st RS                    │
│                          2364                           │
└─────────────────────────────────────────────────────────┘
                             │
                             ▼
┌─────────────────────────────────────────────────────────┐
│   Receive 2nd PDCCH(s) associated with 2nd CORESET pool index │
│                       based on 2nd RS                    │
│                          2366                           │
└─────────────────────────────────────────────────────────┘
                             │
                             ▼
┌─────────────────────────────────────────────────────────┐
│   Receive MAC CE activating one or more TCI states for 1st │
│                  PDCCH(s) and/or 2nd PDCCH(s)           │
│                          2368                           │
└─────────────────────────────────────────────────────────┘
```

FIG. 23B

```
┌─────────────────────────────────────────────────────────┐
│ Transmit configuration parameter(s) indicating: TCI     │
│ state(s) for PDCCHs; 1st PDCCH(s) associated with 1st   │
│ CORESET pool index; and 2nd PDCCH(s) associated with    │
│ 2nd CORESET pool index                                  │
│                       2380                              │
└─────────────────────────────────────────────────────────┘
                            │
                            ▼
┌─────────────────────────────────────────────────────────┐
│           Transmit 1st RS(s) and 2nd RS(s)              │
│                       2382                              │
└─────────────────────────────────────────────────────────┘
                            │
                            ▼
┌─────────────────────────────────────────────────────────┐
│ Transmit 1st PDCCH(s) associated with 1st CORESET pool  │
│                       index                             │
│                       2384                              │
└─────────────────────────────────────────────────────────┘
                            │
                            ▼
┌─────────────────────────────────────────────────────────┐
│ Transmit 2nd PDCCH(s) associated with 2nd CORESET pool  │
│                       index                             │
│                       2386                              │
└─────────────────────────────────────────────────────────┘
                            │
                            ▼
┌─────────────────────────────────────────────────────────┐
│ Transmit MAC CE activating one or more TCI states for   │
│           1st PDCCH(s) and/or 2nd PDCCH(s)              │
│                       2388                              │
└─────────────────────────────────────────────────────────┘
```

FIG. 23C

```
┌─────────────────────────────────────────────────────────┐
│ Receive configuration parameter(s) indicating: TCI      │
│ state(s) for PDSCHs; 1st PDSCH(s) associated with 1st   │
│ CORESET pool index; and 2nd PDSCH(s) associated with    │
│ 2nd CORESET pool index                                  │
│                        2460                             │
└─────────────────────────────────────────────────────────┘
                            │
                            ▼
┌─────────────────────────────────────────────────────────┐
│ Determine a 1st RS of 1st RS(s) and a 2nd RS of 2nd     │
│ RS(s) based on measurements of the 1st RS(s) and the    │
│ 2nd RS(s)                                               │
│                        2462                             │
└─────────────────────────────────────────────────────────┘
                            │
                            ▼
┌─────────────────────────────────────────────────────────┐
│ Receive PDCCH (DCI) scheduling one or more of 1st       │
│ PDSCH(s) and one or more of 2nd PDSCH(s)                │
│                        2464                             │
└─────────────────────────────────────────────────────────┘
                            │
                            ▼
┌─────────────────────────────────────────────────────────┐
│ Receive 1st PDSCH(s) associated with 1st CORESET pool   │
│ index based on 1st RS                                   │
│                        2466                             │
└─────────────────────────────────────────────────────────┘
                            │
                            ▼
┌─────────────────────────────────────────────────────────┐
│ Receive 2nd PDSCH(s) associated with 2nd CORESET pool   │
│ index based on 2nd RS                                   │
│                        2468                             │
└─────────────────────────────────────────────────────────┘
                            │
                            ▼
┌─────────────────────────────────────────────────────────┐
│ Receive MAC CE activating one or more TCI states for    │
│ 1st PDSCH(s) and/or 2nd PDSCH(s)                        │
│                        2470                             │
└─────────────────────────────────────────────────────────┘
```

FIG. 24B

```
┌─────────────────────────────────────────────────────────┐
│ Transmit configuration parameter(s) indicating: TCI     │
│ state(s) for PDSCHs; 1st PDSCH(s) associated with 1st   │
│ CORESET pool index; and 2nd PDSCH(s) associated with    │
│ 2nd CORESET pool index                                  │
│                          2480                           │
└─────────────────────────────────────────────────────────┘
                            │
                            ▼
┌─────────────────────────────────────────────────────────┐
│           Transmit 1st RS(s) and 2nd RS(s)              │
│                          2482                           │
└─────────────────────────────────────────────────────────┘
                            │
                            ▼
┌─────────────────────────────────────────────────────────┐
│                   Transmit PDCCH (DCI)                  │
│                          2484                           │
└─────────────────────────────────────────────────────────┘
                            │
                            ▼
┌─────────────────────────────────────────────────────────┐
│  Transmit 1st PDSCH(s) associated with 1st CORESET      │
│                    pool index                           │
│                          2486                           │
└─────────────────────────────────────────────────────────┘
                            │
                            ▼
┌─────────────────────────────────────────────────────────┐
│  Transmit 2nd PDSCH(s) associated with 2nd CORESET      │
│                    pool index                           │
│                          2488                           │
└─────────────────────────────────────────────────────────┘
                            │
                            ▼
┌─────────────────────────────────────────────────────────┐
│  Transmit MAC CE activating one or more TCI states      │
│      for 1st PDSCH(s) and/or 2nd PDSCH(s)               │
│                          2490                           │
└─────────────────────────────────────────────────────────┘
```

FIG. 24C

```
┌─────────────────────────────────────────────────────┐
│ Transmit configuration parameter(s) indicating: TCI │
│ state(s) for CSI-RSs; 1st CSI-RS(s) associated with │
│ 1st CORESET pool index; and 2nd CSI-RS(s)           │
│ associated with 2nd CORESET pool index              │
│                      2580                           │
└─────────────────────────────────────────────────────┘
                          │
                          ▼
┌─────────────────────────────────────────────────────┐
│           Transmit 1st RS(s) and 2nd RS(s)          │
│                      2582                           │
└─────────────────────────────────────────────────────┘
                          │
                          ▼
┌─────────────────────────────────────────────────────┐
│                 Transmit PDCCH (DCI)                │
│                      2584                           │
└─────────────────────────────────────────────────────┘
                          │
                          ▼
┌─────────────────────────────────────────────────────┐
│ Transmit 1st CSI-RS(s) associated with 1st CORESET  │
│                     pool index                      │
│                      2586                           │
└─────────────────────────────────────────────────────┘
                          │
                          ▼
┌─────────────────────────────────────────────────────┐
│ Transmit 2nd CSI-RS(s) associated with 2nd CORESET  │
│                     pool index                      │
│                      2588                           │
└─────────────────────────────────────────────────────┘
                          │
                          ▼
┌─────────────────────────────────────────────────────┐
│ Transmit MAC CE activating one or more TCI states   │
│        for 1st CSI-RS(s) and/or 2nd CSI-RS(s)       │
│                      2590                           │
└─────────────────────────────────────────────────────┘
```

FIG. 25C

BEAM DETERMINATION PROCEDURES IN WIRELESS NETWORKS

CROSS-REFERENCE TO RELATED APPLICATIONS

This application claims the benefit of U.S. Provisional Application No. 63/141,090, filed on Jan. 25, 2021. The above-referenced applications is hereby incorporated by reference in its entirety.

BACKGROUND

In wireless communications, beam failure recovery may be performed for a failed beam. A base station and a wireless device may communicate one or more parameters for beam failure recovery.

SUMMARY

The following summary presents a simplified summary of certain features. The summary is not an extensive overview and is not intended to identify key or critical elements.

Wireless communications may use one or more beams. A base station and/or a wireless device may determine the one or more beams for the wireless communications. The base station and/or the wireless device may comprise one or more nodes (e.g., transmission and/or reception points (TRPs), antenna panels, etc.) for communications using the one or more beams. A cell may comprise multiple TRPs for wireless communications. Different resources (e.g., CORESETS, data channels, and/or reference signals) may be configured for each of the multiple nodes. Beam determination procedures may be performed for each of the multiple nodes. If only one beam (or reference signal) is indicated to a base station (e.g., the beam associated with a first node of the multiple nodes) the wireless device may not be able to perform wireless communications with a second node of the multiple nodes. This may result in unreliable beam determinations for beam failure recovery, for example, performing beam determination for beam failure of multiple nodes. A wireless device and/or a base station may reduce a likelihood of such unreliability by updating information and/or resources associated with beams for each node. For each of the multiple nodes, a preferred beam, of multiple beams, associated with the node may be determined, and an indication of the determined beam for each node may be communicated, for example, via one or more messages associated with a random access procedure and/or via uplink control channels. Configuration parameters indicating an association between resources (e.g., PDCCHs, PDSCHs, CSI-RSs, PUCCHs) and a corresponding node may be communicated by a base station and/or wireless device. Resources associated with the corresponding node may be communicated based on the determined beams, which may provide advantages such as improved reliability, and performance of beam determinations and/or more efficient use of communication resources, and which may further improve transmission diversity performance based on multiple nodes and provide enhanced performance potential of the multiple nodes.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 4A shows an example downlink data flow for a user plane configuration.

FIG. 4B shows an example format of a Medium Access Control (MAC) subheader in a MAC Protocol Data Unit (PDU).

FIG. 5A shows an example mapping for downlink channels.

FIG. 5B shows an example mapping for uplink channels.

FIG. 16A, FIG. 16B, FIG. 16C, and FIG. 16D show examples of uplink and downlink signal transmission.

FIG. 23B and FIG. 23C show example methods of beam determination procedures with multiple nodes.

FIG. 24B and FIG. 24C show example methods of beam determination procedures with multiple nodes.

FIG. 25B and FIG. 25C show example methods of beam determination procedures with multiple nodes.

DETAILED DESCRIPTION

Figure 2A:
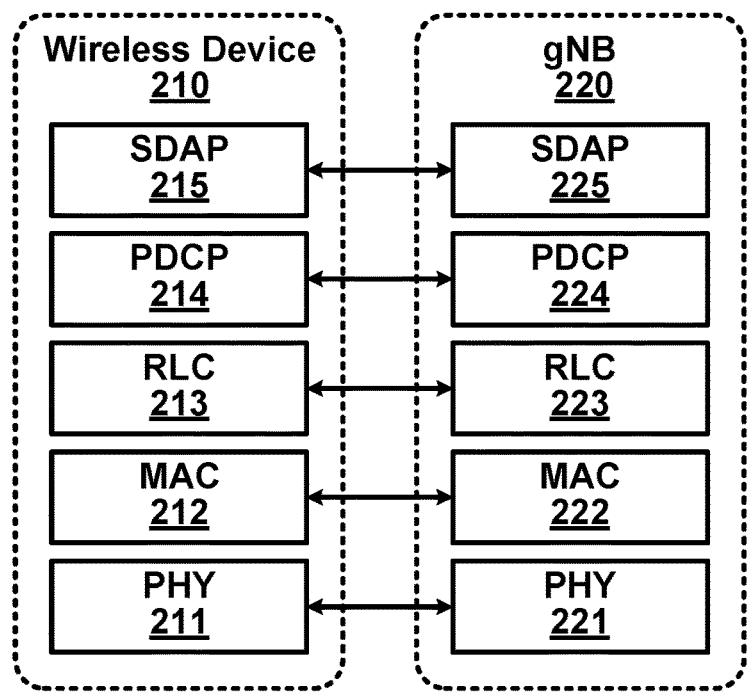
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communication exposure detection and/or reporting.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n)

may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
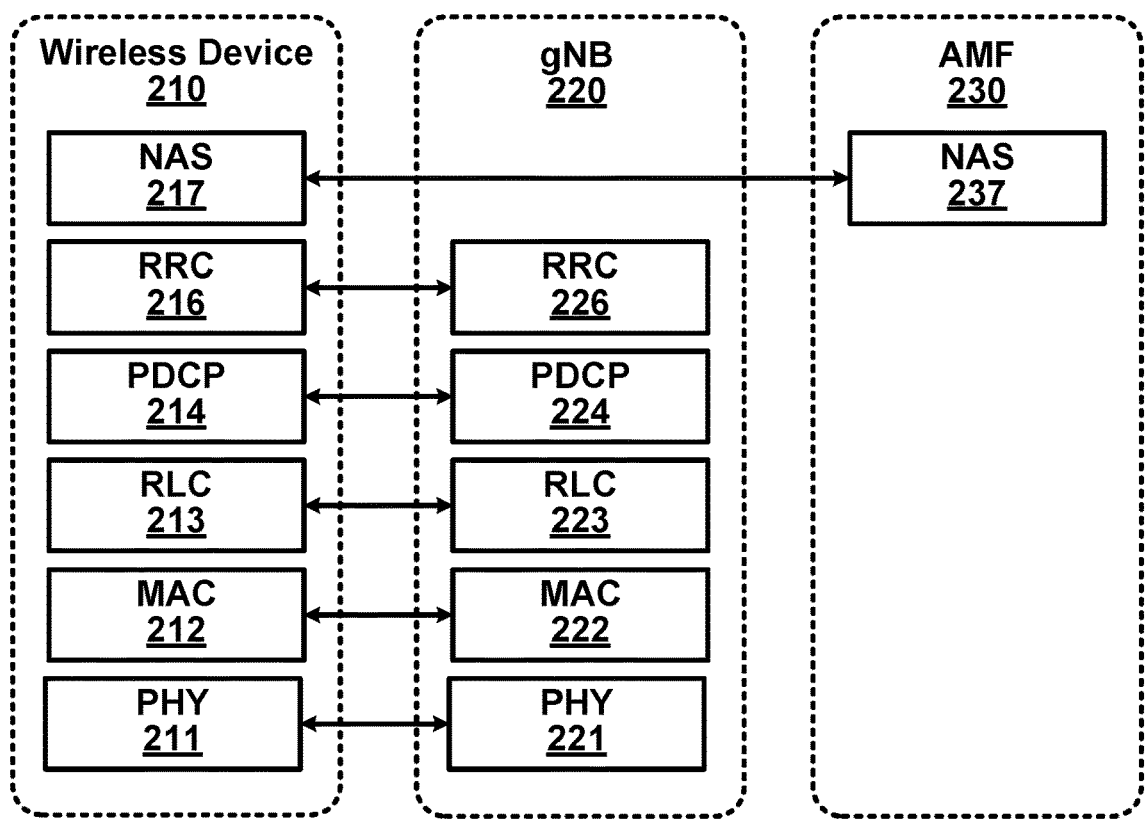
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
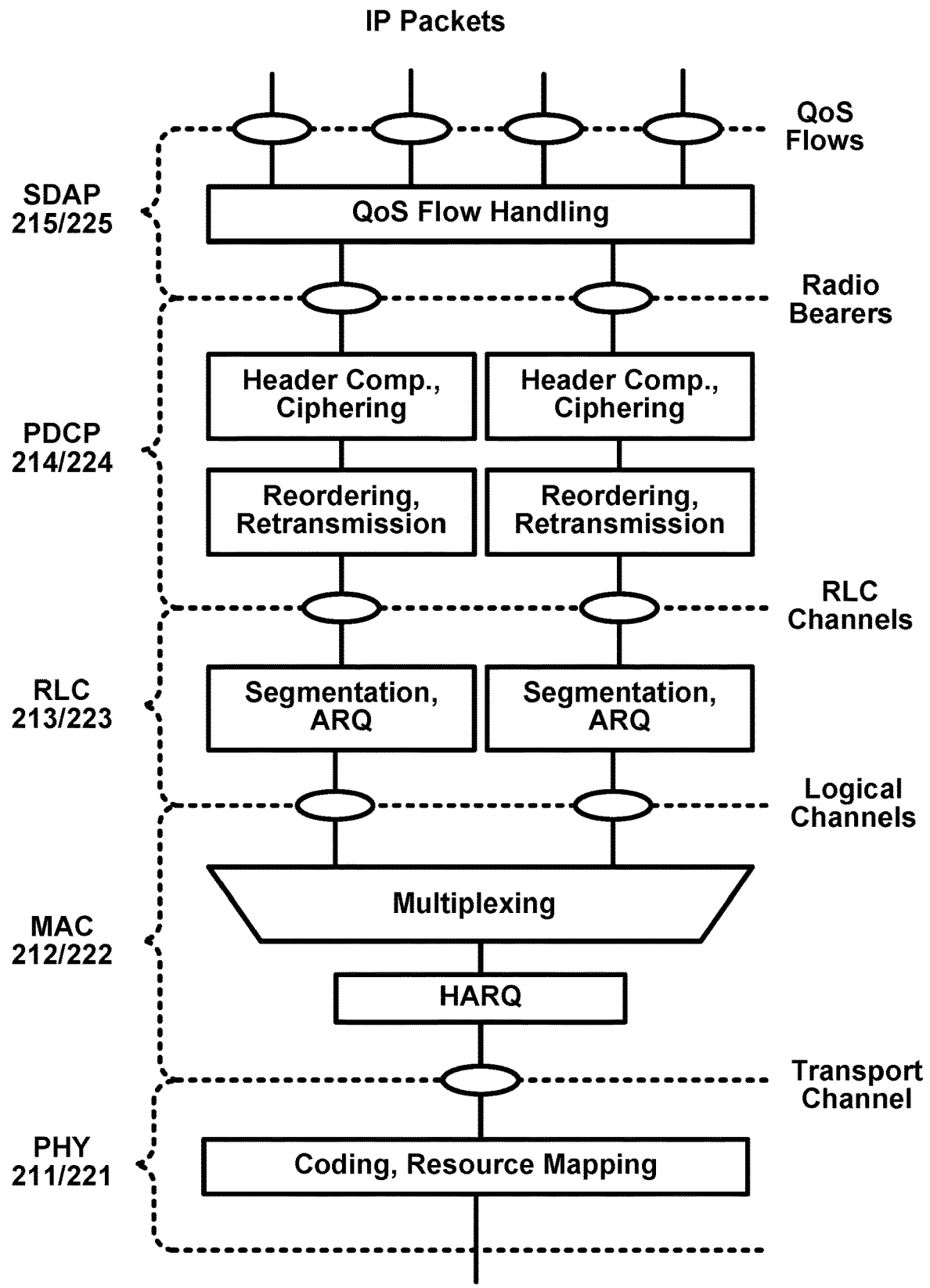
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
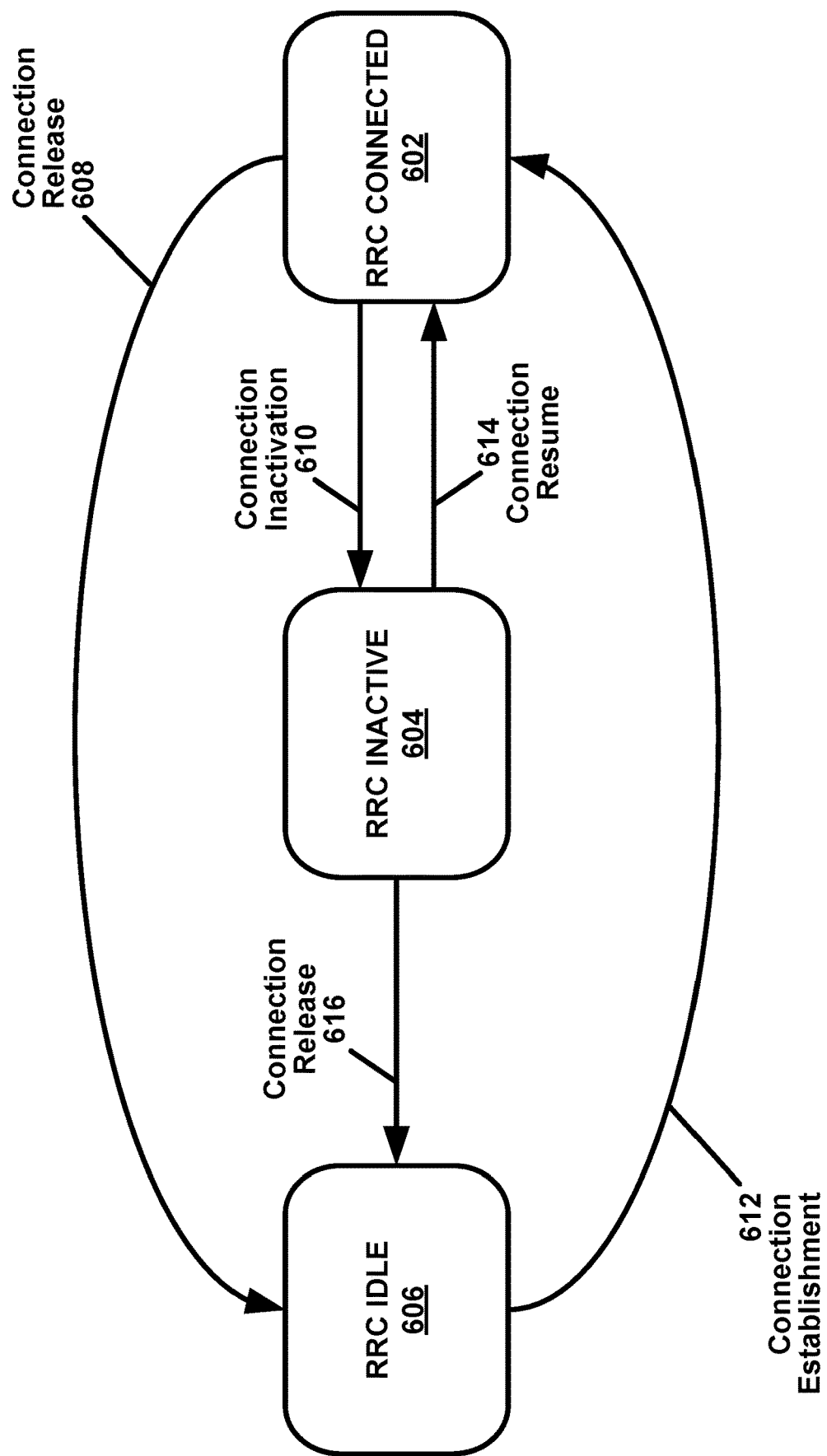
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
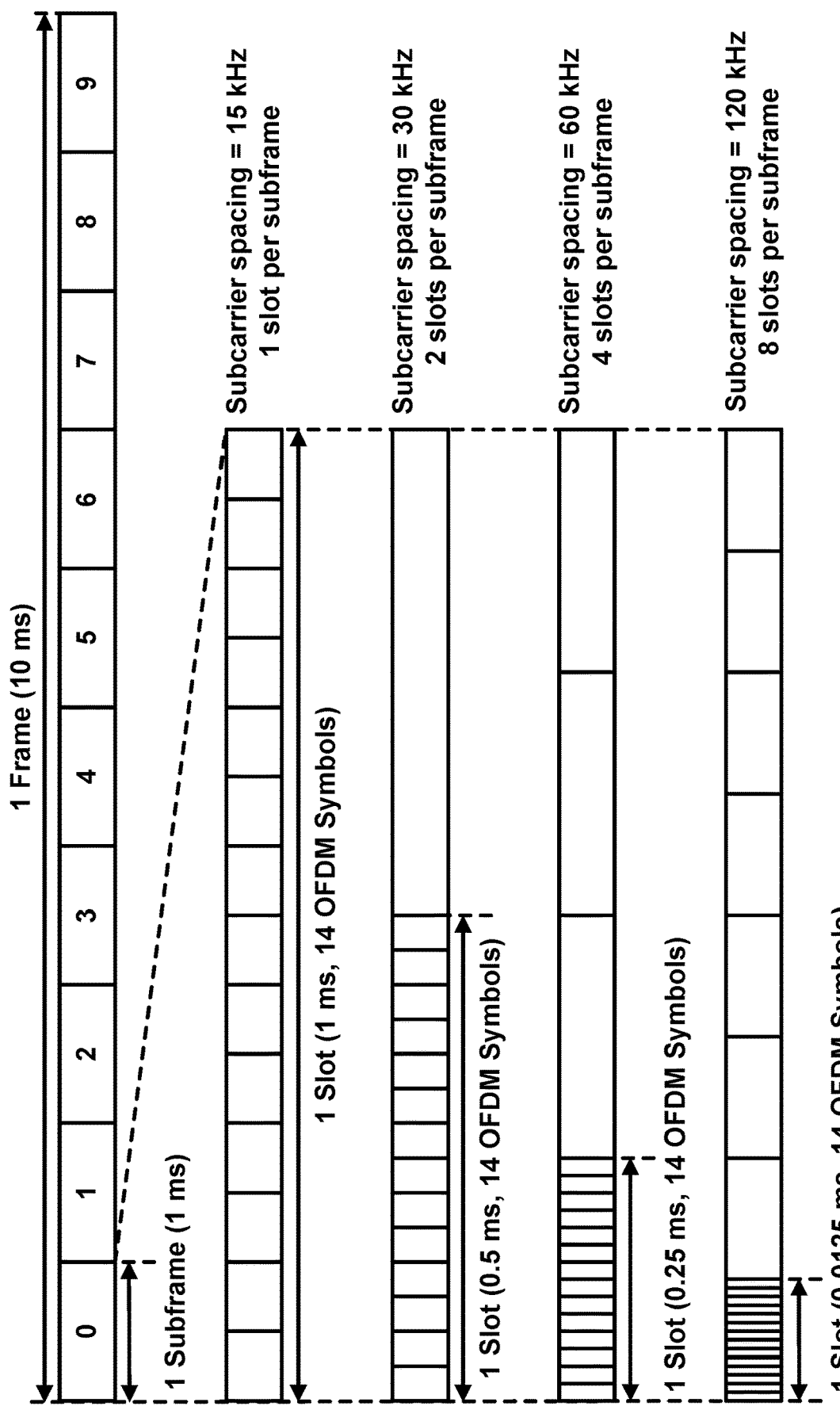
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
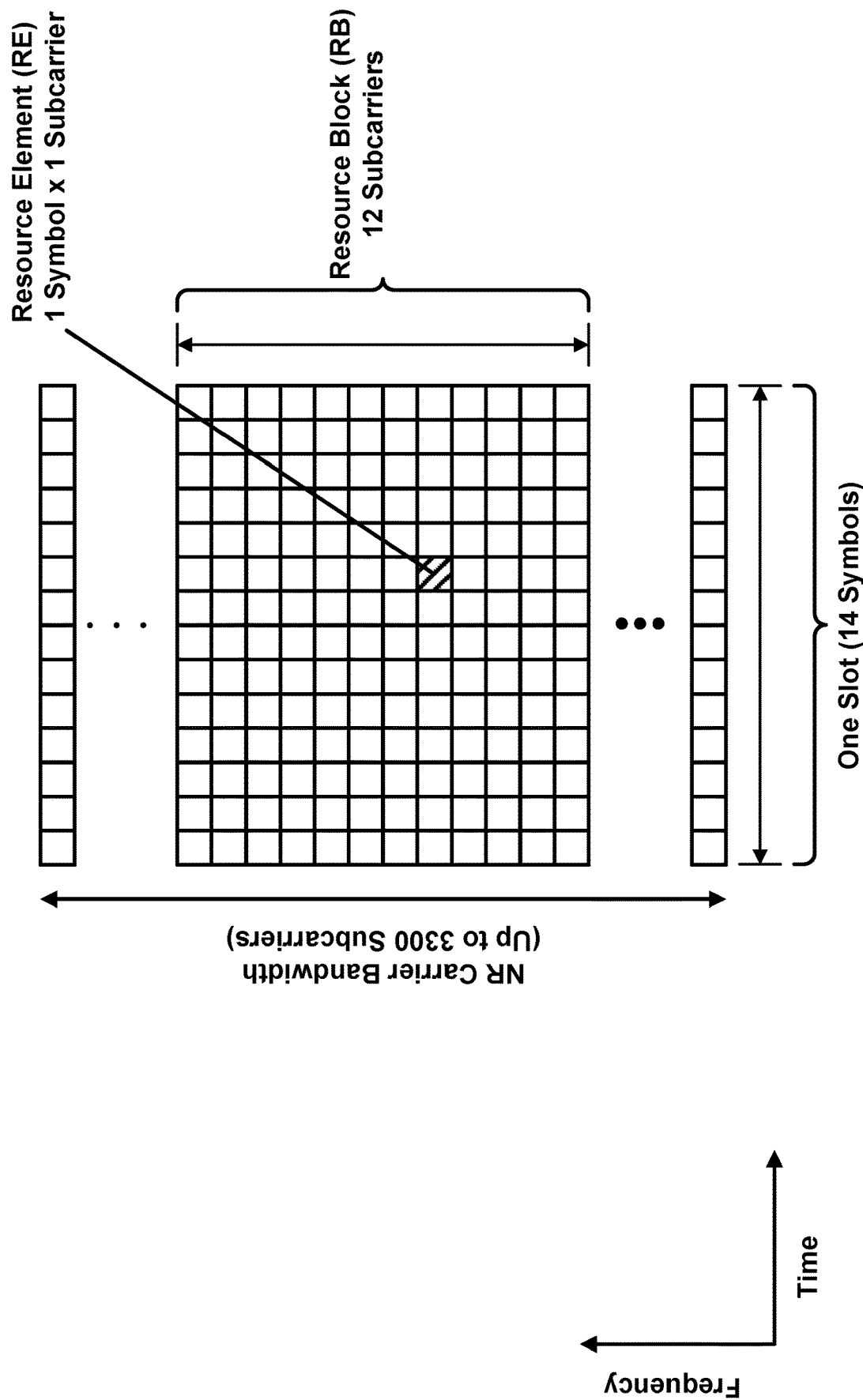
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
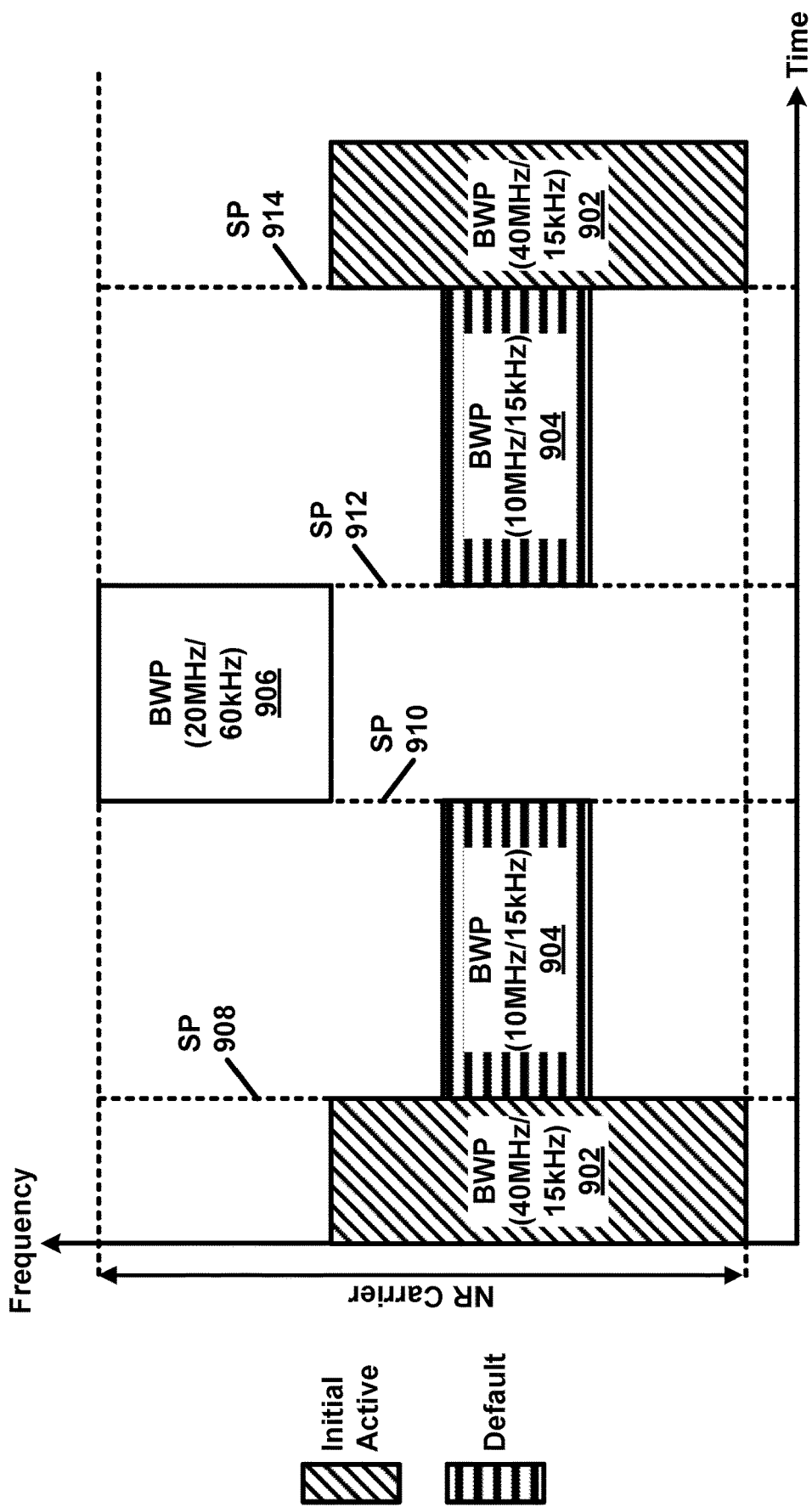
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
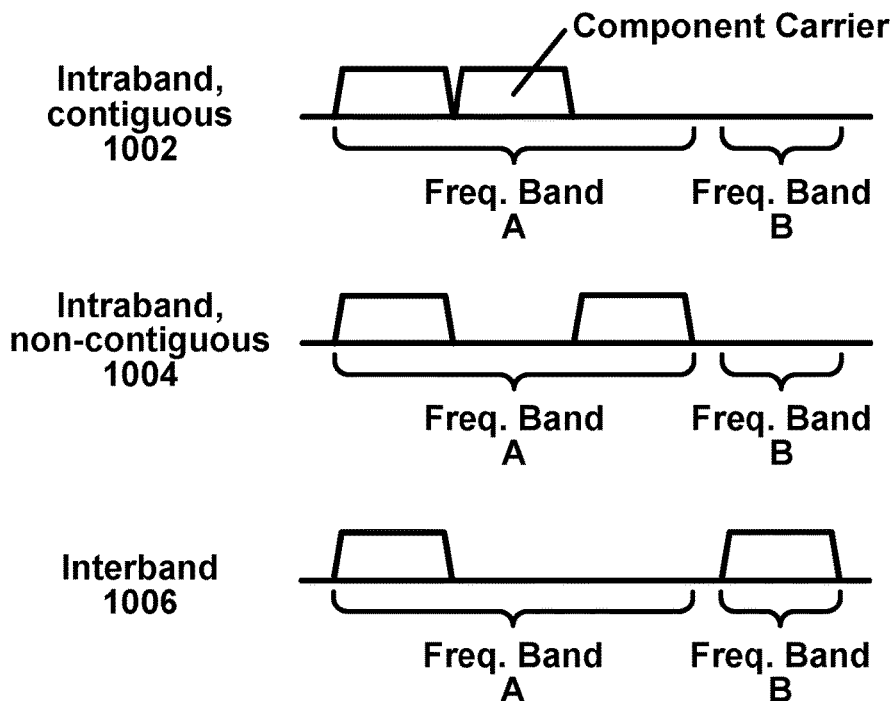
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
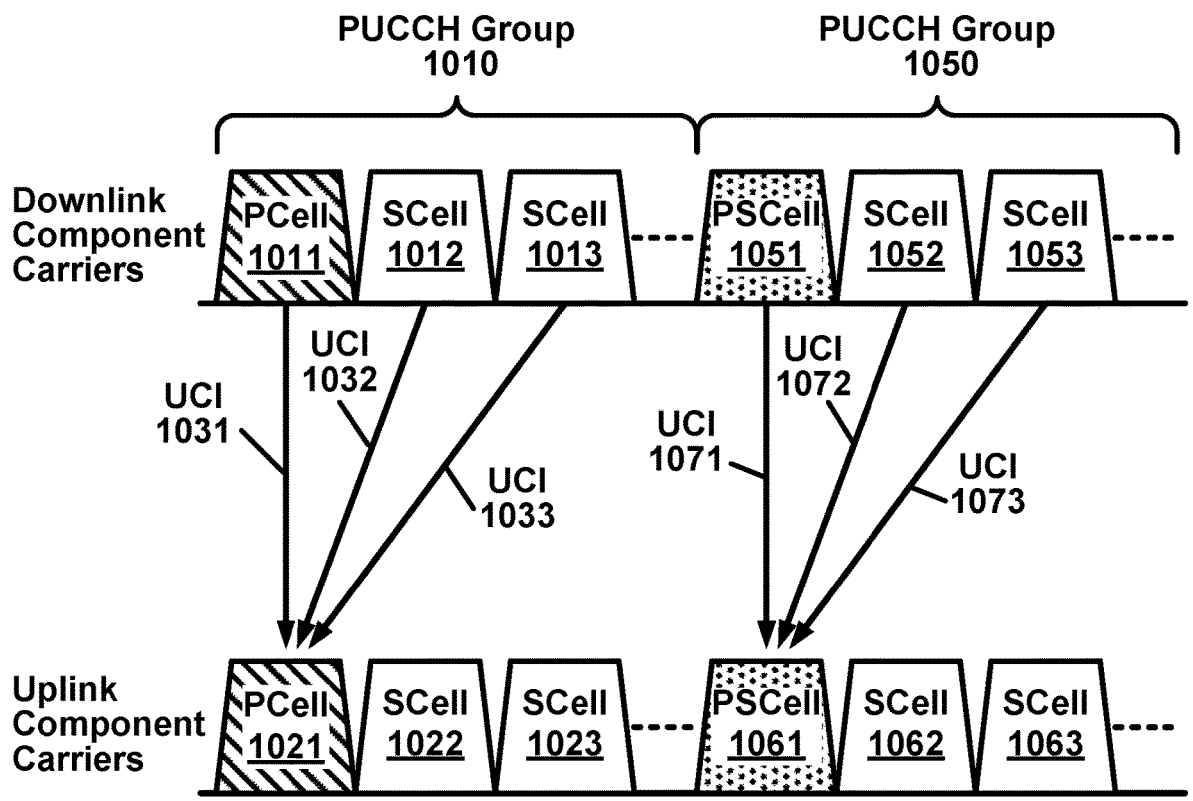
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
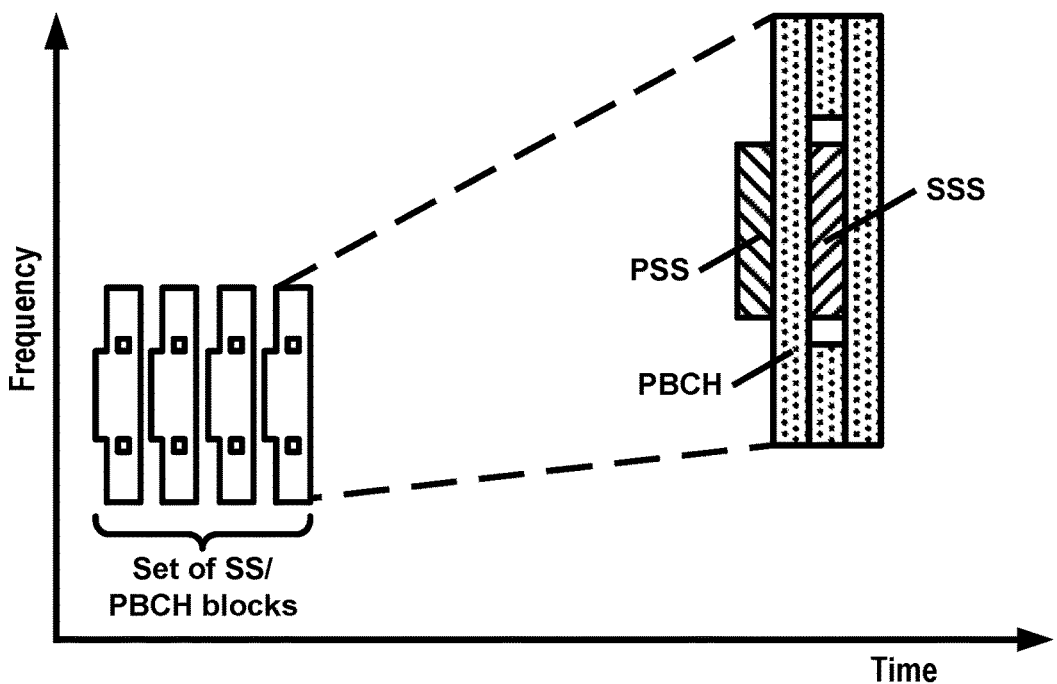
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/ transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A D M-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
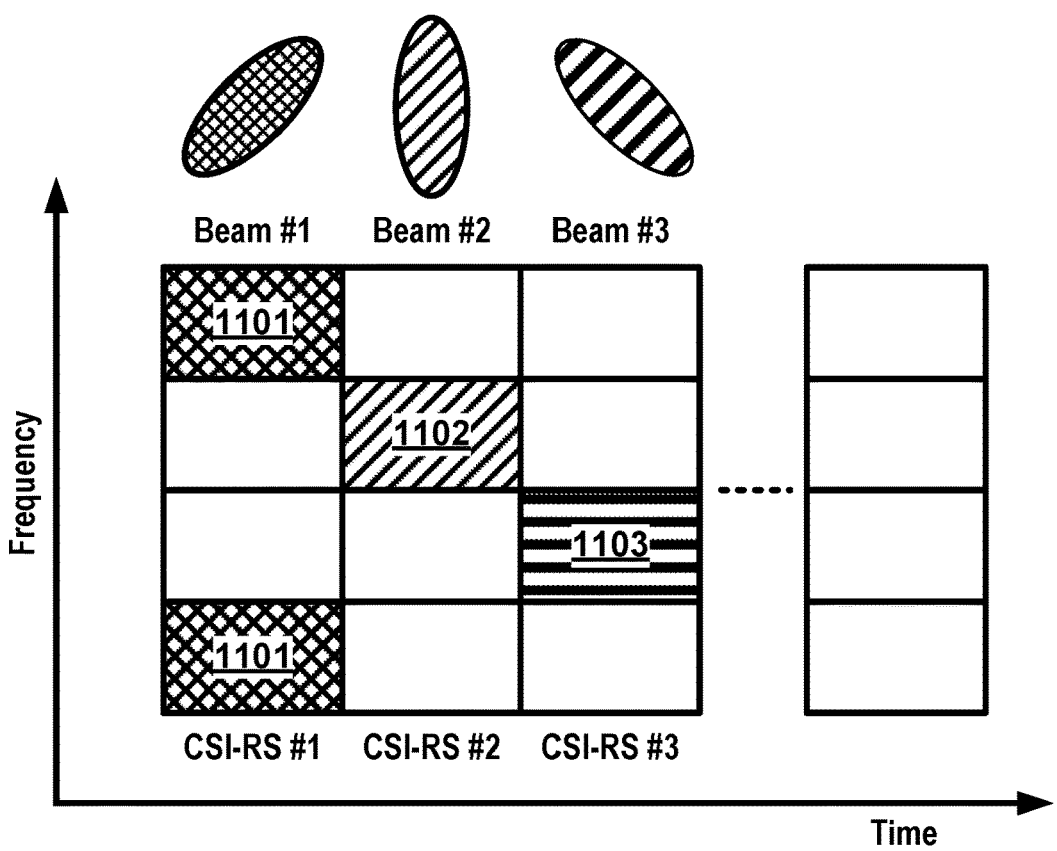
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figure 12A:
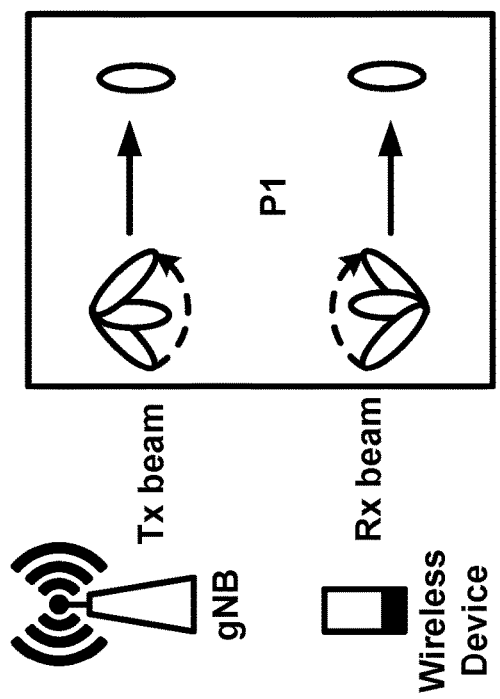
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
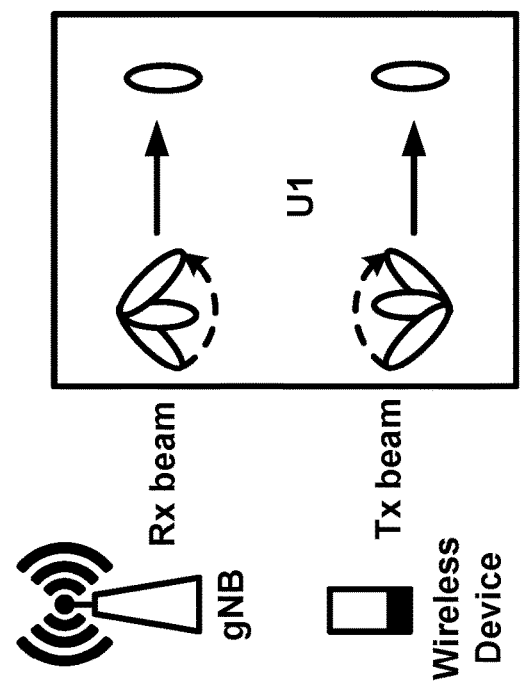
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
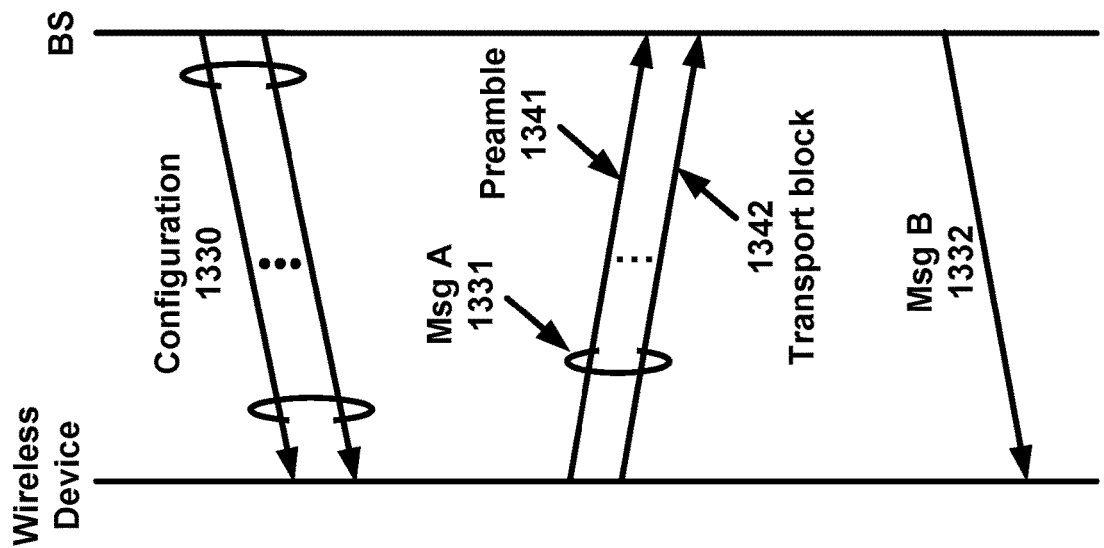
FIG. 13C shows an example two-step random access procedure.
Figure 13B:
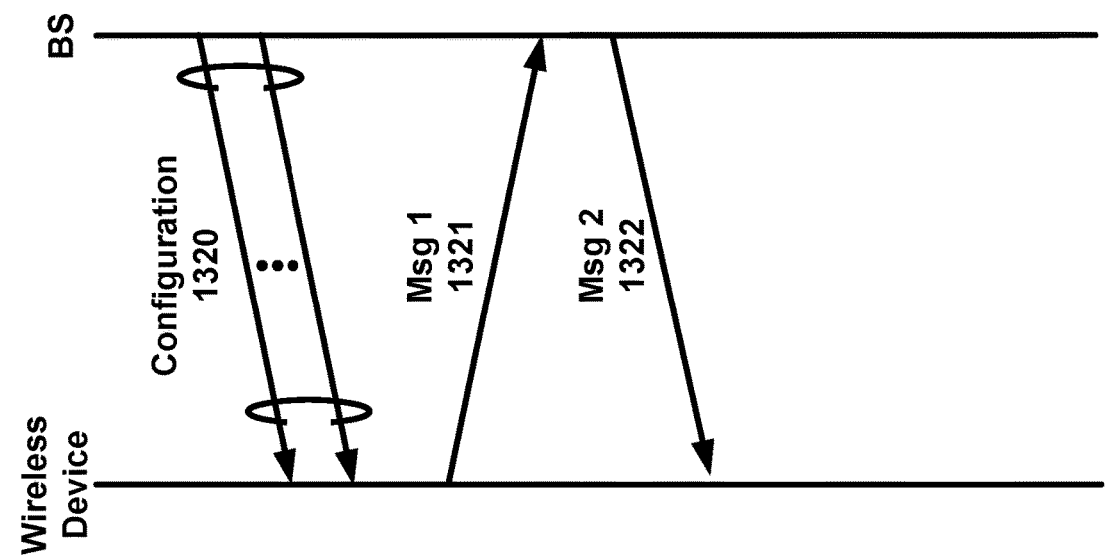
FIG. 13B shows an example two-step random access procedure.
Figure 13A:
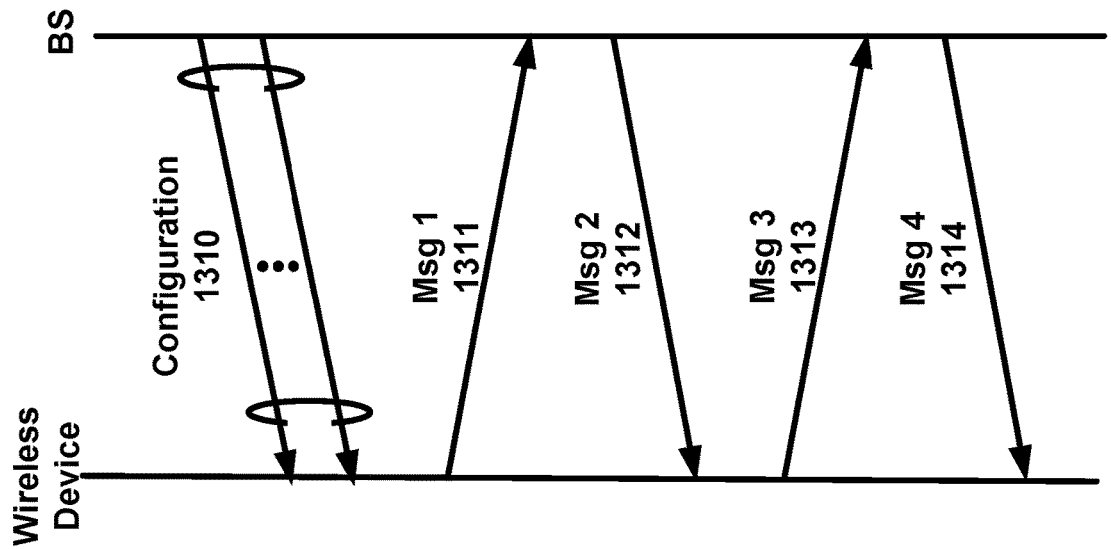
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/ number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332)

corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format (s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
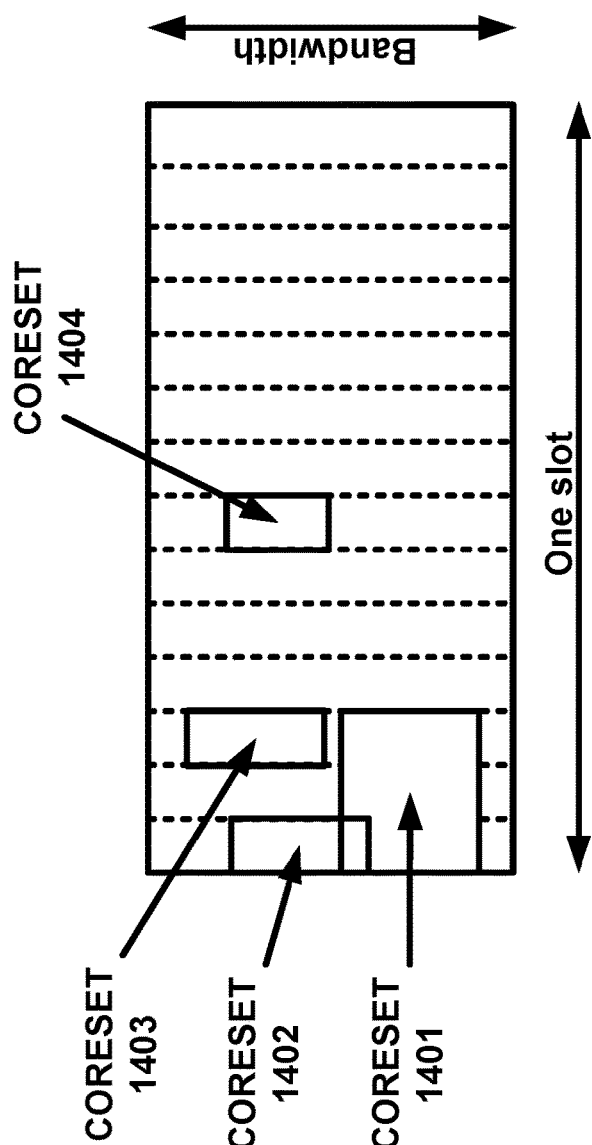
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
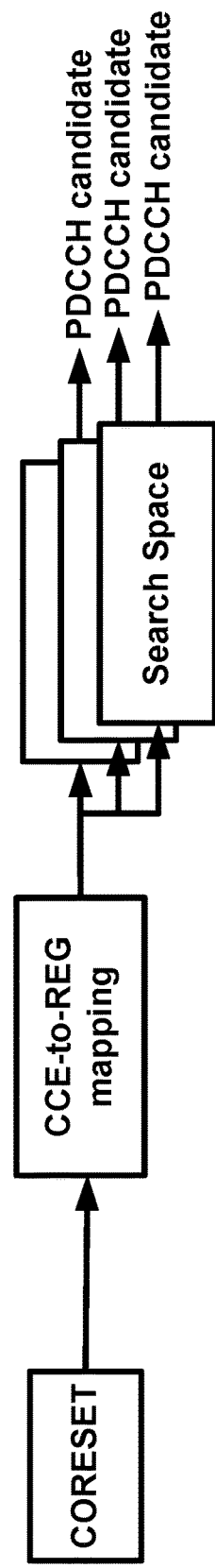
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
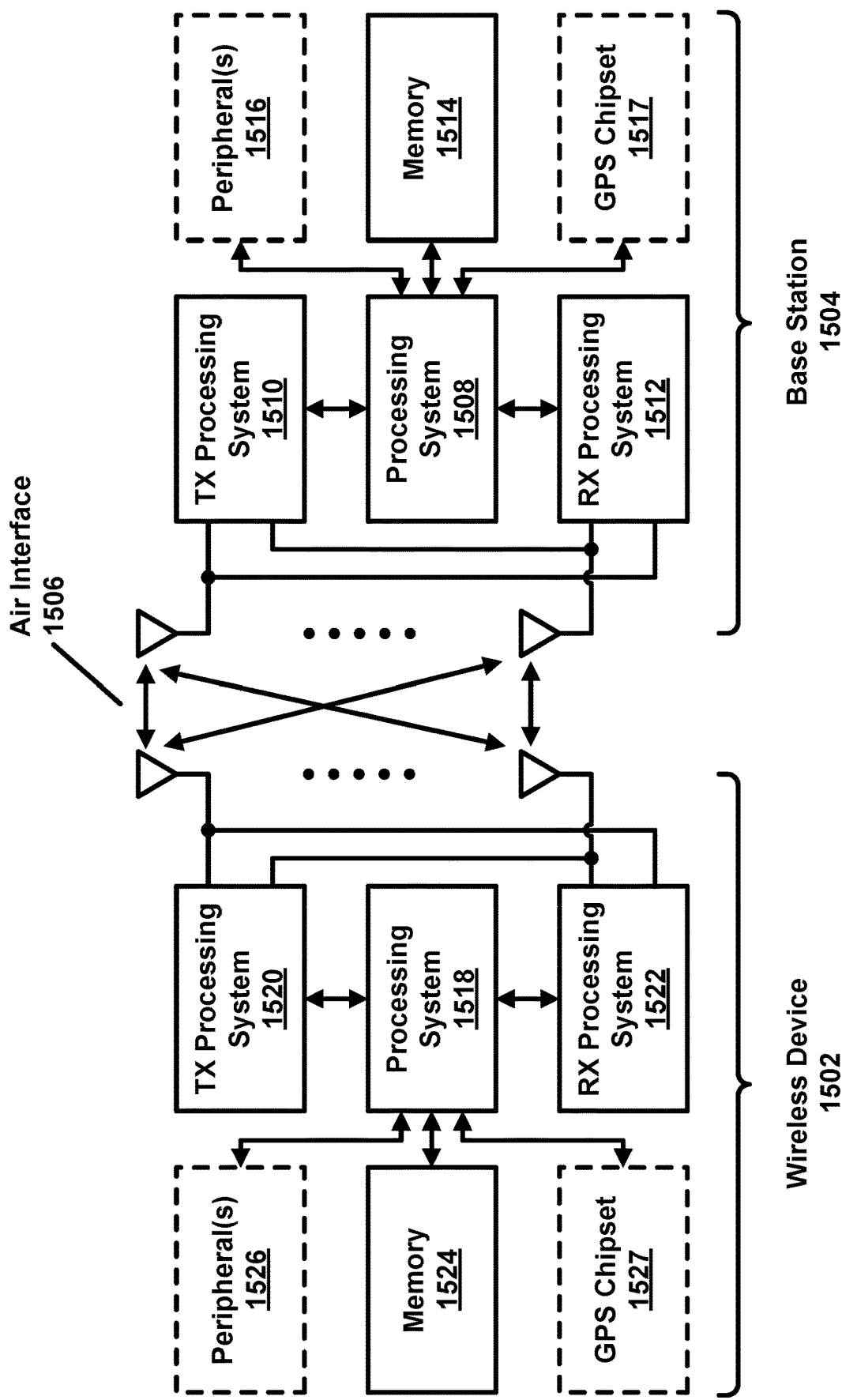
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
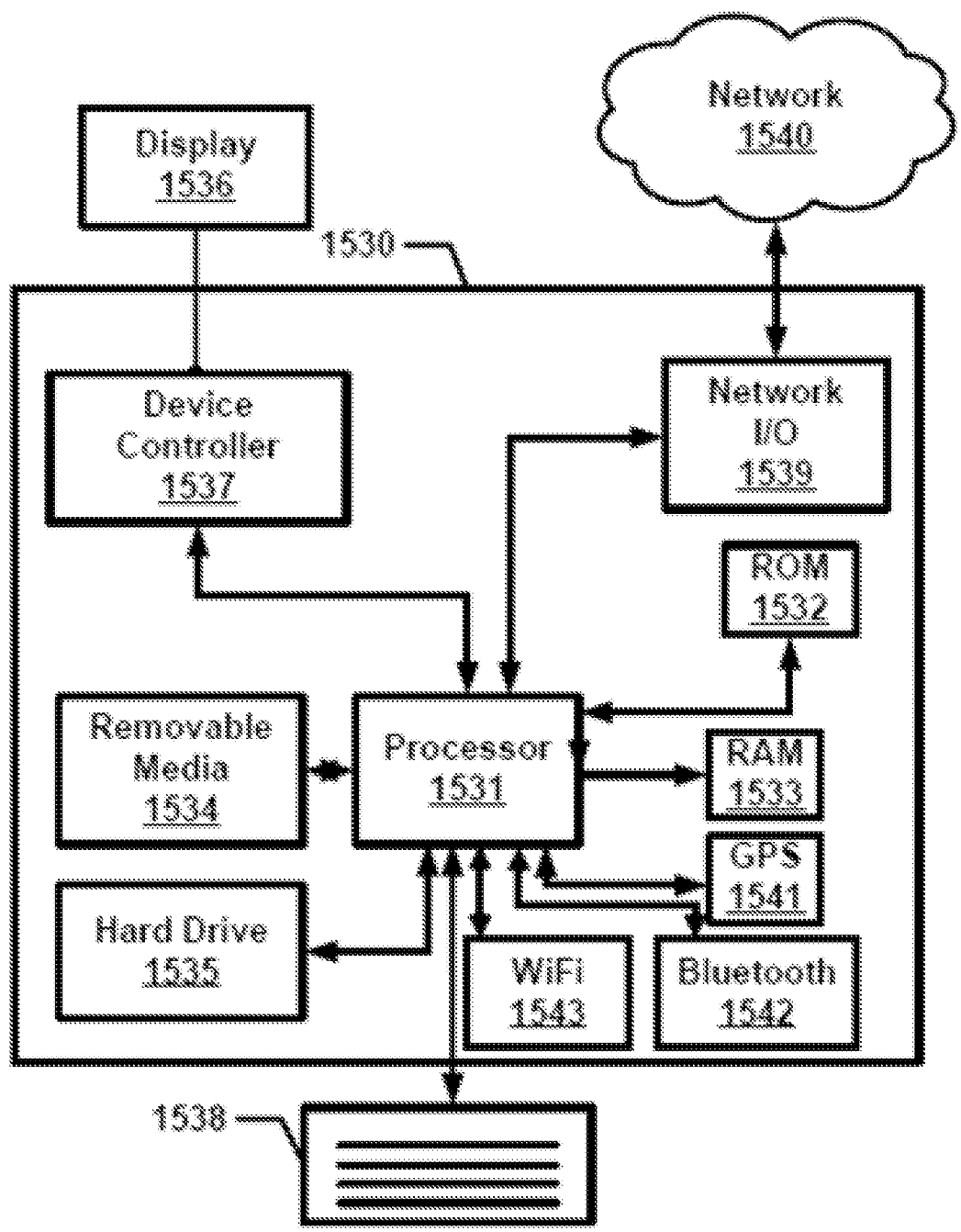
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
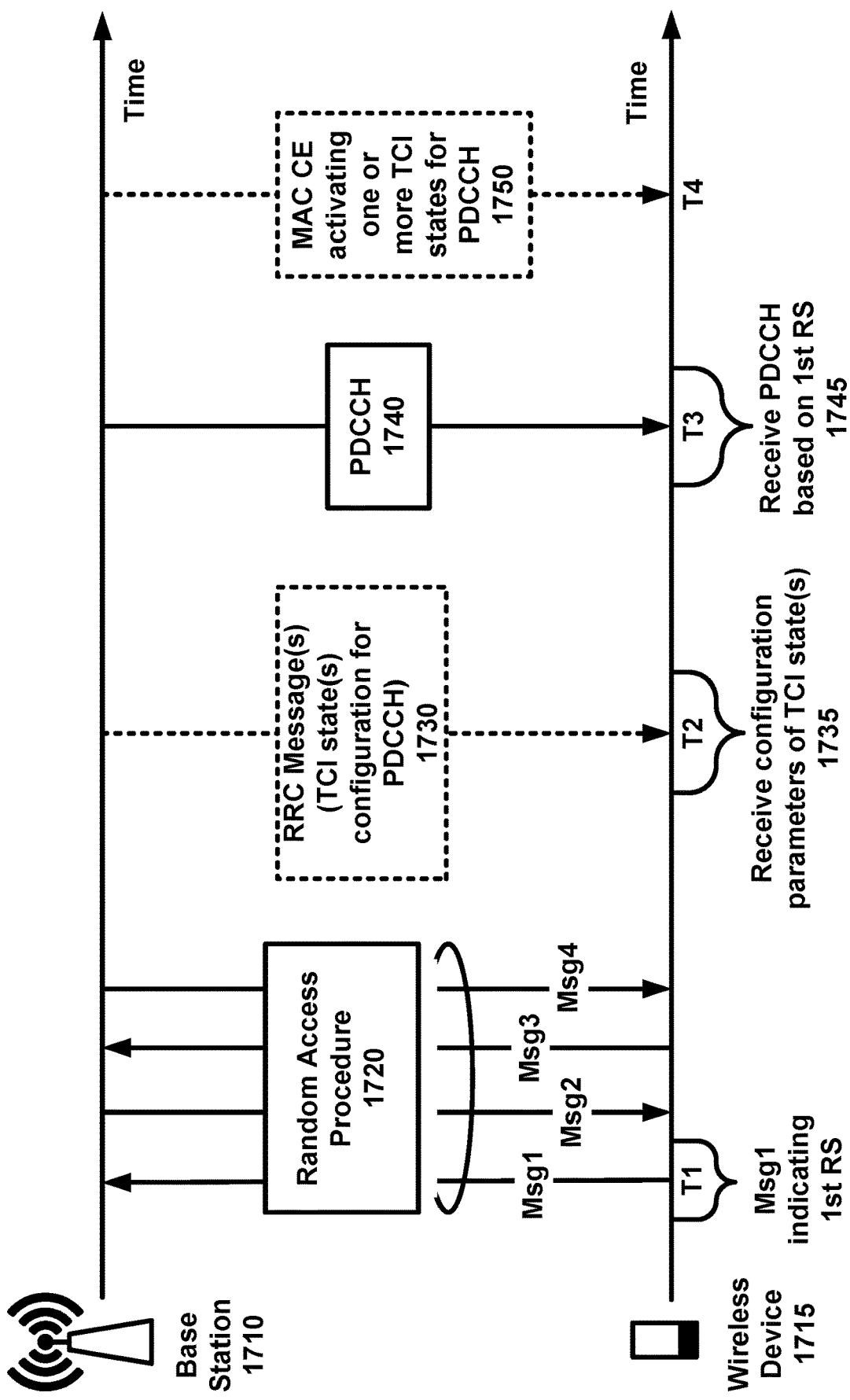
FIG. 17 shows an example of a beam determination procedure.

FIG. 17 shows an example of a beam determination procedure. The beam determination procedure may be for PDCCH. The example beam determination procedure for PDCCH shown in FIG. 17 may be for a PDCCH transmission with a single TRP or a base station. While a TRP may be referenced herein in various examples, one of ordinary skill in the art would understand that any TRP described or referenced herein may comprise any node (e.g., any transmission and/or reception node comprising a base station). A wireless device (e.g., wireless device 1715) may perform a random access procedure (e.g., RA procedure 1720) with a base station (e.g., base station 1710). The wireless device may perform, for example, a four-step contention-based random access procedure with a base station (e.g., as shown in FIG. 13A) and/or a two-step random access procedure with a base station (e.g., as shown in FIG. 13C). The random access procedure 1720 may comprise transmission of various messages. The random access procedure may comprise, for example, transmission of four messages. The random access procedure may comprise, for example, transmission of a first message (e.g., Msg 1), a second message (e.g., Msg 2), a third message (e.g., Msg 3), and a fourth message (e.g., Msg 4). The first message (e.g., Msg 1) may comprise a preamble or a random access preamble. The first message (e.g., Msg 1) may be referred to as a preamble. The second message (e.g., Msg 2) may comprise a random access response (RAR). The second message (e.g., Msg 2) may be referred to as an RAR. The wireless device may send (e.g., transmit) the first message (e.g., Msg 1) to the base station. The wireless device may also send (e.g., transmit) the third message (e.g., Msg 3) to the base station. The wireless device may receive the second message (e.g., Msg 2) from the base station. The wireless device may also receive the fourth message (e.g., Msg 4) from the base station. The wireless device may send (e.g., transmit), to the base station, a first message (e.g., Msg 1) comprising a preamble (e.g., at time T1 as shown in FIG. 17). As shown at element 1725 of FIG. 17, the first message (e.g., Msg 1 or the preamble), sent by the wireless device, may indicate a first reference signal (RS) of the base station. The wireless device may perform measurements of one or more reference signals (e.g., SS/PBCH block or CSI-RSs) and determine the first RS based on the measurements. The first RS may have an RSRP value being equal to or greater than an RSRP threshold. The first RS may be an SS/PBCH block or a CSI-RS. As shown at element 1735 of FIG. 17, the wireless device may receive, from the base station 1710, one or more messages (e.g. RRC messages 1730) comprising configuration parameters, for example, at time T2 as shown in FIG. 17. The configuration parameters may be received, from the base station 1710 via RRC signaling. The one or more configuration parameters (e.g., RRC configuration parameters via RRC signaling or any other configuration parameters via any other signaling) may comprise one or more parameters indicating initial configuration of one or more TCI states. The one or more configuration parameters may indicate initial configuration of one or more TCI states for a CORESET (e.g., comprising PDCCH 1740). The wireless device may receive the CORESET (or the PDCCH transmission). As shown at element 1745 of FIG. 17, the wireless device may receive the CORESET (or the PDCCH transmission) based on the first RS. The wireless device may assume that the DM-RS antenna port associated with PDCCH receptions (or the CORESET reception) (e.g., at time T3) is quasi co-located with the first RS (e.g., SS/PBCH block) the wireless device identified, for example, during the random access procedure, if the wireless device has been provided initial configuration of more than one TCI states (e.g., at time T2 by tci-StatesPDCCH-ToAddList and tci-StatesPDCCH-ToReleaseList in RRC message(s)) for a CORESET (e.g., comprising PDCCH), but has not received a MAC CE activation command 1750 for one of the TCI states if (e.g., when) the wireless device receives the CORESET (or the PDCCH transmission) (e.g., at time T3). The wireless device may receive the MAC CE activation command of one or more TCI states for the CORESET (or the PDCCH) (e.g., at time T4). The wireless device 1715 may assume that the DM-RS antenna port associated with PDCCH receptions (or the CORESET reception) (e.g., at time T3) is quasi co-located with the first RS (e.g., SS/PBCH block) the wireless device identified, for example, during the random access procedure, if the wireless device has not been provided the configuration of TCI state(s) (e.g., by tci-StatesPDCCH-ToAddList and tci-StatesPDCCH-ToReleaseList in RRC message(s)) for the CORESET (or the PDCCH). The wireless device 1715 may not receive the MAC CE activation command of one or more TCI states for the CORESET (or the PDCCH) if the wireless device does not receive the one or more messages (e.g. RRC messages) comprising configuration parameters indicating initial configuration of one or more TCI states. The wireless device may receive the CORESET (or the PDCCH transmission) based on the first RS (e.g., at time T3 as shown in FIG. 17). The wireless device may receive, for example, the CORESET (or the PDCCH transmission) with the same spatial domain transmission filter (or the same beam) as used for a reception of the first RS.

Figure 18:
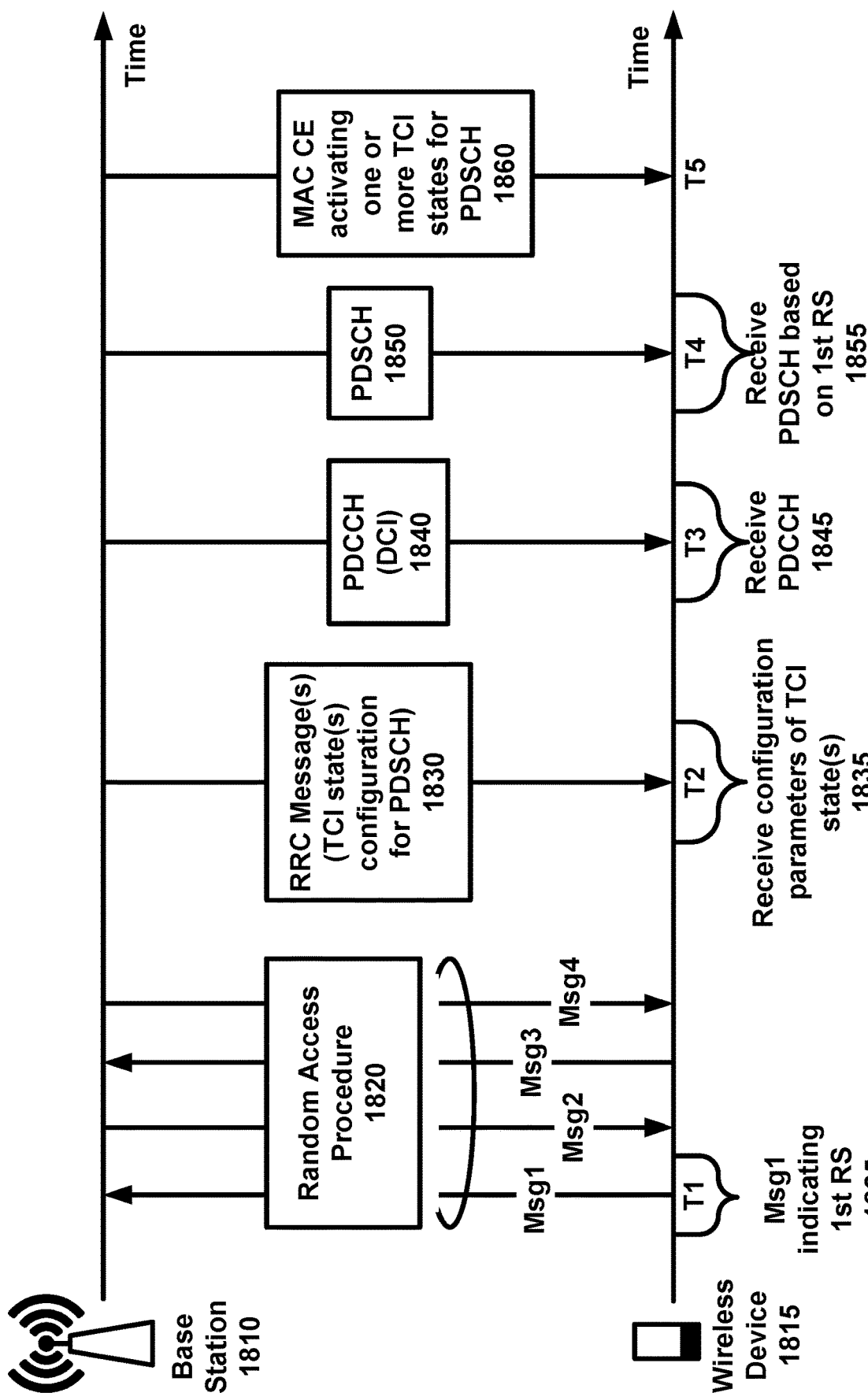
FIG. 18 shows an example of a beam determination procedure.

FIG. 18 shows an example of a beam determination procedure. The beam determination procedure may be for PDSCH. The example beam determination procedure for PDSCH shown in FIG. 18 may be for a PDSCH transmission with a single node (e.g., TRP or a base station). A wireless device (e.g., wireless device 1815) may perform a random access procedure (e.g., random access procedure 1820) with a base station (e.g., base station 1810). The random access procedure may be, for example, a four-step contention-based random access procedure (e.g., as shown in and discussed above concerning FIG. 13A), and/or a two-step random access procedure (e.g., as shown in and discussed above concerning FIG. 13C). The random access procedure may comprise transmission of various messages. The random access procedure may comprise, for example, transmission of four messages. The random access procedure may comprise, for example, transmission of a first message (e.g., Msg 1), a second message (e.g., Msg 2), a third message (e.g., Msg 3), and a fourth message (e.g., Msg 4). The first message (e.g., Msg 1) may comprise a preamble or a random access preamble. The first message (e.g., Msg 1) may be referred to as a preamble. The second message (e.g., Msg 2) may comprise a random access response (RAR). The second message (e.g., Msg 2) may be referred to as an RAR. The wireless device may send (e.g., transmit) the first message (e.g., Msg 1) and the third message (e.g., Msg 3) to the base station. The wireless device may receive the second message (e.g., Msg 2) and the fourth message (e.g., Msg 4) from the base station. The wireless device may send (e.g., transmit), to the base station, a message, for example, Msg 1 comprising a preamble (e.g., at time T1 as shown in FIG. 18). As shown at element 1825 of FIG. 18, the first message (e.g., Msg 1 or the preamble), sent by the wireless device, may indicate a first RS of the base station. The wireless device may perform measurements of one or more reference signals (e.g., SS/PBCH block or CSI-RSs) and determine the first RS based on the measurements. The first RS may have an RSRP value being equal to or greater than an RSRP threshold. The first RS may be an SS/PBCH block or a CSI-RS. As shown at element 1835 of FIG. 18, the wireless device may receive, from the base station, one or more messages (e.g. RRC messages 1830) comprising configuration parameters, for example, at time T2 as shown in FIG. 18. The configuration parameters may be received from the base station via RRC signaling. The one or more configuration parameters (e.g., RRC configuration parameters via RRC signaling or any other configuration parameters via any other signaling) may comprise one or more parameters indicating initial configuration of one or more TCI states. The one or more configuration parameters may indicate initial configuration of one or more TCI states for PDSCH (e.g., PDSCH 1850). The wireless device may receive, from the base station, a PDCCH transmission. The PDCCH transmission may comprise DCI. The wireless device may receive, from the base station, a PDSCH transmission. As shown at element 1855 in FIG. 18, the wireless device may receive the PDSCH transmission based on the first RS. The wireless device may receive configuration parameters of more than one TCI states (e.g., by tci-States-ToAddModList and tci-StatesToReleaseList in RRC message(s)) for a PDSCH (e.g., at time T2). The wireless device 1815 may assume that the DM-RS antenna port associated with PDSCH receptions (e.g., at time T4) is quasi co-located with the first RS (e.g., SS/PBCH block) the wireless device identified, for example, during the random access procedure, if tci-PresentInDCI in RRC message(s) is set to "enabled" or tci-PresentForDCI-Format1-2-r16 is configured in RRC message(s) for a CORESET scheduling the PDSCH transmission, and a time offset between a reception of the CORESET (or PDCCH comprising DCI) (e.g., at time T3) and the corresponding PDSCH reception (e.g., received by the wireless device at time T4) is equal to or greater than a time threshold (e.g., timeDurationForQCL in RRC message(s)), but has not received a MAC CE activation command 1860 of one or more TCI states for the PDSCH if (e.g., when) the wireless device receives the PDSCH transmission (e.g., at time T4). The wireless 1815 device may receive the PDSCH transmission based on the first RS (e.g., at time T4 as shown in FIG. 18). The wireless device may receive, for example, the PDSCH transmission with the same spatial domain transmission filter (or the same beam) as used for a reception of the first RS. The wireless device may receive the MAC CE activation command of the one or more TCI states for the PDSCH transmission (e.g., at time T5 as shown in FIG. 18).

A cell may comprise multiple TRPs. A beam failure recovery procedure may be based on a random access procedure, for example, for a primary secondary cell (e.g., PCell, SpCell, or PSCell). A beam failure recovery procedure may be based on a scheduling request (SR) and/or a MAC CE indication, for example, for a secondary cell (SCell). Such mechanisms may be used for a single TRP or multiple TRPs associated with a base station. The wireless device may transmit SR via a PCell based on an uplink beam indicated by MAC CE, for example, for an SCell beam failure recovery procedure. However, at least some beam determination procedures, such as procedures based on MAC CE indication, may not work well within a multiple TRP environment at least because beam failure may occur on one or more TRPs of multiple TRPs.

Figure 19:
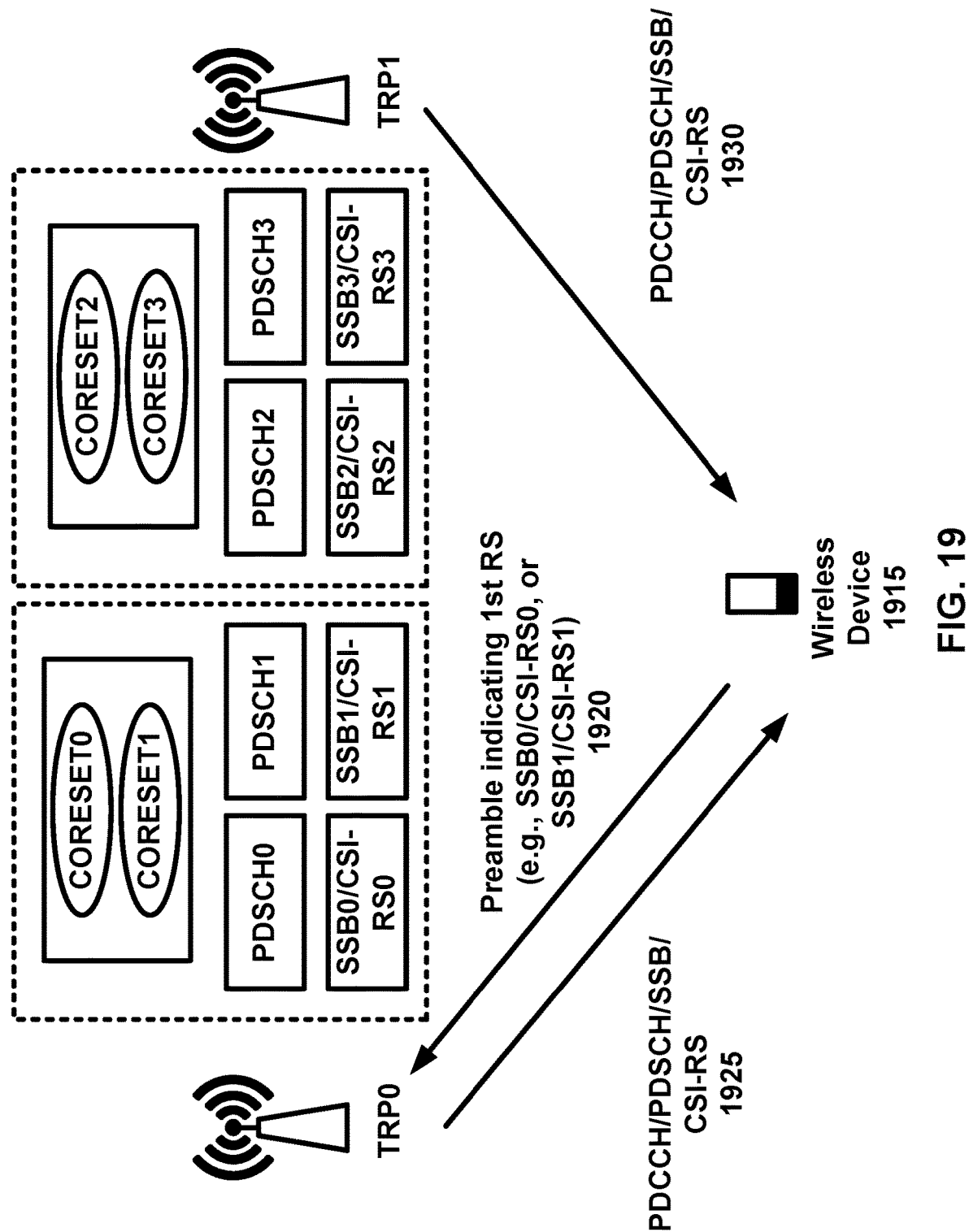
FIG. 19 shows an example of beam indication procedures with multiple nodes.

FIG. 19 shows an example of beam indication procedures with multiple nodes. The beam indication procedures may be for PDCCH and PDSCH with multiple nodes. As shown at elements 1925 and 1930 of FIG. 19, a wireless device (e.g., wireless device 1915) may receive downlink channels or signals (e.g., PDCCH, PDSCH, and/or CSI-RS) from a base station via multiple TRPs (e.g., TRP0 and TRP1). The wireless device may send (e.g., transmit) uplink channels or signals (e.g., PUCCH, PUSCH, and/or SRS) to the base station via the multiple TRPs (e.g., TRP0 and TRP1). The base station may configure the wireless device with different CORESETs, data channels, and/or RSs for one or more of the multiple TRPs (e.g., TRP0 and TRP1). The wireless device may receive, from the base station via a TRP (e.g., TRP0 or TRP1), one or more RRC messages comprising configuration parameters. The wireless device may receive, from the base station and via multiple TRPs, various downlink channels and/or reference signals PDCCH, PDSCH, CSI-RS) and RRC messages comprising configuration parameters indicating CORESETs for respective TRPs. The configuration parameters may indicate one or more first CORESETs, for example, one or more first CORESETs for TRP0. The one or more first CORESETs may comprise CORESET0 and CORESET1. The wireless device may receive PDCCHs of the one or more first CORESETs, for example, one or more first CORESETs from TRP0. The configuration parameters may indicate one or more second CORESETs, for example, one or more second CORESETs for TRP1. The one or more second CORESETs may comprise CORESET2 and CORESET3. The wireless device may receive the PDCCH transmissions of the one or more second CORESETs from TRP1. The configuration parameters may indicate one or more first PDSCHs, for example, one or more first PDSCH for TRP0. The one or more first PDSCHs may comprise PDSCH0 and PDSCH1. The wireless device may receive PDSCHs (e.g., PDSCH0 and PDSCH1) of the one or more first PDSCH transmissions from TRP0. The configuration parameters may indicate one or more second PDSCHs, for example, one or more second PDSCHs for TRP1. The one or more second PDSCHs may comprise PDSCH2 and PDSCH3.

The wireless device may receive PDSCH2 and PDSCH3 of the one or more second PDSCH transmissions from TRP1. The configuration parameters may indicate one or more first RSs, for example, one or more first RSs for TRP0. The one or more first RSs may comprise SSB/CSI-RS, for example, SSB0/CSI-RS0 and SSB1/CSI-RS1. The wireless device may receive SSB0/CSI-RS0 and SSB1/CSI-RS1 of the one or more first RSs from TRP0. The configuration parameters may indicate one or more second RSs, for example, one or more second RSs for TRP1. The one or more second RSs may comprise SSB2/CSI-RS2 and SSB3/CSI-RS3. The wireless device may receive SSB2/CSI-RS2 and SSB3/CSI-RS3 of the one or more second RSs from TRP1. The wireless device may perform measurements (e.g., RSRP measurements) of the one or more first RSs and the one or more second RSs (e.g., SSB0/CSI-RS0, SSB1/CSI-RS1, SSB2/CSI-RS2 and SSB3/CSI-RS3) from the multiple TRPs (e.g., TRP0 and TRP1).

In at least some beam determination procedures, a wireless device may determine an RS of a TRP (e.g., TRP0) and perform a random access procedure based on the RS. The wireless device may determine a first RS, for example, one RS from the one or more first RSs and the one or more second RSs, based on the measurements of the one or more first RSs and the one or more second RSs of the multiple TRPs. The wireless device may, for example, determine the first RS with an RSRP value being equal to or greater than an RSRP threshold. The configuration parameters may indicate the RSRP threshold. The wireless device may determine the first RS as one of the one or more first RSs (e.g., SSB0/CSI-RS0 or SSB1/CSI-RS1). The wireless device may perform a random access procedure based on the first RS. The wireless device may, for example, determine a preamble associated with the first RS. The wireless device may send (e.g., transmit) the preamble (or Msg 1) indicating the first RS to the base station, for example, via TRP0. The wireless device may receive Msg 2 and Msg 4 based on the first RS. The wireless device may, for example, receive Msg 2 and Msg 4 with a same spatial domain transmission filter (or same beam) as used for a reception of the first RS (e.g., Msg 2 and Msg 4 sent (e.g., transmitted) from TRP0). The wireless device may send (e.g., transmit) Msg 1 and Msg 3 based on the first RS. The wireless device may, for example, send (e.g., transmit) Msg 1 and Msg 3 with a same spatial domain transmission filter (or same beam) as used for a reception of the first RS.

The base station may configure the wireless device with different resource parameters for each TRP of the multiple TRPs, if the base station is associated with multiple TRPs (e.g., TRP0 and TRP1). The base station may, for example, configure the wireless device with different resource parameters (e.g., CORESETs, data channels, and/or RS) for a first TRP (e.g., TRP0) and for a second TRP (e.g., TRP1). For at least some beam determination procedures, the wireless device may only indicate one beam (or RS) to the base station. The wireless device may, for example, determine an RS of the first TRP (e.g., an RS associated with TRP0) and perform a random access procedure based on the RS. By implementing at least some technologies in a multi-TRP environment, where the wireless device may be configured with multiple TRPs, the wireless device may not receive one or more resource parameters (e.g., CORESETs, data channels, and/or RSs) from the second TRP (e.g., TRP1) based on the selected RS of the first TRP (e.g., TRP0). Since an RS cannot be used to communicate with multiple (different) TRPs, the wireless device may be able to exchange data with the first TRP using the selected RS of the first TRP, but may not exchange (e.g., may not be able to exchange) data with the second TRP using the selected RS of the first TRP. The wireless device may not receive (e.g., may not be able to receive) resource parameters (e.g., CORESETs, data channels, and/or RSs) from a TRP of which any candidate RS was not indicated to the base station via a message (e.g., a preamble) during the random access procedure. The wireless device may not receive (e.g., may not be able to receive) resource parameters (e.g., CORESETs, data channels, and/or RSs), for example, from the second TRP (e.g., TRP1).

The wireless device may not receive the one or more second CORESETs from TRP1 based on the first RS, for example, if the one or more first CORESETs (e.g., CORESET0 and CORESET1) and the one or more second CORESETs (e.g., CORESET2 and CORESET3) are configured for the TRP0 and TRP1, respectively (e.g., as shown in FIG. 19). By implementing at least some technologies, the wireless device may not receive the one or more second CSI-RSs from TRP1 based on a CORESET of TRP0 (or based on a TCI state associated with PDSCH of TRP0), if the one or more first CSI-RSs (e.g., CSI-RS0 and CSI-RS1) and the one or more second CSI-RSs (e.g., CSI-RS2 and CSI-RS3) are triggered to be sent (e.g., transmitted) from the TRP0 and TRP1, respectively (e.g., as shown in FIG. 19). By implementing at least some technologies, the wireless device may not receive the one or more second PDSCH transmissions from TRP1 based on the first RS if the one or more first PDSCHs (e.g., PDSCH0 and PDSCH1) and the one or more second PDSCHs (e.g., PDSCH2 and PDSCH3) are configured for the TRP0 and TRP1, respectively (e.g., as shown in FIG. 19).

In a multi-TRP environment, a base station may attempt to communicate with a wireless device via one or more TRPs (e.g., TRP0 and/or TRP1). Using at least some beam determination procedures, for example, where the wireless device can only indicate an RS to the base station, in a multi-TRP environment may lead to unreliable beam failure recovery beam determination for multi-TRP beam failure. By implementing at least some technologies and beam determination procedures, the wireless device may not receive downlink channels or signals (e.g., PDCCH, PDSCH, and/or CSI-RS) from a second TRP (e.g., TRP1) based on a first RS of a first TRP (e.g., TRP0), which significantly reduces the performance and reliability of the multi-TRP system. Additionally, the inability of the base station to reliably communicate with the wireless device may also reduce performance of beam failure recovery beam determination in a multi-TRP environment. Beam management procedure(s) may be enhanced, for example, by improving random access procedure and/or a multi-TRP system to increase the performance and reliability of communication systems with multiple TRPs.

As described herein, a wireless device and/or other devices (e.g., a base station) may overcome various deficiencies of at least some beam determination procedures by using improved/enhanced communications. Improvements/enhancements may be achieved, for example, for wireless communications such that the wireless device may indicate RSs and corresponding CORESET pool indices (e.g., TRPs) to a base station. The wireless device may, for example, use one or more messages to indicate RSs and corresponding CORESET pool indices (e.g., TRPs) to a base station. The wireless device may send the one or more messages, for example, as part of a random access procedure. The wireless device may indicate RSs and corresponding CORESET pool indices (e.g., TRPs) to a base station using one or more messages (e.g., one or more preambles) and one or more random access occasions. One or more different random access occasions may indicate different resources in time and/or frequency. The wireless device may indicate the RSs and corresponding CORESET pool indices using a combination of the one or more messages (e.g., one or more preambles) and the one or more random access occasion.

As described herein, a wireless device and/or other devices (e.g., a base station) may overcome various deficiencies of at least some beam determination procedures by using improved/enhanced communications. Improvements/enhancements may also be achieved, for example, for wireless communications such that a wireless device indicates RSs and corresponding CORESET pool indices (e.g., TRPs) to a base station via one or more messages associated with a random access procedure. The wireless device may receive configuration parameters from a base station. The configuration parameters may indicate first reference signals (RSs) associated with a first control resource set (CORESET) pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may receive a random access response based on the sending (e.g., transmitting) the preamble. The wireless device may receive a random access response, for example, based on (e.g., after or in response to) the sending (e.g., transmitting) the preamble. The wireless device may send (e.g., transmit), based on the random access response, a transport block of the random access procedure (e.g., Msg 3). The transport block may indicate the second RS and/or the second CORESET pool index.

As described herein, for example, a wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block may indicate the second RS and/or the second CORESET pool index. The wireless device may receive a random access response based on the sending (e.g., transmitting) the preamble and/or the transport block. The wireless device may receive a random access response, of the random access procedure, for example, based on (e.g., after or in response to) the sending (e.g., transmitting) the preamble and/or the transport block.

As described herein, for example, a wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS and the second RS, of a random access procedure. The preamble may indicate one or more of: the first RS, the second RS, the first CORESET pool index, or the second CORESET pool index. The wireless device may receive a random access response based on the sending (e.g., transmitting) the preamble. The wireless device may receive a random access response, of the random access procedure, for example, based on (e.g., after or in response to) the sending (e.g., transmitting) the preamble.

As described herein, for example, a wireless device may receive configuration parameters from a base station. The configuration parameters may indicate first RSs associated with a first (CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block indicates the second RS and/or the second CORESET pool index. The preamble may indicate one or more of: the first RS, the second RS, the first CORESET pool index, or the second CORESET pool index. The wireless device may receive one or more first CORESETs based on the first RS and/or one or more second CORESETs based on the second RS. The wireless device may receive the one or more first CORESETs and/or the one or more second CORESETs, for example, based on (e.g., after or in response to) one or more transmission configuration indication (TCI) states not being configured, by radio resources messages, for: the one or more first CORESETs associated with the first CORESET pool index; and the one or more second CORESETs associated with the second CORESET pool index. The wireless device may receive one or more first CORESETs based on the first RS and/or one or more second CORESETs based on the second RS. The wireless device may receive the one or more first CORESETs and/or the one or more second CORESETs, for example, based on (e.g., after or in response to) the configuration parameters indicating one or more TCI states for the one or more first CORESETs associated with the first CORESET pool index and the one or more second CORE- SETs associated with the second CORESET pool index. Additionally, the wireless device may receive one or more first CORESETs based on the first RS and/or one or more second CORESETs based on the second RS, for example, before receiving a MAC CE activating one or more TCI states for the one or more first CORESETs and the one or more second CORESETs.

As described herein, a wireless device and/or other devices (e.g., a base station) may overcome various deficiencies of at least some beam determination procedures by using improved/enhanced communications. Improvements/ enhancements may also be achieved, for example, for wireless communications such that the wireless device may determine an RS, of multiple RSs, associated with a CORESET pool index (e.g., TRP) for each of a plurality of CORESET pool indices (e.g., TRPs). The wireless device may receive, from the base station, a PDSCH transmission associated with the CORESET pool index based on the RS. The wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block indicates the second RS and/or the second CORESET pool index. The preamble may indicate one or more of: the first RS, the second RS, the first CORESET pool index, or the second CORESET pool index. The wireless device may receive one or more first PDSCH transmissions based on the first RS and/or one or more second PDSCH transmissions based on the second RS. The wireless device may receive the one or more first PDSCH transmissions and/or the one or more second PDSCH transmissions, for example, based on (e.g., after or in response to) the configuration parameters indicating one or more TCI states for the one or more first PDSCHs associated with the first CORESET pool index; and the one or more second PDSCHs associated with the second CORESET pool index. Additionally or alternatively, the wireless device may receive one or more first PDSCH transmissions based on the first RS and/or one or more second PDSCH transmissions based on the second RS, for example, before receiving a MAC CE activating one or more TCI states for: the one or more first PDSCHs; and the one or more second PDSCHs. By receiving, from the base station, a PDSCH transmission associated with a CORESET pool index based on an RS that is also associated with the CORESET pool index, the wireless device and base station avoid the unreliability of BFR beam determination for multiple TRPs beam failure, and improve the performance of BFR beam determination in a multi-TRP environment. The wireless device and base station may further improve transmission and/or reception performance based on the RS that is also associated with the CORESET pool index.

As described herein, a wireless device and/or other devices (e.g., a base station) may overcome various deficiencies of at least some beam determination procedures by using improved/enhanced communications. Improvements/ enhancements may also be achieved, for example, for wireless communications such that the wireless device may determine an RS, of multiple RSs, associated with a CORESET pool index (e.g., TRP) for each of a plurality of CORESET pool indices (e.g., TRPs). The wireless device may receive, from the base station, a CSI-RS associated with the CORESET pool index based on the RS. The wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block indicates the second RS and/or the second CORESET pool index. The preamble may indicate one or more of: the first RS, the second RS, the first CORESET pool index, or the second CORESET pool index. The wireless device may receive one or more first CSI-RSs based on the first RS and/or one or more second CSI-RSs based on the second RS. The wireless device may receive the one or more first CSI-RSs and/or the one or more second CSI-RSs, for example, based on (e.g., after or in response to) the configuration parameters indicating one or more TCI states for: one or more first CSI-RSs associated with the first CORESET pool index; and one or more second CSI-RSs associated with the second CORESET pool index. The wireless device may receive one or more first CSI-RSs based on the first RS and/or one or more second CSI-RSs based on the second RS. The wireless device may receive the one or more first CSI-RSs and/or the one or more second CSI-RSs, for example, based on (e.g., after or in response to) the configuration parameters indicating one or more TCI states for: one or more first PDCCHs associated with the first CORESET pool index; and one or more second PDCCHs associated with the second CORESET pool index. The wireless device may receive one or more first CSI-RSs based on the first RS and/or one or more second CSI-RSs based on the second RS. The wireless device may receive the one or more first CSI-RSs and/or the one or more second CSI-RSs, for example, based on (e.g., after or in response to) the configuration parameters indicating one or more TCI states for: one or more first PDSCHs associated with the first CORESET pool index; and one or more second PDSCHs associated with the second CORESET pool index. Additionally, the wireless device may receive one or more first CSI-RSs based on the first RS and/or one or more second CSI-RSs based on the second RS, for example, before receiving a MAC CE activating one or more TCI states for: the one or more first CSI-RSs; and the one or more second CSI-RSs. The wireless device may receive one or more first CSI-RSs based on the first RS and/or one or more second CSI-RSs based on the second RS, for example, before receiving a MAC CE activating one or more TCI states for: the one or more first PDCCHs; and the one or more second PDCCHs. The wireless device may receive one or more first CSI-RSs based on the first RS and/or one or more second CSI-RSs based on the second RS, for example, before receiving a MAC CE activating one or more TCI states for: the one or more first PDSCHs; and the one or more second PDSCHs. By receiving, from the base station, a CSI-RS associated with a CORESET pool index based on an RS that is also associated with the CORESET pool index, the wireless device and base station may avoid the unreliability of BFR beam determination for multiple TRPs beam failure, and/or may improve the performance of BFR beam determination in a multi-TRP environment. The wireless device and base station further improve transmission/reception performance based on the RS that is also associated with the CORESET pool index.

As described herein, a wireless device and/or other devices (e.g., a base station) may overcome various deficiencies of at least some beam determination procedures by using improved/enhanced communications. Improvements/enhancements may also be achieved, for example, for wireless communications such that beam failure detection and recovery procedures may be performed by a wireless device for each TRP of multiple TRPs (e.g., TRP level beam failure detection and recovery procedures). The wireless device may determine an RS, of multiple RSs, associated with a CORESET pool index (e.g., TRP) for each of a plurality of CORESET pool indices (e.g., TRPs). The wireless device may transmit, to a base station, a resource (e.g., a PUCCH resource, a SR resource, etc.) indicating beam failure for each of the multiple TRPs. The wireless device may send, to the base station, a resource (e.g., PUCCH resource) associated with the CORESET pool index based on the RS. The wireless device may determine a spatial domain filter of the resource (e.g., the PUCCH resource, the SR resource) based on power measurements of RSs and association relationships between RSs and the corresponding TRP. A wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block indicates the second RS and/or the second CORESET pool index. The preamble may indicate one or more of: the first RS, the second RS, the first CORESET pool index, or the second CORESET pool index. The wireless device may send (e.g., transmit) one or more first PUCCH resources based on the first RS and/or one or more second PUCCH resources based on the second RS, for example, before receiving a MAC CE activating one or more spatial relation information for: the one or more first PUCCH resources associated with the first CORESET pool index; and the one or more second PUCCH resources associated with the second CORESET pool index. The wireless device may send (e.g., transmit) one or more first PUCCH resources based on the first RS and/or one or more second PUCCH resources based on the second RS, for example, before receiving a MAC CE activating one or more TCI states for the one or more first PUCCH resources associated with the first CORESET pool index; and the one or more second PUCCH resources associated with the second CORESET pool index. By sending, to the base station, a resource (e.g., PUCCH resource) associated with a CORESET pool index based on an RS that is also associated with the CORESET pool index, the wireless device and base station avoid the unreliability of BFR beam determination for multiple TRPs beam failure, and improve the performance of BFR beam determination in a multi-TRP environment. The wireless device and base station further improve transmission/reception performance based on the indication of the resource that is also associated with the CORESET pool index.

As described herein, for example, a wireless device may receive configuration parameters from a base station. The configuration parameters may indicate TCI states for CORESETs. The configuration parameters may indicate one or more first CORESETs associated with a first CORESET pool index. The configuration parameters may indicate one or more second CORESETs associated with a second CORESET pool index. The wireless device may receive a MAC CE activating: one or more first TCI sates, of the TCI states, for the one or more first CORESETs; and/or one or more second TCI sates, of the TCI states, for the one or more second CORESETs. The wireless device may receive one or more downlink control information (DCI) triggering: one or more first channel state information reference signals (CSI-RSs) associated with the first CORESET pool index; and/or one or more second CSI-RSs associated with the second CORESET pool index. The wireless device may receive one or more first CSI-RSs based on a CORESET with a lowest identity of the one or more first CORESETs, for example, based on (e.g., after or in response to) an offset value being equal to or less than a time threshold. The offset value may be between an end of a last symbol of a physical downlink control channel comprising the one or more DCI and a beginning of a first symbol of the one or more first CSI-RSs and/or the one or more second CSI-RSs. The wireless device may receive one or more second CSI-RSs based on a CORESET with a lowest identity of the one or more second CORESETs, for example, based on (e.g., after or in response to) an offset value being equal to or less than a time threshold. The offset value may be between an end of a last symbol of a physical downlink control channel comprising the one or more DCI and a beginning of a first symbol of the one or more first CSI-RSs and/or the one or more second CSI-RSs.

As described herein, for example, a wireless device may receive configuration parameters from a base station. The configuration parameters may indicate TCI states for physical downlink share channels (PDSCHs). The configuration parameters may indicate one or more first PDSCHs associated with a first CORESET pool index. The configuration parameters may indicate one or more second PDSCHs associated with a second CORESET pool index. The wireless device may receive a MAC CE activating: one or more first TCI sates, of the TCI states, for the one or more first PDSCHs; and/or one or more second TCI sates, of the TCI states, for the one or more second PDSCHs. The wireless device may receive one or more downlink control information (DCI) triggering: one or more first CSI-RSs associated with the first CORESET pool index; and/or one or more second CSI-RSs associated with the second CORESET pool index. The wireless device may receive the one or more first CSI-RSs based on a TCI state with a lowest identity of the one or more first TCI states. The wireless device may receive the one or more first CSI-RSs, for example, based on (e.g., after or in response to) an offset value being equal to or less than a time threshold. The offset value may be between an end of a last symbol of a physical downlink control channel comprising the one or more DCI and a beginning of a first symbol of the one or more first CSI-RSs and/or the one or more second CSI-RSs. The wireless device may receive the one or more second CSI-RSs based on a TCI state with a lowest identity of the one or more second TCI states. The wireless device may receive the one or more second CSI-RSs, for example, based on (e.g., after or in response to) an offset value being equal to or less than a time threshold. The offset value may be between an end of a last symbol of a physical downlink control channel comprising the one or more DCI and a beginning of a first symbol of the one or more first CSI-RSs and/or the one or more second CSI-RSs.

Figure 20A:
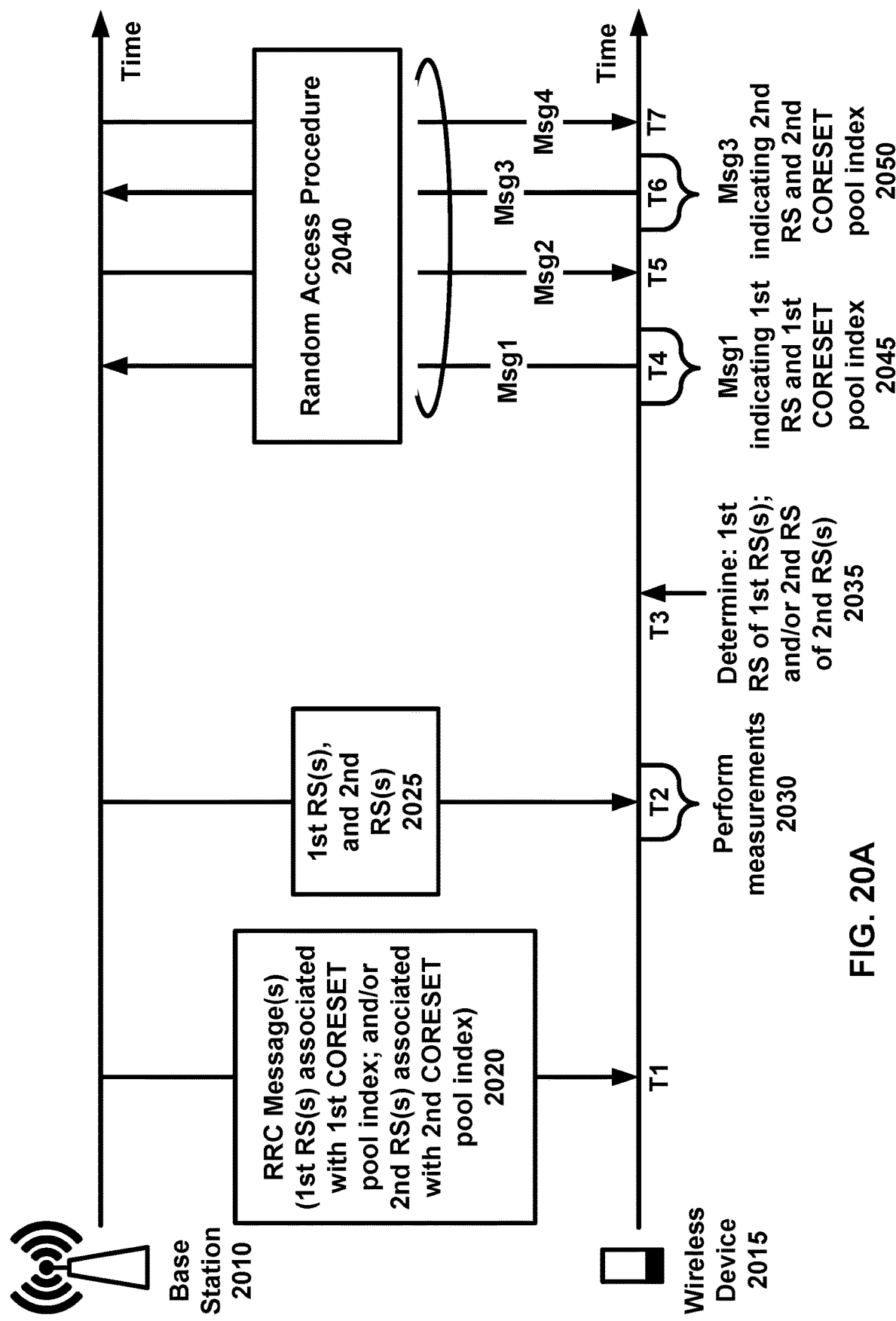
FIG. 20A shows an example of beam determination procedures.
Figure 21:
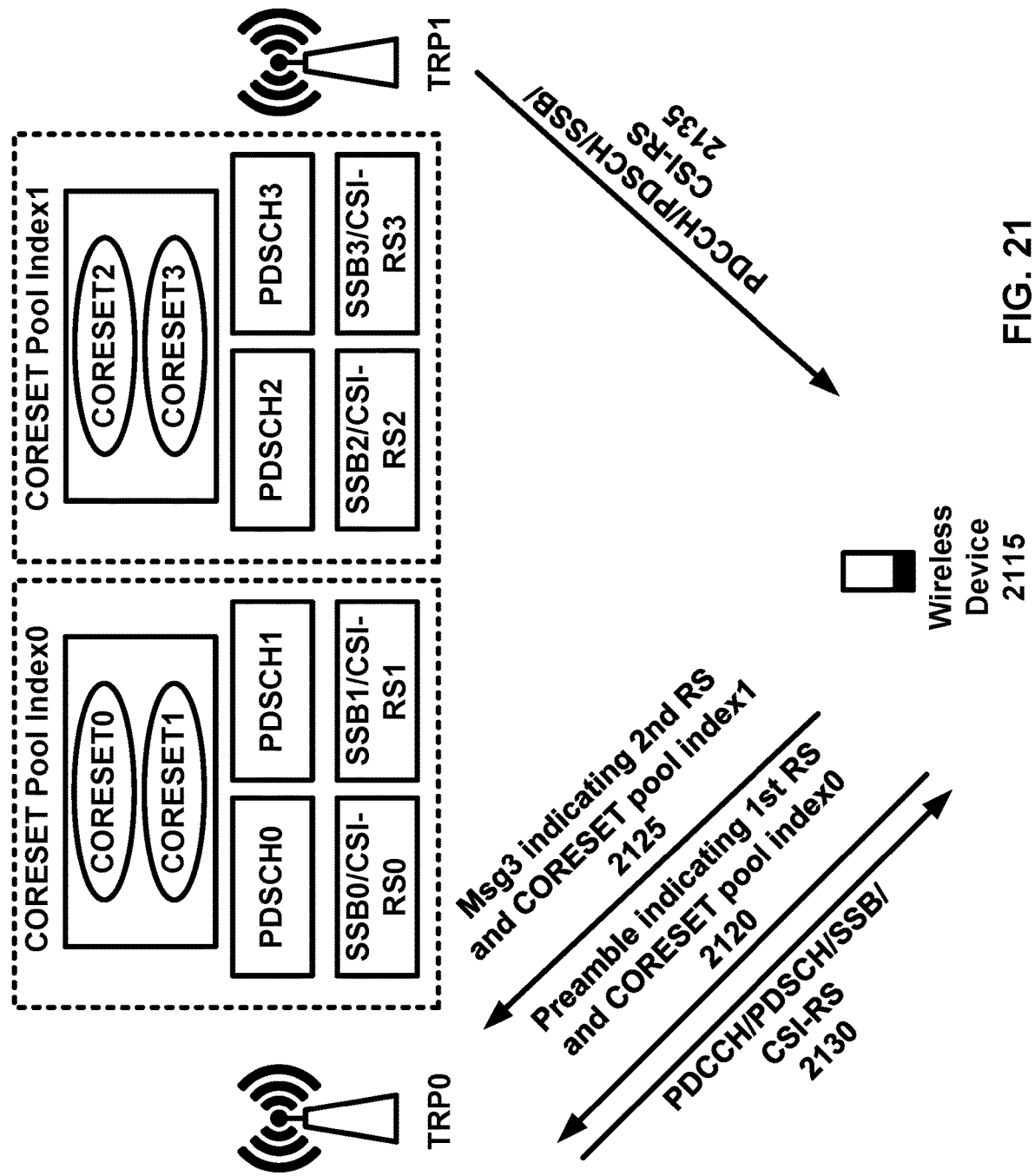
FIG. 21 shows an example of beam determination procedures with multiple nodes.

FIG. 20A shows an example of beam determination procedures. The beam determination procedures may be of random access procedures with multiple TRPs. A wireless device (e.g., wireless device 2015) may receive, from a base station (e.g., base station 2010), one or more RRC messages (e.g., RRC message(s) 2020) comprising configuration parameters (e.g., at time T1 as shown in FIG. 20A). The configuration parameters may indicate one or more first RSs associated with a first CORESET pool index (e.g., as shown in FIG. 21). The configuration parameters may indicate one or more second RSs associated with a second CORESET pool index (e.g., as shown in FIG. 21). The first CORESET pool index may correspond to a first TRP. The second CORESET pool index may correspond to a second TRP. The association between the one or more first RSs and the first CORESET pool index may indicate that the one or more first RSs are sent (e.g., transmitted) from the first TRP (e.g., as shown in FIG. 21). The association between the one or more second RSs and the second CORESET pool index may indicate that the one or more second RSs are sent (e.g., transmitted) from the second TRP (e.g., as shown in FIG. 21). The association between the one or more first RSs and the first CORESET pool index may indicate that the one or more first RSs are configured with the same first CORESET pool index (e.g., configured in the one or more RRC messages). The association between the one or more second RSs and the second CORESET pool index may indicate that the one or more second RSs are configured with the same second CORESET pool index (e.g., configured in the one or more RRC messages). As shown at element 2025 of FIG. 20A, the wireless device may receive the one or more first RSs from the base station via the first TRP (e.g., as also shown in FIG. 21). As shown at element 2025 of FIG. 20A, the wireless device may receive the one or more second RSs from the base station via the second TRP (e.g., as shown in FIG. 21).

As shown at element 2030 of FIG. 20A, the wireless device (e.g., wireless device 2015) may perform measurements of the one or more first RSs and the one or more second RSs (e.g., at time T2). The measurements may comprise one or more measurements of reference signal received power (RSRP) values of the one or more first RSs and the one or more second RSs. The measurements may comprise one or more measurements of reference signal received quality (RSRQ) values (e.g., signal-to-interference-plus-noise ratio (SINR) values) of the one or more first RSs and the one or more second RSs. As shown at element 2035 of FIG. 20A, the wireless device may determine: a first RS of the one or more first RSs; and/or a second RS of the one or more second RSs (e.g., at time T3). The wireless device may determine the first RS, for example, based on (e.g., after or in response to) the first RS with an RSRP value being equal to or greater than an RSRP threshold value. The wireless device may determine the first RS, for example, based on (e.g., after or in response to) the first RS with an SINR value being equal to or greater than an SINR threshold value. The wireless device may determine the second RS, for example, based on (e.g., after or in response to) the second RS with an RSRP value being equal to or greater than an RSRP threshold value. The wireless device may determine the second RS, for example, based on (e.g., after or in response to) the second RS with an SINR value being equal to or greater than the SINR threshold value. The configuration parameters may indicate the RSRP threshold value. The configuration parameters may indicate the SINR threshold value. The wireless device may perform a random access procedure (e.g., random access procedure 2040) with the base station. The random access procedure may be a four-step contention-based random access procedure (e.g., as shown in FIG. 13A) and/or a two-step random access procedure (e.g., as shown in FIG. 13C). The wireless device may determine a preamble associated with the first RS based on an association relationship between the first RS and the preamble. The configuration parameters may indicate the association relationship between the first RS and the preamble. As shown at element 2045 of FIG. 20A, the wireless device may send (e.g., transmit), to the base station, the preamble (or Msg 1) of the random access procedure. The wireless device may send (e.g., transmit) the preamble (or Msg 1) of the random access procedure, for example, via the first TRP at time T4. The Msg 1 sent by the wireless device to the base station may be the preamble. The preamble (or Msg 1) sent by the wireless device may indicate the first RS and/or the first CORESET pool index. The wireless device may receive a random access response (or Msg 2) from the base station (e.g., at time T5 as shown in FIG. 20A), for example, based on (e.g., after or in response to) sending (e.g., transmitting) the preamble (or Msg 1). The random access response may comprise a grant, for example, an uplink grant. As shown at element 2050 of FIG. 20A, the wireless device may send (e.g., transmit), based on the random access response (e.g., based on the uplink grant), a transport block (or Msg 3) of the random access procedure (e.g., at time T6). The transport block, sent by the wireless device, may indicate the second RS and/or the second CORESET pool index.

Figure 22:
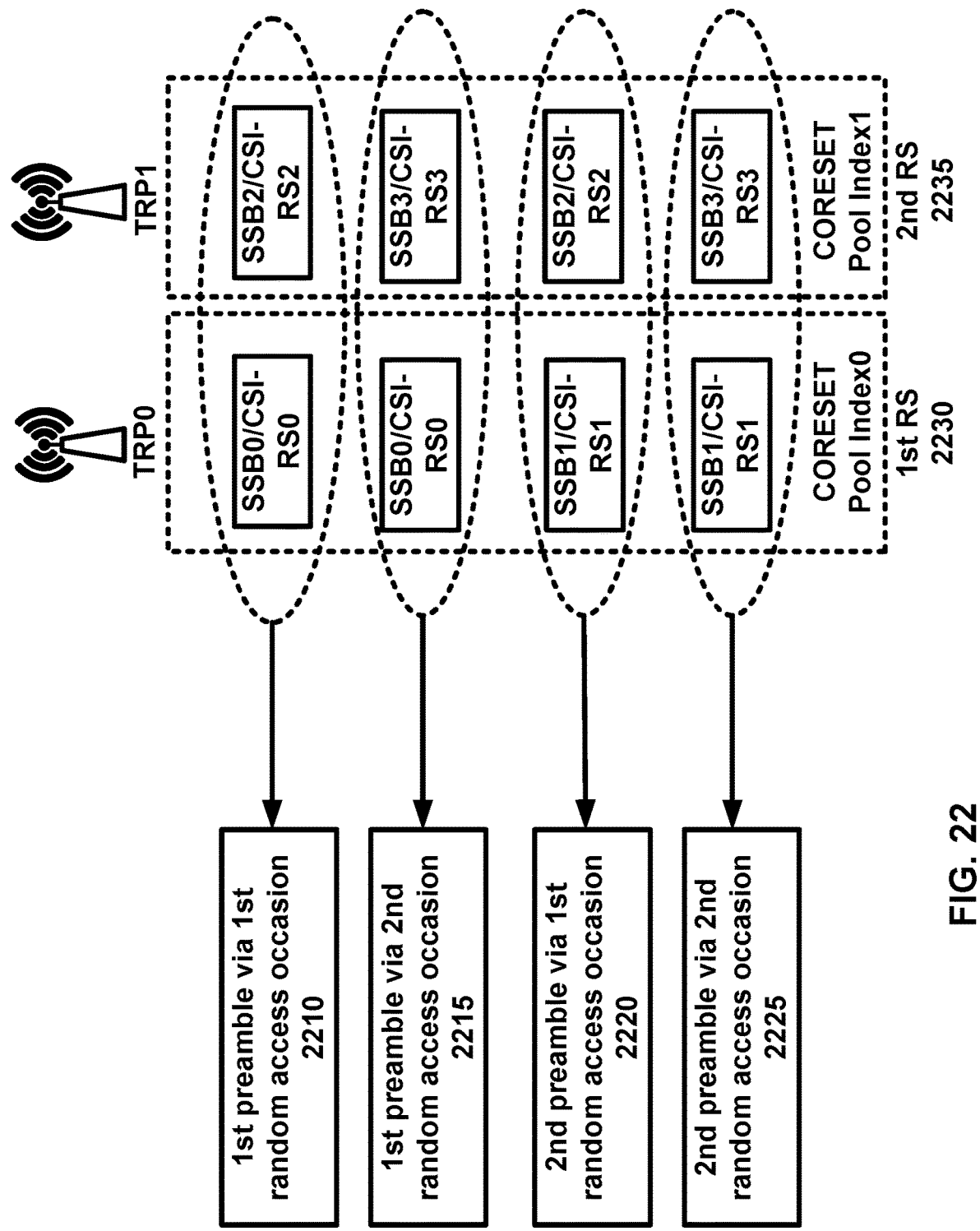
FIG. 22 shows an example of an association between preambles and reference signal (RSs) of multiple nodes.

The transport block may comprise a MAC CE indicating the second RS and the second CORESET pool index. The MAC CE may indicate one or more of: an index of the second RS, an RSRP value of the second RS, an SINR value of the second RS, or the second CORESET pool index. The wireless device may receive a second transport block (or Msg 4) from the base station (e.g., at time T7 as shown in FIG. 20A). The wireless device may receive the second transport block (or Msg 4) based on the first RS. The wireless device may receive, from the base station, the second transport block (or Msg 4) with a same spatial domain transmission filter as used for a reception of the first RS. The wireless device may assume that DMRS antenna port(s) associated with PDSCH comprising the second transport block are quasi collocated with the first RS. The wireless device may receive the second transport block (or Msg 4) based on the second RS. The wireless device may receive, from the base station, the second transport block (or Msg 4) with a same spatial domain transmission filter as used for a reception of the second RS. The wireless device may assume that the DMRS antenna port(s) associated with PDSCH comprising the second transport block are quasi collocated with the second RS. The wireless device may receive the second transport block (or Msg 4) based on the first RS and the second RS. The wireless device may receive, from the base station, the second transport block (or Msg 4) with a same spatial domain transmission filter as used for a reception of the first RS and a same spatial domain transmission filter as used for a reception of the second RS. The wireless device may assume that the DMRS antenna port(s) associated with first PDSCH (e.g., associated with first CORESET pool index or first TRP) comprising the second transport block are quasi collocated with the first RS. The wireless device may assume that the DMRS antenna port(s) associated with second PDSCH (e.g., associated with second CORESET pool index or second TRP) comprising the second transport block are quasi collocated with the second RS. The preamble, of the random access procedure (e.g., random access procedure 2040), may indicate the first RS and the second RS (e.g., as shown in FIG. 22). The preamble, of the random access procedure, may indicate one or more of: an index of the first RS, an index of the second RS, the first CORESET pool index, or the second CORESET pool index.

The random access procedure may be a two-step random access procedure (e.g., as shown in FIG. 13C). The two-step random access procedure may comprise transmission of a first message (e.g., Msg A) and reception of a second message (e.g., Msg B) by the wireless device. The first message (e.g., Msg A) may comprise the preamble and the transport block. The preamble may indicate the first RS and/or the first CORESET pool index. The transport block of the first message (e.g., Msg A) may indicate the second RS and/or the second CORESET pool index. The transport block may comprise a MAC CE indicating the second RS and the second CORESET pool index. The MAC CE may indicate one or more of: an index of the second RS, an RSRP value of the second RS, an SINR value of the second RS, or the second CORESET pool index. The second message (e.g., Msg B) may comprise the random access response and the second transport block. The random access procedure may be a two-step contention-free random access procedure (e.g., as shown in FIG. 13B). The two-step contention-free random access procedure may comprise transmission of the preamble and reception of the random access response by the wireless device. The preamble, of two-step contention-free random access procedure, may indicate the first RS and the second RS (e.g., as shown in FIG. 22). The random access procedure may be enhanced by indicating multiple RSs to the base station, for example, during the random access procedure for multiple TRP system. The multiple RSs indicated by the random access procedure improves the performance and reliability of beam management for the multiple TRP system.

Figure 20B:
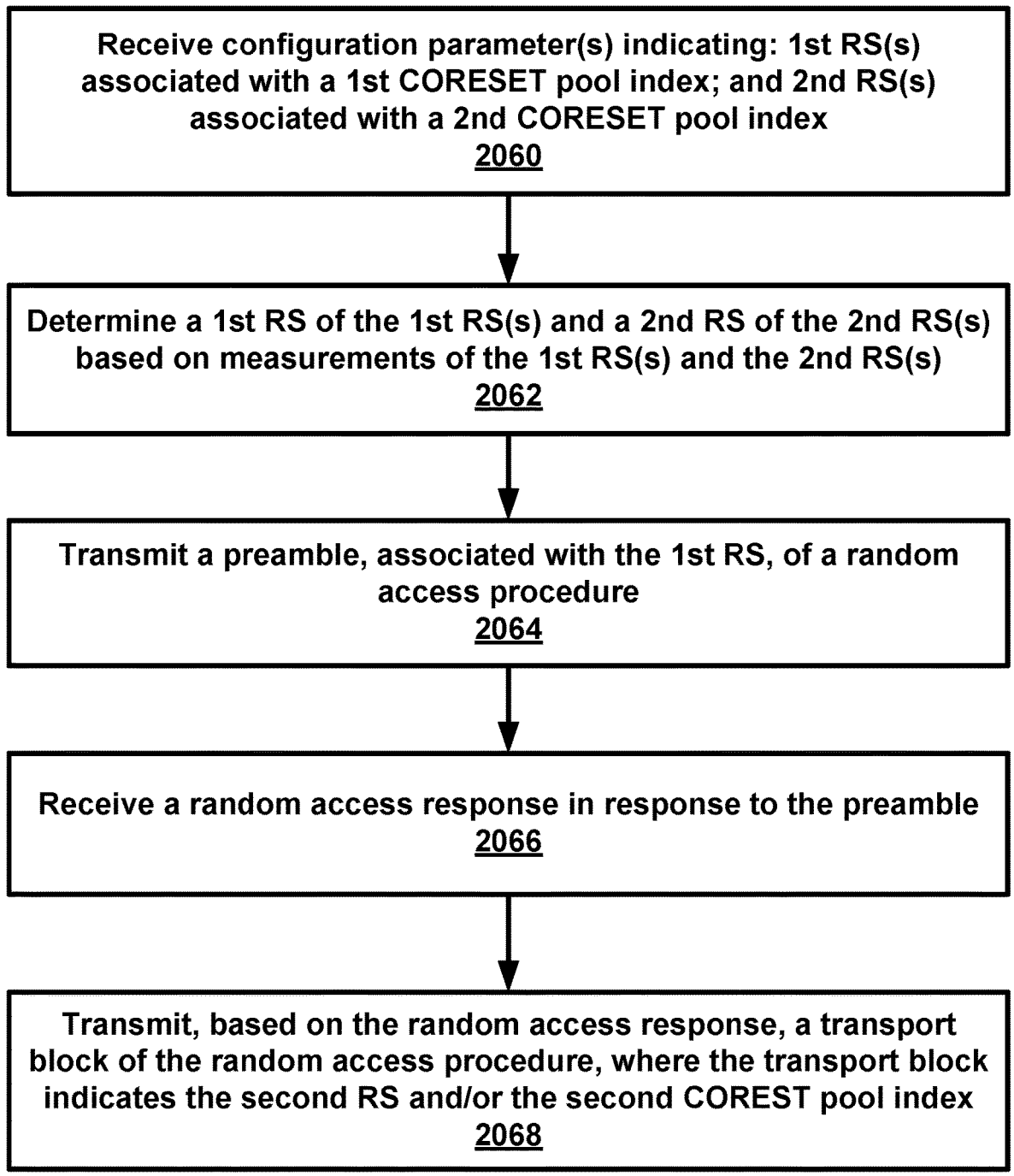
FIG. 20B and FIG. 20C show example methods of beam determination procedures.
Figure 20C:
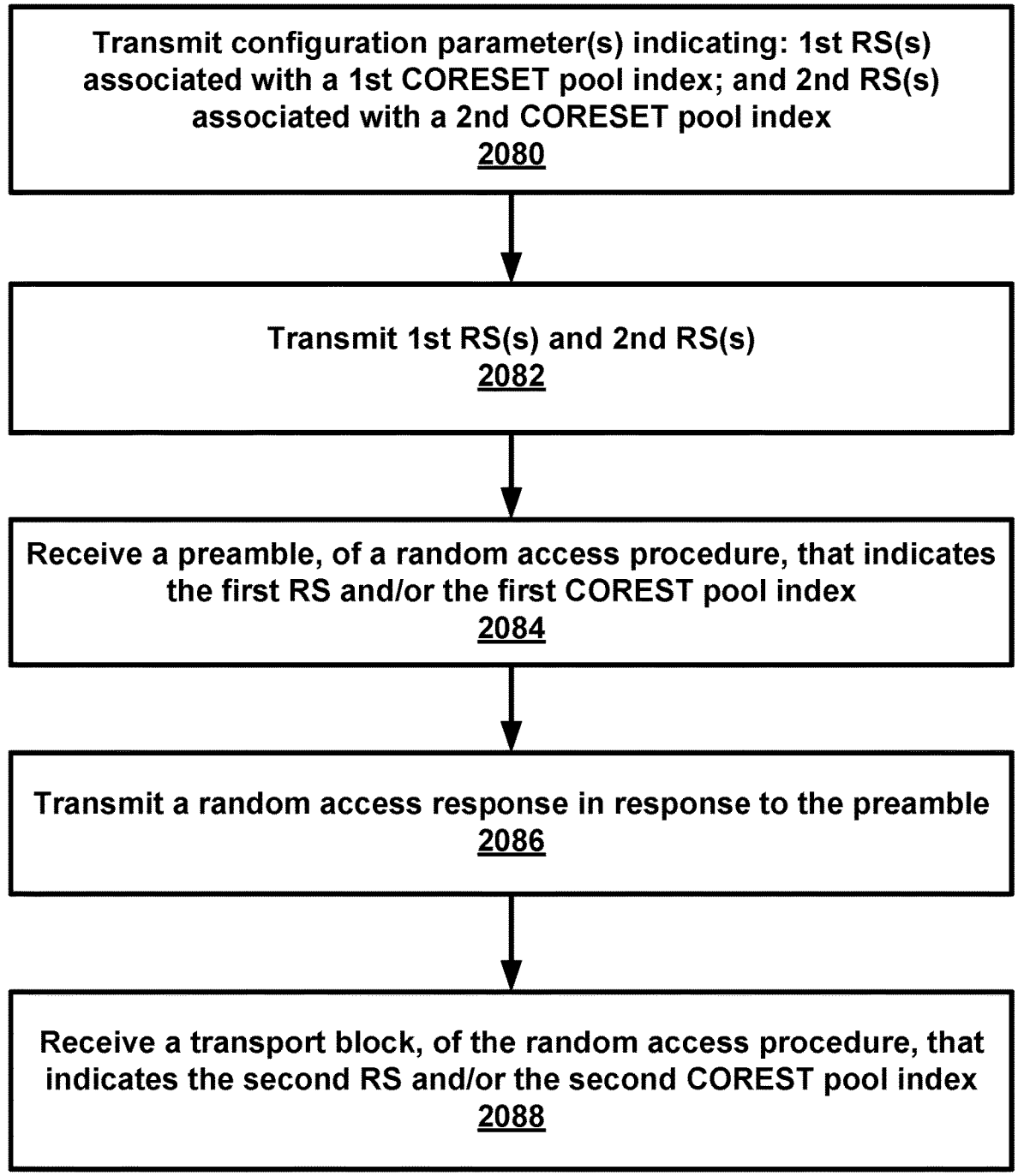

FIGS. 20B and 20C show examples of a method for beam determination procedures. The beam determination procedures may be for random access procedures with multiple TRPs. A wireless device may receive one or more configuration parameters from a base station (e.g., at step 2060 as shown in FIG. 20B). A device (e.g., the base station, a relay, another wireless device, etc.) may send (e.g., transmit) the one or more configuration parameters (e.g., at step 2080 as shown in FIG. 20C). The configuration parameters may indicate first RSs. The configuration parameters may indicate first RSs associated with a first CORESET pool index. The configuration parameters may indicate second RSs. The configuration parameters may indicate second RSs associated with a second CORESET pool index. The device (e.g., the base station) may send (e.g., transmit) to the wireless device the first RSs and the second RSs (or an indication of the first RSs and the second RSs) (e.g., at step 2082 as shown in FIG. 20C). The wireless device may receive the first RSs and the second RSs (or an indication of the first RSs and the second RSs). The wireless device may determine a first RS of the first RSs and a second RS of the second RSs based on measurements of the first RSs and the second RSs (e.g., at step 2062 as shown in FIG. 20B). The wireless device may send (e.g., transmit) a preamble, associated with the first RS, of a random access procedure (e.g., at step 2064 as shown in FIG. 20B). The device (e.g., base station) may receive the preamble, associated with the first RS, of a random access procedure (e.g., at step 2084 as shown in FIG. 20C). The preamble may indicate the first RS, and/or the first CORESET pool index. The wireless device may receive a random access response. The wireless device may receive a random access response, for example, based on (e.g., after or in response to) the sending (e.g., transmitting) the preamble (e.g., at step 2066 as shown in FIG. 20B). The base station may send (e.g., transmit) a random access response. The base station may send (e.g., transmit) a random access response, for example, based on (e.g., after or in response to) the receiving the preamble (e.g., at step 2086 as shown in FIG. 20C). The wireless device may send (e.g., transmit), based on the random access response, a transport block of the random access procedure (e.g., at step 2068 as shown in FIG. 20B). The device (e.g., the base station) may receive a transport block of the random access procedure (e.g., at step 2088 as shown in FIG. 20C). The transport block may indicate the second RS, and/or the second CORESET pool index.

FIG. 21 shows an example of beam determination procedures. The beam determination procedures may be for PDCCHs and PDSCHs with multiple TRPs. A wireless device (e.g., wireless device 2115) may receive the one or more RRC messages comprising the configuration parameters (e.g., as shown in FIG. 20A). The configuration parameters may indicate one or more first RSs associated with a first CORESET pool index and one or more second RSs associated with a second CORESET pool index. The first CORESET pool index may correspond to a first TRP. The first TRP may be TRP0. The second CORESET pool index may correspond to a second TRP. The second TRP may be TRP1. The first CORESET pool index may be CORESET pool index0. The second CORESET pool index may be CORESET pool index1. The first RSs may comprise SS/PBCH block0 (SSB0)/CSI-RS0 and SS/PBCH block1 (SSB1)/CSI-RS1. The second RSs may comprise SS/PBCH block2 (SSB2)/CSI-RS2 and SS/PBCH block3 (SSB3)/CSI-RS3. The wireless device may receive the first RSs from the first TRP. The wireless device may receive the second RSs from the second TRP. The configuration parameters may indicate first CORESETs associated with the CORESET pool index0. The first CORESETs may comprise CORESET0 and CORESET1. The wireless device may receive the first CORESETs from the first TRP. The configuration parameters may indicate second CORESETs associated with the CORESET pool index1. The second CORESETs may comprise CORESET2 and CORESET3.

The wireless device may receive the second CORESETs from the second TRP. The configuration parameters may indicate first PDSCHs associated with the CORESET pool index0. The first PDSCHs may comprise PDSCH0 and PDSCH1. The wireless device may receive the first PDSCHs from the first TRP (e.g., as shown at element 2130 of FIG. 21). The configuration parameters may indicate second PDSCHs associated with the CORESET pool index1. The second PDSCHs may comprise PDSCH2 and PDSCH3. The wireless device may receive the second PDSCHs from the second TRP (e.g., as shown at element 2135 of FIG. 21). The wireless device may determine the first RS and the second RS based on measurements of the first RSs and the second RSs (e.g., as illustrated in FIG. 20). The wireless device may send (e.g., transmit) the preamble associated with the first RS (e.g., as illustrated in FIG. 20 and as shown at element 2120 of FIG. 21). The preamble may indicate the first RS (e.g., SSB0/CSI-RS0 or SSB1/CSI-RS1) and/or the first CORESET pool index (e.g., CORESET pool index0). The wireless device may send (e.g., transmit) a transport block (or Msg 3) indicating the second RS (e.g., SSB2/CSI-RS2 or SSB3/CSI-RS3) and/or the second CORESET pool index (e.g., CORESET pool index1) (e.g., as illustrated in FIG. 20 and as shown at element 2125 of FIG. 21).

FIG. 22 shows an example of an association between preambles and RSs. The association may be between preambles and RSs of multiple TRPs. The configuration parameters, sent from the base station to the wireless device, may indicate an association between the first RSs and the first CORESET pool index (e.g., as shown in FIG. 20A). The first RSs may comprise SSB0/CIS-RS0, SSB1/CSI-RS1. The configuration parameters may indicate an association between the second RSs and the second CORESET pool index (e.g., as shown in FIG. 20A). The first CORESET pool index may be CORESET pool index0. The second CORESET pool index may be CORESET pool index1. The second RSs may comprise SSB2/CIS-RS2, SSB3/CSI-RS3. The wireless device may use one or more messages to indicate RSs and corresponding CORESET pool indices (e.g., TRPs) to a base station. The wireless device may send the one or more messages, for example, as part of a random access procedure. The wireless device may indicate RSs and corresponding CORESET pool indices (e.g., TRPs) to a base station using one or more messages (e.g., one or more preambles) and one or more random access occasions. The wireless device may indicate, to the base station, the RSs and corresponding CORESET pool indices using a combination of the one or more messages (e.g., one or more preambles) and the one or more random access occasion. One or more different random access occasions may indicate different resources in time and/or frequency. The base station may configure a preamble, of a random access procedure, and a random access occasion to be associated with one or more RSs corresponding to one or more CORESET pool indices. The base station may configure a preamble, of a random access procedure, and a random access occasion to be associated with one or more RSs corresponding to one or more TRPs (e.g., TRP0 and TRP1). The configuration parameters, sent from the base station to the wireless device, may indicate an association between a combination of a preamble and a random access occasion and one or more RSs corresponding to one or more CORESET pool indices (e.g., one or more TRPs). The configuration parameters may indicate, for example, an association between a first preamble via a first random access occasion and a first RS corresponding to a first TRP. The configuration parameters may indicate, for example, an association between the first preamble via the first random access occasion and a second RS corresponding to a second TRP. Any combination of preambles and/or random access occasions may be associated with an RS, and indicated to the wireless device via configuration parameters sent from the base station. Any combination of preambles and/or random access occasions may be associated with an RS corresponding to each of the one or more TRPs (e.g., TRP0 and TRP1), and indicated to the wireless device via configuration parameters sent from the base station.

A wireless device may send (e.g., transmit) a first preamble via a first random access occasion. The wireless device may send (e.g., transmit) a first preamble via a first random access occasion, for example, based on (e.g., in response to): the first RS (e.g., first RS 2230) being SSB0/CSI-RS0; and the second RS (e.g., first RS 2235) being SSB2/CSI-RS2. The first preamble sent (e.g., transmitted) via the first random access occasion may indicate the first RS (e.g., SSB0/CSI-RS0) and the second RS (e.g., SSB2/CSI-RS2), as shown at element 2210 of FIG. 22. The wireless device may send (e.g., transmit) a first preamble via a second random access occasion. The wireless device may send (e.g., transmit) the first preamble via the second random access occasion, for example, based on (e.g., in response to): the first RS being SSB0/CSI-RS0; and the second RS being SSB3/CSI-RS3.

The first preamble sent (e.g., transmitted) via the second random access occasion may indicate the first RS (e.g., SSB0/CSI-RS0) and the second RS (e.g., SSB3/CSI-RS3), as shown at element 2215 of FIG. 22. A wireless device may send (e.g., transmit) a second preamble via the first random access occasion. The wireless device may send (e.g., transmit) a second preamble via the first random access occasion, for example, based on (e.g., in response to): the first RS being SSB1/CSI-RS1; and the second RS being SSB2/CSI-RS2. The second preamble sent (e.g., transmitted) via the first random access occasion may indicate the first RS (e.g., SSB1/CSI-RS1) and the second RS (e.g., SSB2/CSI-RS2), as shown at element 2220 of FIG. 22. A wireless device may send (e.g., transmit) the second preamble via the second random access occasion. The wireless device may send (e.g., transmit) the second preamble via the second random access occasion, for example, based on (e.g., in response to): the first RS being SSB1/CSI-RS1; and the second RS being SSB3/CSI-RS3. The second preamble sent (e.g., transmitted) via the second random access occasion may indicate the first RS (e.g., SSB1/CSI-RS1) and the second RS (e.g., SSB3/CSI-RS3), as shown at element 2225 of FIG. 22. The preamble may indicate one or more of: an index of the first RS, an index of the second RS, the first CORESET pool index, the second CORESET pool index. Various combinations of one or more preambles via one or more random access occasions may be used by the wireless device to indicate the first RS and the second RS. The wireless device may send (e.g., transmit) the first preamble, for example, via a third random access occasions based on (e.g., in response to): the first RS being SSB1/CSI-RS1; and the second RS being SSB2/CSI-RS2. The first preamble sent (e.g., transmitted) via the third random access occasion may indicate the first RS (e.g., SSB1/CSI-RS1) and the second RS (e.g., SSB2/CSI-RS2). The wireless device may send (e.g., transmit) a third preamble, for example, via a random access occasions (e.g., the first or third random access occasions) based on (e.g., in response to): the first RS being SSB0/CSI-RS10; and the second RS being SSB3/CSI-RS3. The third preamble sent (e.g., transmitted) via the random access occasion (e.g., the first or third random access occasions) may indicate the first RS (e.g., SSB0/CSI-RS0) and the second RS (e.g., SSB3/CSI-RS3). By using a preamble (e.g., Msg1) transmission(s) to indicate the first RS and the second RS, the wireless device can avoid using a transport block (e.g., Msg3) transmission to indicate the second RS to the base station, thereby reducing signaling overhead, reducing consumption of resources, and improving the performance and reliability of beam management for the multiple TRP system.

Figure 23A:
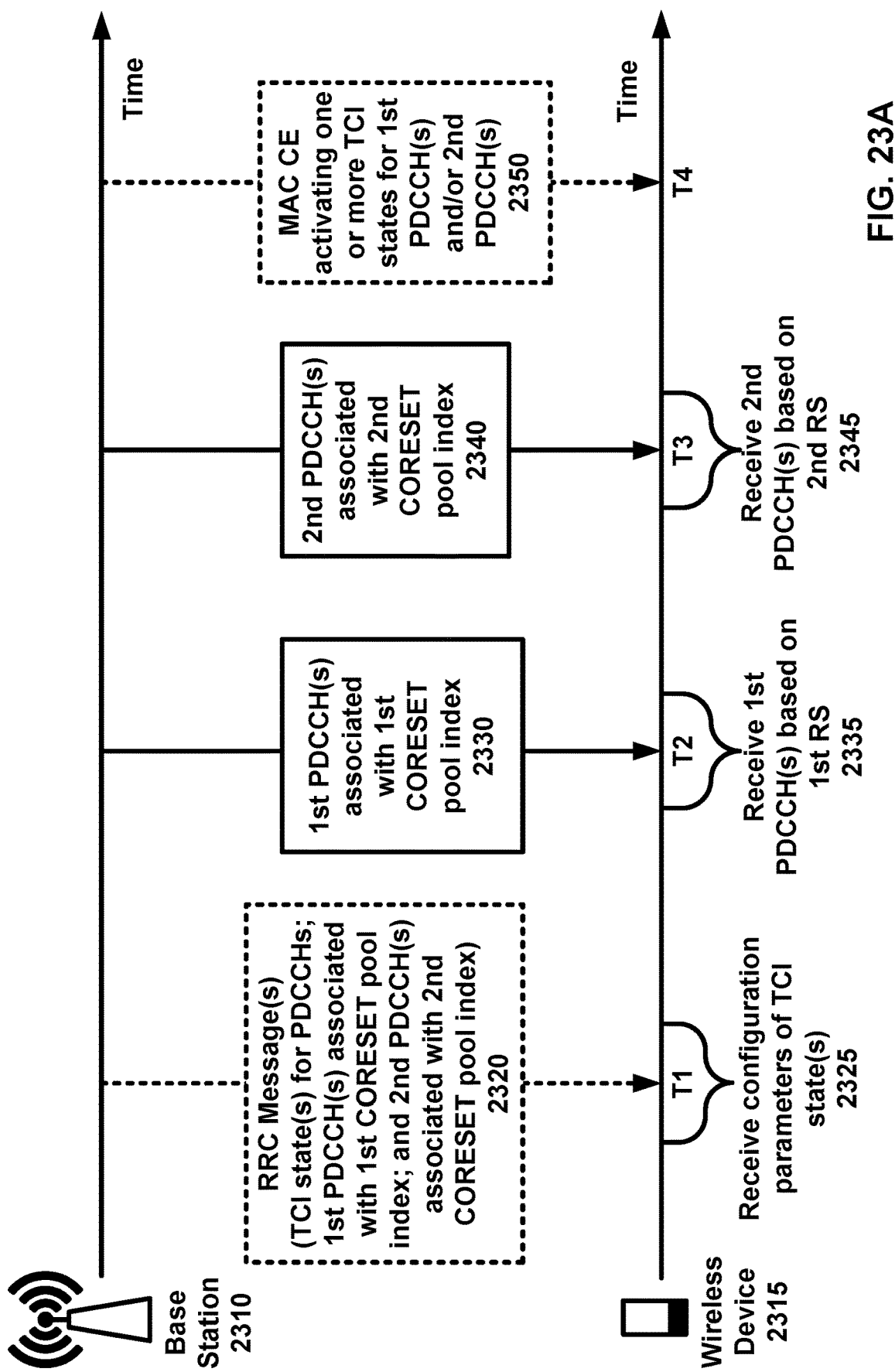
FIG. 23A shows an example of beam determination procedures with multiple nodes.

FIG. 23A shows an example of beam determination procedures. The beam determination procedures may be for PDCCHs with multiple TRPs. A wireless device (e.g., wireless device 2315) may receive, from a base station (e.g., base station 2310), one or more RRC messages (e.g., RRC messages 2320) comprising configuration parameters (e.g., at time T1 and as shown at element 2325 of FIG. 23A). The base station may send (e.g., transmit), to the wireless device, one or more RRC messages (e.g., RRC messages 2320) comprising configuration parameters. The configuration parameters may indicate a plurality of TCI states for PDCCHs (e.g., by tci-StatesPDCCH-ToAddList and tci-StatesPDCCH-ToReleaseList). The configuration parameters may indicate one or more first PDCCHs (or one or more first CORESETs) associated with a first CORESET pool index. The configuration parameters may indicate one or more second PDCCHs (or one or more second CORESETs) associated with a second CORESET pool index. The association between the one or more first PDCCHs (or the one or more first CORESETs) and the first CORESET pool index may indicate that the one or more first PDCCHs (or the one or more first CORESETs) are configured with the same first CORESET pool index. The association between the one or more second PDCCHs (or the one or more second CORESETs) and the second CORESET pool index may indicate that the one or more second PDCCHs (or the one or more second CORESETs) are configured with the same second CORESET pool index. The first CORESET pool index may correspond to a first TRP. The second CORESET pool index may correspond to a second TRP. The wireless device may determine a first RS of the one or more first RSs indicated via configuration parameters sent by the base station (e.g., as shown at element 2035 of FIG. 20A). The wireless device may determine a second RS of the one or more second RSs indicated via configuration parameters sent by the base station (e.g., as shown at element 2035 of FIG. 20A). The wireless device may determine the first RS and the second RS, for example, before receiving a PDCCH transmission associated with one or more CORESET pool indices (e.g., before T2 and T3 as shown in FIG. 23A). The wireless device may receive the one or more first PDCCH transmissions (or the one or more first CORESETs) from the base station via the first TRP (e.g., at time T2 and as shown at element 2335 of FIG. 23A). The base station may send (e.g., transmit) the one or more first PDCCH transmissions (or the one or more first CORESETs) to the wireless device via the first TRP.

The wireless device may receive the one or more second PDCCH transmissions (or the one or more second CORESETs) from the base station via the second TRP (e.g., at time T3). The base station may send (e.g., transmit) the one or more second PDCCH (or the one or more second CORESETs) to the wireless device via the second TRP. The one or more first PDCCHs may be associated with the first CORESET pool index, and the one or more second PDCCHs may be associated with the second CORESET pool index. The wireless device may receive the one or more first PDCCH transmissions (e.g., PDCCHs 2330) based on the first RS (e.g., as shown at element 2335 of FIG. 23A). The wireless device may receive the one or more second PDCCH transmissions (e.g., PDCCHs 2340) based on the second RS (e.g., as shown at element 2345 of FIG. 23A). The wireless device may receive: the one or more first PDCCH transmissions, associated with a first CORESET pool index, based on the first RS (e.g., as shown in FIG. 20A); and/or the one or more second PDCCH transmissions, associated with a second CORESET pool index, based on the second RS (e.g., as shown in FIG. 20A). The wireless device may receive the one or more first PDCCH transmissions and/or the one or more second PDCCH transmissions, for example, before receiving a MAC CE activating command (e.g., MAC CE activating command 2350) of one or more TCI states, of the plurality of TCI states, for the one or more first PDCCHs (or the one or more first CORESETs) and/or the one or more second PDCCHs (or the one or more second CORESETs) The wireless device may receive the one or more first CORESETs based on the first RS (e.g., as shown in FIG. 20A); and/or the one or more second CORESETs based on the second RS (e.g., as shown in FIG. 20A), for example, before receiving a MAC CE activating command of one or more TCI states, of the plurality of TCI states, for the one or more first CORESETs and/or the one or more second CORESETs. The wireless device may receive the MAC CE (e.g., MAC CE 2350) from the base station (e.g., at time T4). If the wireless device has not been provided configuration parameters indicating the plurality of TCI states for the one or more first PDCCHs (or the one or more first CORESETs) and the one or more second PDCCHs (or the one or more second CORESETs), the wireless device may receive: the one or more first PDCCH transmissions (or the one or more first CORESETs) based on the first RS (e.g., as shown in FIG. 20A); and/or the one or more second PDCCH transmissions (or the one or more second CORESETs) based on the second RS (e.g., as shown in FIG. 20A). The wireless device may receive the one or more first PDCCH transmissions (or the one or more first CORESETs) with a same spatial domain transmission filter as used for a reception of the first RS (e.g., as shown in FIG. 20A). The wireless device may receive the one or more second PDCCH transmissions (or the one or more second CORESETs) with a same spatial domain transmission filter as used for a reception of the second RS (e.g., as shown in FIG. 20A). The wireless device may assume that DMRS antenna port(s) associated with the one or more first PDCCHs (or the one or more first CORESETs) reception are quasi co-located with the first RS (e.g., as shown in FIG. 20A). The wireless device may assume that DMRS antenna port(s) associated with the one or more second PDCCHs (or the one or more second CORESETs) reception are quasi co-located with the second RS (e.g., as shown in FIG. 20A).

FIG. 23B and FIG. 23C show example methods of beam determination procedures. The beam determination procedures may be for PDCCHs with multiple TRPs. A wireless device may receive one or more configuration parameters from a base station (e.g., at step 2360 as shown in FIG. 23B). A device (e.g., the base station, a relay, another wireless device, etc.) may send (e.g., transmit) the one or more configuration parameters (e.g., at step 2380 as shown in FIG. 23C). The configuration parameters may indicate a plurality of TCI states for PDCCHs (e.g., by tci-StatesPDCCH-ToAddList and tci-StatesPDCCH-ToReleaseList). The configuration parameters may indicate one or more first PDCCHs (or one or more first CORESETs) associated with a first CORESET pool index. The configuration parameters may indicate one or more second PDCCHs (or one or more second CORESETs) associated with a second CORESET pool index. The device (e.g., the base station) may send (e.g., transmit) to the wireless device the first RSs and the second RSs (or an indication of the first RSs and the second RSs) (e.g., at step 2382 as shown in FIG. 23C). The wireless device may receive the first RSs and the second RSs (or an indication of the first RSs and the second RSs). The wireless device may determine a first RS of the first RSs and a second RS of the second RSs based on measurements of the first RSs and the second RSs (e.g., at step 2362 as shown in FIG. 23B).

The wireless device may receive one or more first PDCCH transmissions, associated with the first CORESET pool index, based on the first RS (e.g., at step 2364 as shown in FIG. 23B). The device (e.g., base station) may send (e.g., transmit), to the wireless device, the one or more first PDCCH associated with the first CORESET pool index (e.g., at step 2384 as shown in FIG. 23C). The wireless device may receive one or more second PDCCHs, associated with the second CORESET pool index, based on the second RS (e.g., at step 2366 as shown in FIG. 23B). The device (e.g., base station) may send (e.g., transmit), to the wireless device, the one or more second PDCCHs associated with the second CORESET pool index (e.g., at step 2386 as shown in FIG. 23C). The wireless device may receive, from the base station, the MAC CE command to activate the one or more TCI states, of the plurality of TCI states, for the one or more first PDCCHs (or the one or more first CORESETs) and/or the one or more second PDCCHs (or the one or more second CORESETs) (e.g., at step 2368 as shown in FIG. 23B). The device (e.g., base station) may send (e.g., transmit) the MAC CE command to activate the one or more TCI states, of the plurality of TCI states, for the one or more first PDCCHs (or the one or more first CORESETs) and/or the one or more second PDCCHs (or the one or more second CORESETs) (e.g., at step 2388 as shown in FIG. 23C).

Figure 24A:
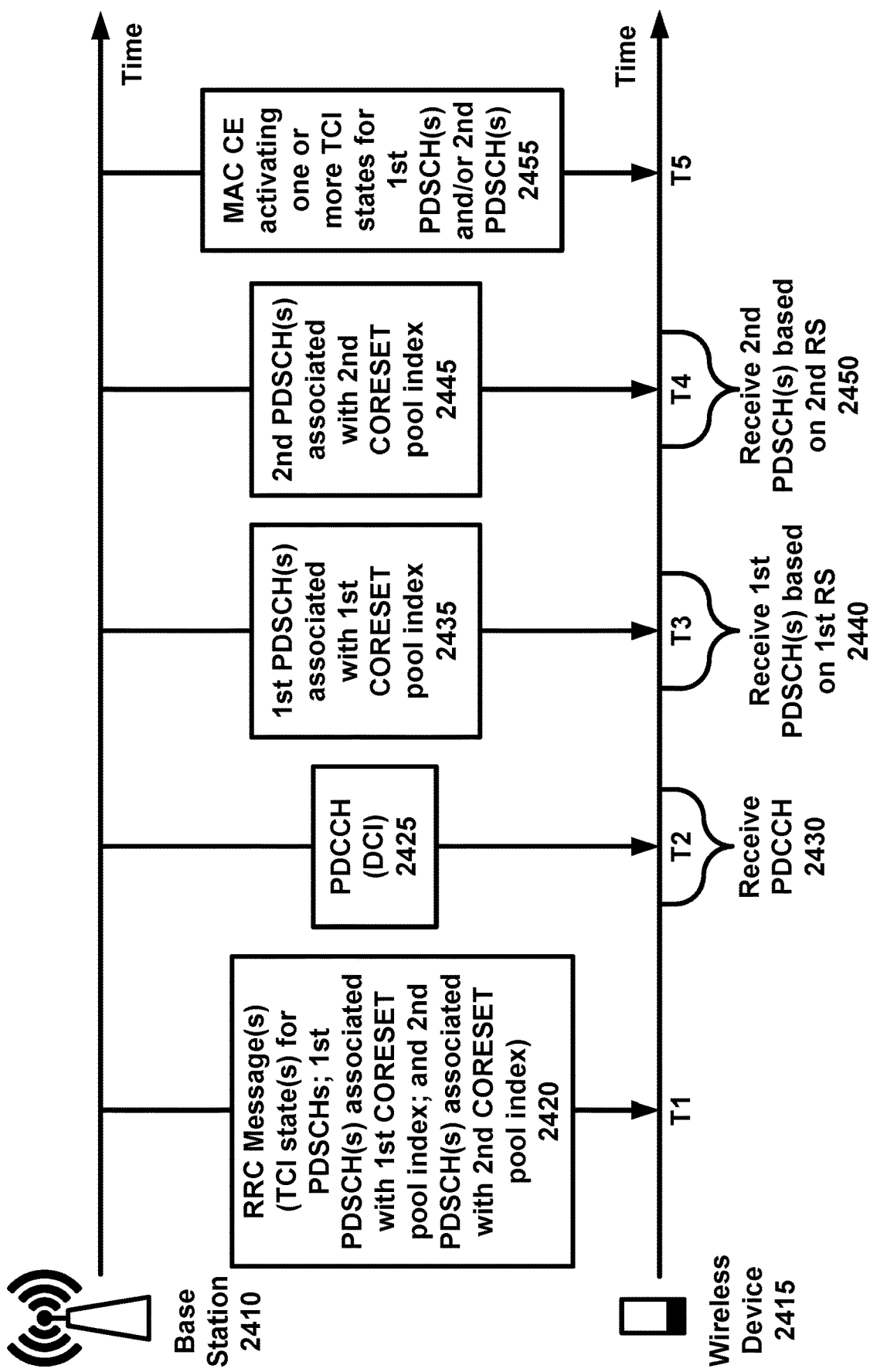
FIG. 24A shows an example of beam determination procedures with multiple nodes.

FIG. 24A shows an example of beam determination procedures. The beam determination procedures may be for PDSCHs with multiple TRPs. A wireless device (e.g., wireless device 2415) may receive, from a base station (e.g., base station 2410), one or more RRC messages (e.g., RRC messages 2420) comprising configuration parameters (e.g., at time T1 as shown in FIG. 24A). The configuration parameters may indicate a plurality of TCI states for PDSCHs (e.g., by tci-StatesToAddModList and tci-StatesToReleaseList). The configuration parameters may indicate one or more first PDSCHs associated with a first CORESET pool index. The configuration parameters may indicate one or more second PDSCHs associated with a second CORESET pool index. The association between the one or more first PDSCHs and the first CORESET pool index may indicate that the one or more first PDSCHs are configured with the same first CORESET pool index. The association between the one or more second PDSCHs and the second CORESET pool index may indicate that the one or more second PDSCHs are configured with the same second CORESET pool index. The first CORESET pool index may correspond to a first TRP. The second CORESET pool index may correspond to a second TRP. The configuration parameters may indicate the first RSs and the second RSs. The base station may send (e.g., transmit) to the wireless device the first RSs and the second RSs (or an indication of the first RSs and the second RSs). The wireless device may receive the first RSs and the second RSs (or an indication of the first RSs and the second RSs). The wireless device may determine a first RS of the first RSs and a second RS of the second RSs based on measurements of the first RSs and the second RSs. The wireless device may receive downlink receptions. The wireless device may receive, from a base station, downlink receptions, for example, PDCCH (e.g., as shown at element 2430 of FIG. 24A). The PDCCH may comprise/carry one or more downlink control information (DCI). The one or more downlink control information, received by the wireless device (e.g., at time T2 as shown in FIG. 24A), may schedule the one or more first PDSCH transmissions and the one or more second PDSCHs.

The wireless device may receive the one or more first PDSCHs from the base station via the first TRP (e.g., at time T3). The one or more first PDSCHs (e.g., PDSCH(s) 2435) may be associated with the first CORESET pool index. The wireless device may receive the one or more first PDSCH transmissions from the base station based on the first RS (e.g., as shown at element 2440 of FIG. 24A). The wireless device may receive the one or more second PDSCH transmissions from the base station via the second TRP (e.g., at time T4). The one or more second PDSCHs (e.g., PDSCH(s) 2445) may be associated with the second CORESET pool index. The wireless device may receive the one or more second PDSCH transmissions from the base station based on the second RS (e.g., as shown at element 2450 of FIG. 24A). A time offset, between an end of a last symbol of PDCCH(s) comprising the one or more DCIs and a beginning of a first symbol of the one or more first PDSCH transmissions and/or the one or more second PDSCH transmissions, may be equal to or greater than a time threshold. The time threshold may be indicated by the configuration parameters. The time threshold may comprise, for example, timeDurationForQCL as indicated by the configuration parameters. The wireless device may receive the one or more first PDSCH transmissions based on the first RS (e.g., as shown in FIG. 20A); and/or the one or more second PDSCH transmissions based on the second RS (e.g., as shown in FIG. 20A), for example, before receiving a MAC CE activating command (e.g., MAC CE 2455) of one or more TCI states, of the plurality of TCI states, for the one or more first PDSCHs and the one or more second PDSCHs. The wireless device may receive the one or more first PDSCH transmissions with a same spatial domain transmission filter as used for a reception of the first RS (e.g., as illustrated in FIG. 20A). The wireless device may receive the one or more second PDSCH transmissions with a same spatial domain transmission filter as used for a reception of the second RS (e.g., as illustrated in FIG. 20A). The wireless device may assume that DMRS antenna port(s) associated with the one or more first PDSCHs reception are quasi co-located with the first RS (e.g., as illustrated in FIG. 20A). The wireless device may assume that DMRS antenna port(s) associated with the one or more second PDSCHs reception are quasi co-located with the second RS (e.g., as illustrated in FIG. 20A). The wireless device may receive the MAC CE from the base station (e.g., at time T5 as shown in FIG. 24A).

FIG. 24B and FIG. 24C show example methods of beam determination procedures. The beam determination procedures may be for PDSCHs with multiple TRPs. A wireless device may receive one or more configuration parameters from a base station (e.g., at step 2460 as shown in FIG. 24B). A device (e.g., the base station, a relay, another wireless device, etc.) may send (e.g., transmit) the one or more configuration parameters (e.g., at step 2480 as shown in FIG. 24C). The configuration parameters may indicate a plurality of TCI states for PDSCHs (e.g., by tci-StatesToAddModList and tci-StatesToReleaseList). The configuration parameters may indicate one or more first PDSCHs associated with a first CORESET pool index. The configuration parameters may indicate one or more second PDSCHs associated with a second CORESET pool index. The device (e.g., the base station) may send (e.g., transmit) to the wireless device the first RSs and the second RSs (or an indication of the first RSs and the second RSs) (e.g., at step 2482 as shown in FIG. 24C). The wireless device may receive the first RSs and the second RSs (or an indication of the first RSs and the second RSs). The wireless device may determine a first RS of the first RSs and a second RS of the second RSs based on measurements of the first RSs and the second RSs (e.g., at step 2462 as shown in FIG. 24B).

The wireless device may receive one or more PDCCH transmissions (e.g., at step 2464 as shown in FIG. 24B). The one or more PDCCH transmissions may comprise/carry one or more DCI. The one or more PDCCH transmissions may be used to schedule one more of the first PDSCH transmissions and one more of the second PDSCH transmissions. The device (e.g., base station) may send (e.g., transmit), to the wireless device, the one or more PDCCHs (e.g., at step

2484 as shown in FIG. 24C). The device (e.g., base station) may send (e.g., transmit), to the wireless device, one or more first PDSCH(s). The device (e.g., base station) may send (e.g., transmit), to the wireless device, the one or more first PDSCH(s) associated with the first CORESET pool index (e.g., at step 2486 as shown in FIG. 24C). The wireless device may receive, from the base station, the one or more first PDSCH transmission(s) associated with the first CORESET pool index. The wireless device may receive the one or more first PDSCH transmission(s), associated with the first CORESET pool index, based on the first RS (e.g., at step 2466 as shown in FIG. 24B). The device (e.g., base station) may send (e.g., transmit), to the wireless device, one or more second PDSCH transmission(s). The device (e.g., base station) may send (e.g., transmit), to the wireless device, the one or more second PDSCH transmission(s) associated with the second CORESET pool index (e.g., at step 2488 as shown in FIG. 24C). The wireless device may receive, from the base station, the one or more second PDSCH transmission(s) associated with the second CORESET pool index. The wireless device may receive the one or more second PDSCH transmission(s), associated with the second CORESET pool index, based on the second RS (e.g., at step 2468 as shown in FIG. 24B). The device (e.g., base station) may send (e.g., transmit) the MAC CE command to activate the one or more TCI states, of the plurality of TCI states, for the one or more first PDSCH transmissions and/or the one or more second PDSCH transmissions (e.g., at step 2490 as shown in FIG. 24C). The wireless device may receive, from the base station, the MAC CE command to activate the one or more TCI states, of the plurality of TCI states, for the one or more first PDSCHs and/or the one or more second PDSCHs (e.g., at step 2470 as shown in FIG. 24B)

Figure 25A:
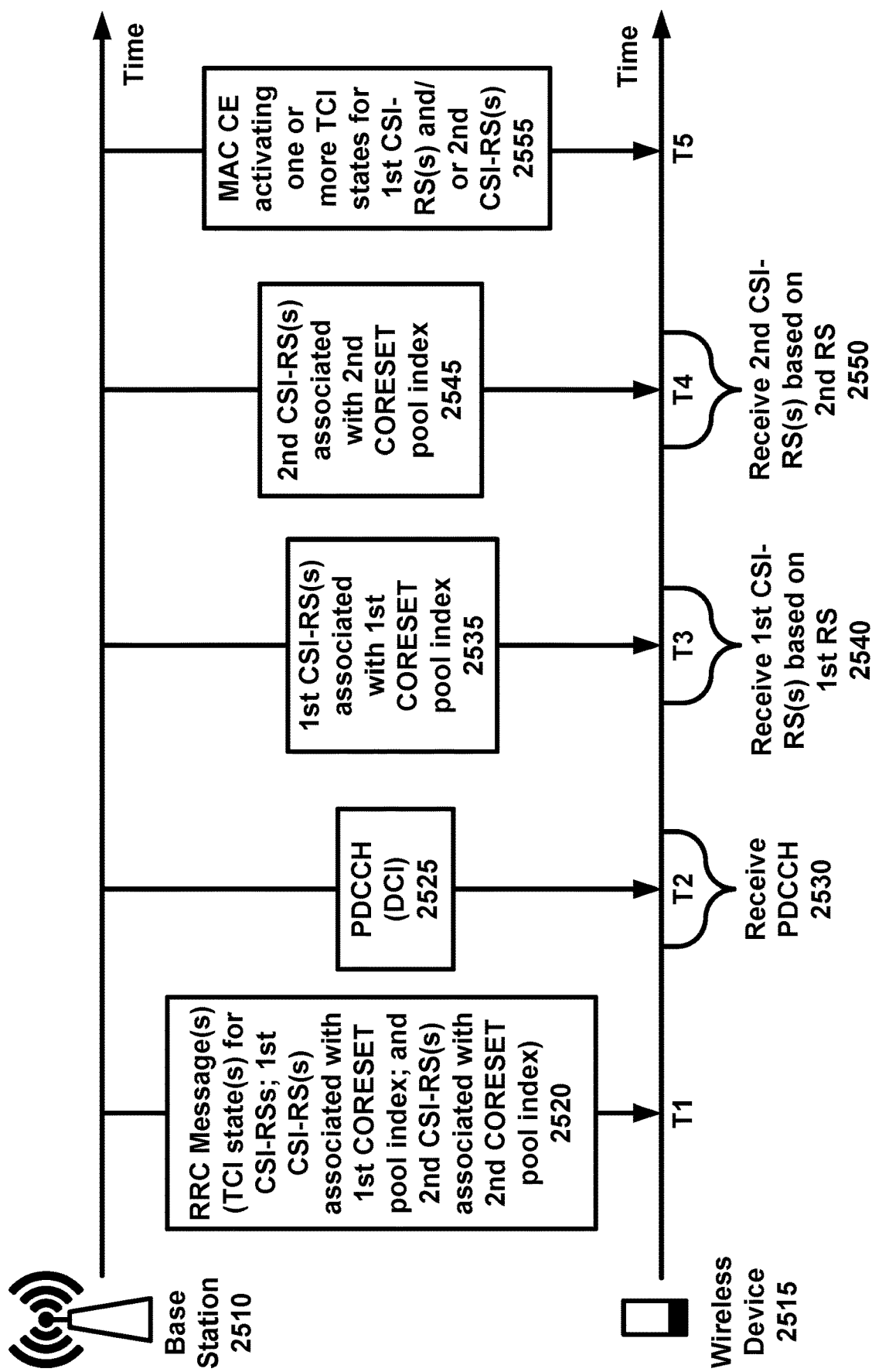
FIG. 25A shows an example of beam determination procedures with multiple nodes.

FIG. 25A shows an example of beam determination procedures. The beam determination procedures may be for CSI-RSs with multiple TRPs. A wireless device (e.g., wireless device 2515) may receive, from a base station (e.g., wireless device 2510), one or more RRC messages (e.g., RRC messages 2520) comprising configuration parameters (e.g., at time T1 as shown in FIG. 25A). The configuration parameters may indicate a plurality of TCI states for CSI-RSs. The configuration parameters may indicate a plurality of TCI states for PDCCHs of the multiple TRPs and/or for PDSCHs of the multiple TRPs. The configuration parameters may indicate one or more first CSI-RSs associated with a first CORESET pool index. The configuration parameters may indicate one or more second CSI-RSs associated with a second CORESET pool index. The association between the one or more first CSI-RSs and the first CORESET pool index may indicate that the one or more first CSI-RSs are configured with the same first CORESET pool index. The association between the one or more second CSI-RSs and the second CORESET pool index may indicate that the one or more second CSI-RSs are configured with the same second CORESET pool index. The first CORESET pool index may correspond to a first TRP. The second CORESET pool index may correspond to a second TRP. The configuration parameters may indicate the first RSs and the second RSs. The base station may send (e.g., transmit) to the wireless device the first RSs and the second RSs (or an indication of the first RSs and the second RSs). The wireless device may receive the first RSs and the second RSs (or an indication of the first RSs and the second RSs). The wireless device may determine a first RS of the first RSs and a second RS of the second RSs based on measurements of the first RSs and the second RSs. The wireless device may receive downlink receptions. The wireless device may receive, from a base station, downlink receptions, for example, PDCCH (e.g., as shown at element 2530 of FIG. 25A). The PDCCH (e.g., PDCCH 2525) may comprise/carry one or more downlink control information (DCI). The one or more downlink control information, received by the wireless device (e.g., at time T2 as shown in FIG. 25A), may trigger the one or more first CSI-RSs and the one or more second CSI-RSs. The one or more first CSI-RSs and the one or more second CSI-RSs may be aperiodic CSI-RS s.

The wireless device may receive one or more first CSI-RSs (e.g., first CSI-RSs 2535) from the base station. The wireless device may receive the one or more first CSI-RSs, from the base station, via the first TRP (e.g., at time T3 as shown in FIG. 25A). The one or more first CSI-RSs may be associated with the first CORESET pool index. The wireless device may receive the one or more first CSI-RSs based on the first RS (e.g., as shown at element 2540 of FIG. 25A). The wireless device may receive one or more second CSI-RSs (e.g., second CSI-RSs 2545) from the base station. The wireless device may receive the one or more second CSI-RSs from the base station via the second TRP (e.g., at time T4 as shown in FIG. 25A). The one or more second CSI-RSs may be associated with the second CORESET pool index. The wireless device may receive the one or more second CSI-RSs based on the second RS (e.g., as shown at element 2550 of FIG. 25A). A time offset between an end of a last symbol of PDCCH(s) comprising the one or more DCIs and a beginning of a first symbol of the first CSI-RSs and/or the second CSI-RSs may be less than a time threshold. The time threshold may comprise the wireless device reported threshold beamSwitchTiming or beamSwitchTiming indicated by the configuration parameters. The wireless device may receive the one or more first CSI-RSs based on the first RS (e.g., as shown in FIG. 20A); and/or the one or more second CSI-RSs based on the second RS (e.g., as shown in FIG. 20A), for example, before receiving a MAC CE activating command (e.g., MAC CE 2555) of one or more TCI states, of the plurality of TCI states, for the one or more first CSI-RSs and the one or more second CSI-RSs. The wireless device may receive the one or more first CSI-RSs based on the first RS (e.g., as shown in FIG. 20A); and/or the one or more second CSI-RSs based on the second RS (e.g., as shown in FIG. 20A), for example, before receiving a MAC CE activating command of one or more TCI states, of the plurality of TCI states, for PDCCHs and/or PDSCHs of the multiple TRPs. The wireless device may receive the one or more first CSI-RSs with a same spatial domain transmission filter as used for a reception of the first RS (e.g., as illustrated in FIG. 20A). The wireless device may receive the one or more second CSI-RSs with a same spatial domain transmission filter as used for a reception of the second RS (e.g., as shown in FIG. 20A). The wireless device may use a same quasi colocation assumption, for the one or more first CSI-RSs, as a reception of the first RS (e.g., as shown in FIG. 20A). The wireless device may use a same quasi colocation assumption, for the one or more second CSI-RSs, as a reception of the second RS (e.g., as shown in FIG. 20A). The wireless device may receive the MAC CE from the base station (e.g., at time T5 as shown in FIG. 25A).

Figure 25B:
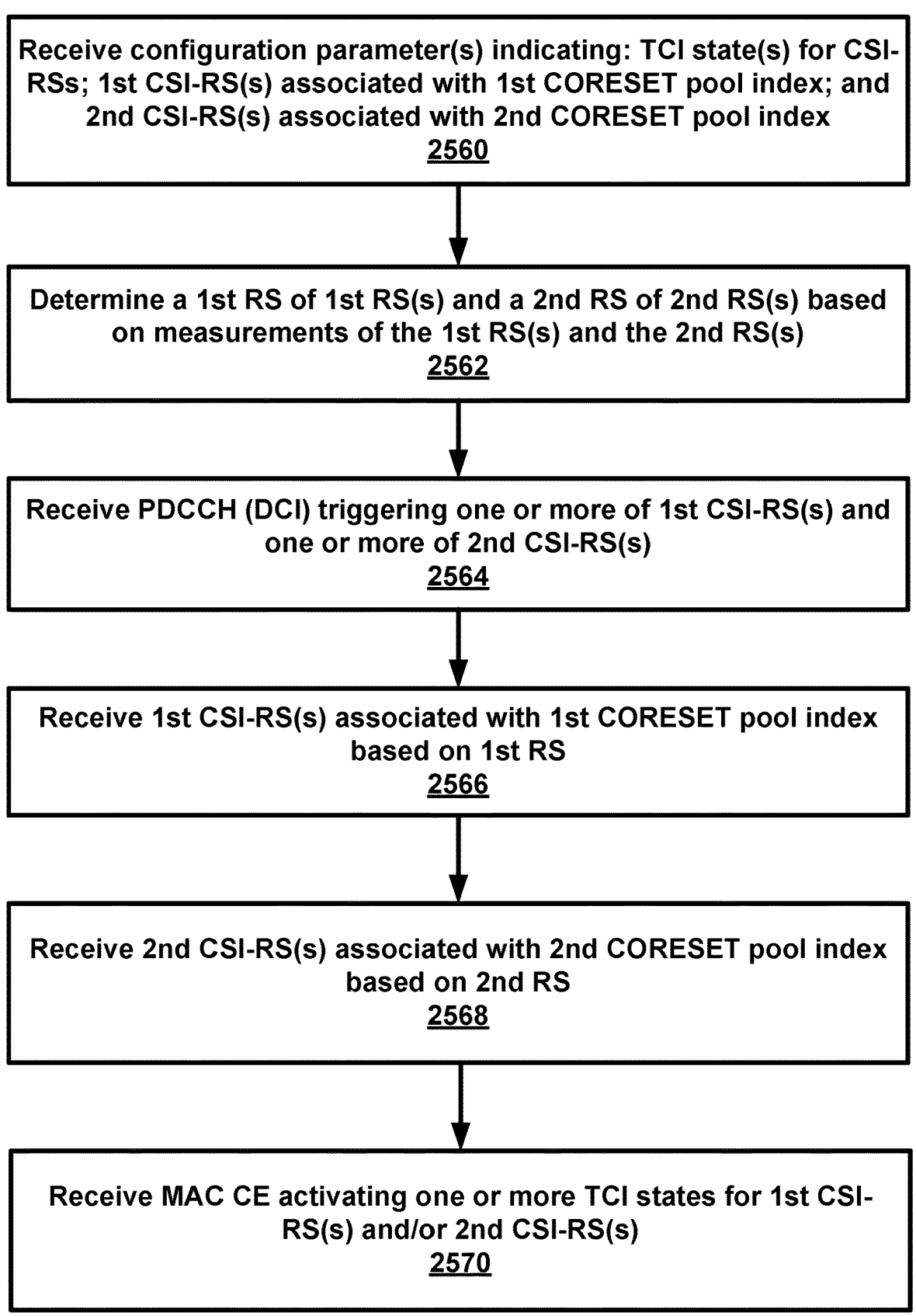

FIG. 25B and FIG. 25C show example methods of beam determination procedures. The beam determination procedures may be for CSI-RSs with multiple TRPs. A wireless device may receive one or more configuration parameters from a base station (e.g., at step 2560 as shown in FIG. 25B). A device (e.g., the base station, a relay, another wireless device, etc.) may send (e.g., transmit) the one or more configuration parameters (e.g., at step 2580 as shown in FIG.

25C). The configuration parameters may indicate a plurality of TCI states for CSI-RSs. The configuration parameters may indicate a plurality of TCI states for PDCCHs of the multiple TRPs and/or for PDSCHs of the multiple TRPs. The configuration parameters may indicate one or more first CSI-RSs associated with a first CORESET pool index. The configuration parameters may indicate one or more second CSI-RSs associated with a second CORESET pool index. The device (e.g., the base station) may send (e.g., transmit) to the wireless device the first RSs and the second RSs (or an indication of the first RSs and the second RSs) (e.g., at step 2582 as shown in FIG. 25C). The wireless device may receive the first RSs and the second RSs (or an indication of the first RSs and the second RSs). The wireless device may determine a first RS of the first RSs and a second RS of the second RSs based on measurements of the first RSs and the second RSs (e.g., at step 2562 as shown in FIG. 25B).

The wireless device may receive one or more PDCCH transmissions (e.g., at step 2564 as shown in FIG. 25B). The one or more PDCCH transmissions may comprise/carry one or more DCI. The one or more PDCCH transmissions may be used to trigger the one or more first CSI-RSs and the one or more second CSI-RSs. The device (e.g., base station) may send (e.g., transmit), to the wireless device, the one or more PDCCHs (e.g., at step 2584 as shown in FIG. 25C). The device (e.g., base station) may send (e.g., transmit), to the wireless device, one or more first CSI-RSs (e.g., at step 2586 of FIG. 25C), for example, one or more first CSI-RSs associated with the first CORESET pool index. The device (e.g., base station) may send (e.g., transmit), to the wireless device, one or more first CSI-RSs via the first TRP. The wireless device may receive, from the base station, the one or more first CSI-RSs. The wireless device may receive the one or more first CSI-RSs, from the base station, via the first TRP. The one or more first CSI-RSs may be associated with the first CORESET pool index. The wireless device may receive the one or more first CSI-RSs based on the first RS (e.g., at step 2566 of FIG. 25B). The device (e.g., base station) may send (e.g., transmit), to the wireless device, one or more second CSI-RSs (e.g., at step 2588 of FIG. 25C), for example, one or more second CSI-RSs associated with the second CORESET pool index. The device (e.g., base station) may send (e.g., transmit), to the wireless device, one or more second CSI-RSs via the second TRP. The wireless device may receive, from the base station, the one or more second CSI-RSs. The wireless device may receive the one or more second CSI-RSs, from the base station, via the second TRP. The one or more second CSI-RSs may be associated with the second CORESET pool index. The wireless device may receive the one or more second CSI-RSs based on the second RS (e.g., at step 2568 of FIG. 25B). The device (e.g., base station) may send (e.g., transmit) the MAC CE command to activate the one or more TCI states, of the plurality of TCI states, for the one or more first CSI-RSs and/or the one or more second CSI-RSs (e.g., at step 2590 as shown in FIG. 25C). The wireless device may receive, from the base station, the MAC CE command to activate the one or more TCI states, of the plurality of TCI states, for the one or more first CSI-RSs and/or the one or more second CSI-RSs (e.g., at step 2570 as shown in FIG. 25B).

Figure 26A:
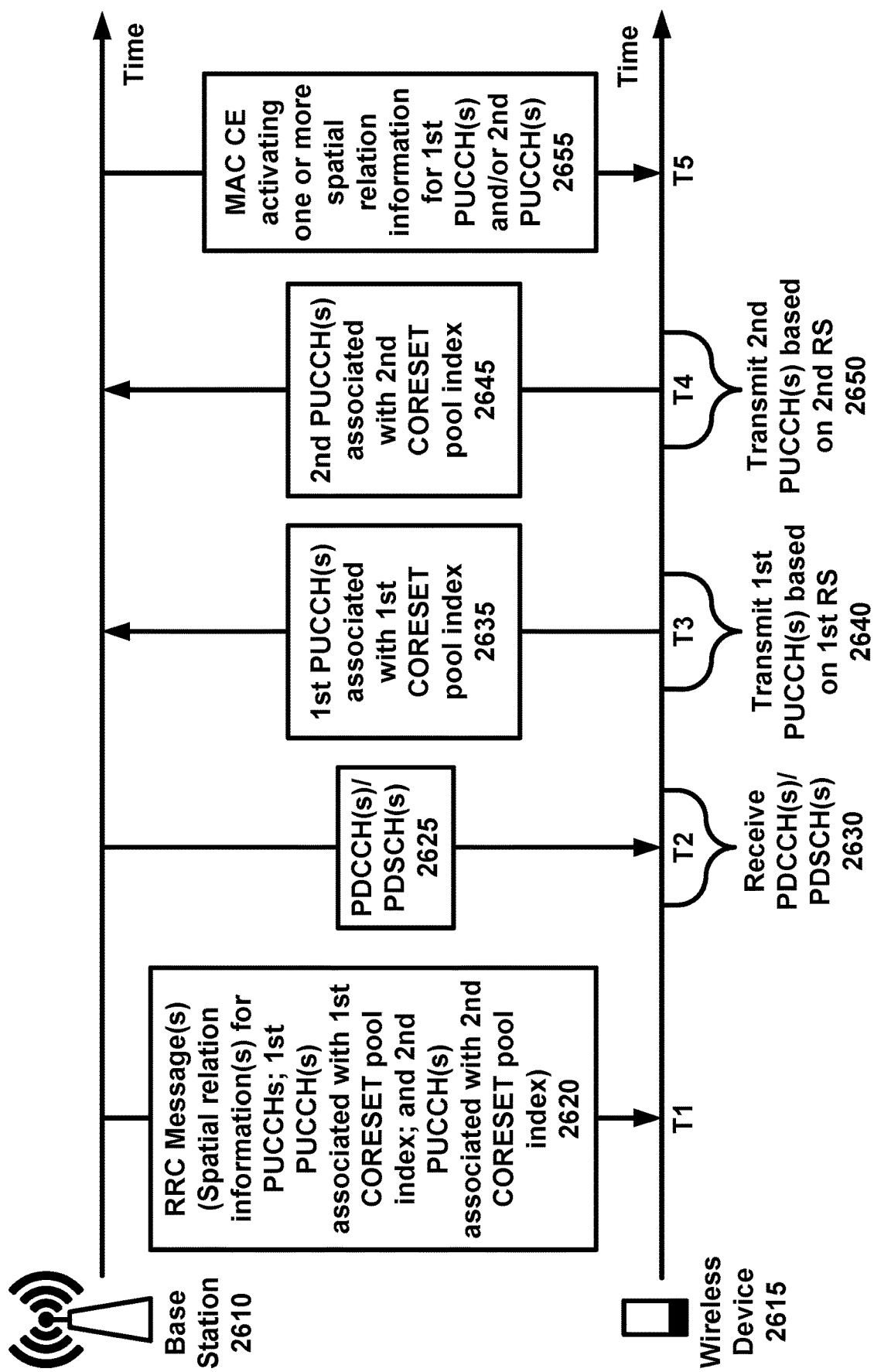
FIG. 26A shows an example of beam determination procedures with multiple nodes.

FIG. 26A shows an example of beam determination procedures. The beam determination procedures may be for PUCCHs with multiple TRPs. A wireless device (e.g., wireless device 2615) may receive, from a base station (e.g., base station 2610), one or more RRC messages (e.g., RRC messages 2620) comprising configuration parameters (e.g., at time T1 as shown in FIG. 26A). The configuration parameters may indicate a plurality of spatial relation information for PUCCH resources. The configuration parameters may indicate a plurality of TCI states for PUCCH resources. The configuration parameters may indicate one or more first PUCCH resources associated with a first CORESET pool index. The configuration parameters may indicate one or more second PUCCH resources associated with a second CORESET pool index. The association between the one or more first PUCCH resources and the first CORESET pool index may indicate that the one or more first PUCCH resources are configured with the same first CORESET pool index. The association between the one or more second PUCCH resources and the second CORESET pool index may indicate that the one or more second PUCCH resources are configured with the same second CORESET pool index. The first CORESET pool index may correspond to a first TRP. The second CORESET pool index may correspond to a second TRP. The configuration parameters may indicate the first RSs and the second RSs. The base station may send (e.g., transmit) to the wireless device the first RSs and the second RSs (or an indication of the first RSs and the second RSs). The wireless device may receive the first RSs and the second RSs (or an indication of the first RSs and the second RSs). The wireless device may determine a first RS of the first RSs and a second RS of the second RSs based on measurements of the first RSs and the second RSs. The wireless device may determine the first RS and the second RS based on (e.g., after) receiving the configuration parameters (e.g., as shown in FIG. 20A). The wireless device may determine the first RS and the second RS before sending (e.g., transmitting) PUCCH resources (e.g., before time T3 as shown in FIG. 26A). The wireless device may receive downlink receptions. The wireless device may receive one or more PDCCH transmissions and/or one or more PDSCH transmissions (e.g., as shown at element 2625 of FIG. 26A). The wireless device may receive one or more PDCCH transmissions and/or one or more PDSCH transmissions, from the base station, via one or more of the multiple TRPs (e.g., at time T2 and as shown at element 2630 of FIG. 26A). The wireless device may receive the one or more PDCCHs, from the base station, for example, as described herein concerning FIGS. 23A-23C. The wireless device may receive the one or more PDSCH transmissions, from the base station, for example, as described herein concerning FIGS. 24A-24C.

The wireless device may send (e.g., transmit) the one or more first PUCCH resources (e.g., PUCCH resources 2635) to the base station via the first TRP (e.g., at time T3). The wireless device may send (e.g., transmit) the one or more first PUCCH resources based on the first RS (e.g., as shown at element 2640 of FIG. 26A). The one or more first PUCCH resources may be associated with the first CORESET pool index. The wireless device may send (e.g., transmit) the one or more second PUCCH resources (e.g., PUCCH resources 2645) to the base station via the second TRP (e.g., at time T4). The wireless device may send (e.g., transmit) the one or more second PUCCH resources based on the second RS (e.g., as shown at element 2650 of FIG. 26A). The one or more second PUCCH resources may be associated with the second CORESET pool index. The wireless device may send (e.g., transmit) the one or more first PUCCH resources based on the first RS (e.g., as shown in FIG. 20A); and/or the one or more second PUCCH resources based on the second RS (e.g., as shown in FIG. 20A), for example, before receiving a MAC CE activating command (e.g., MAC CE 2655) of one or more spatial relation information (or of one or more TCI states), of the plurality of spatial relation information (or of the plurality of TCI states), for the one or more first PUCCH resources and the one or more second PUCCH resources. The wireless device may send (e.g., transmit) the one or more first PUCCH resources based on the first RS (e.g., as shown in FIG. 20A); and/or the one or more second PUCCH resources based on the second RS (e.g., as shown in FIG. 20A), for example, before receiving a MAC CE activating command of one or more TCI states, of the plurality of TCI states, for the one or more first PUCCH resources and the one or more second PUCCH resources. The wireless device may send (e.g., transmit) the one or more first PUCCH resources with a same spatial domain transmission filter as used for a reception of the first RS (e.g., as shown in FIG. 20A). The wireless device may send (e.g., transmit) the one or more second PUCCH resources with a same spatial domain transmission filter as used for a reception of the second RS (e.g., as illustrated in FIG. 20A). The wireless device may assume that DMRS antenna port(s) associated with the one or more first PUCCH resources transmission are spatial information related with the first RS (e.g., as shown in FIG. 20A). The wireless device may assume that DMRS antenna port(s) associated with the one or more second PUCCH resources transmission are spatial information related with the second RS (e.g., as shown in FIG. 20A). The wireless device may receive the MAC CE from the base station (e.g., at time T5 as shown in FIG. 26A). The association between the one or more first PUCCH resources and the first CORESET pool index may indicate that the wireless device may send (e.g., transmit) the one or more first PUCCH resources to the base station via the first TRP. The association between the one or more second PUCCH resources and the second CORESET pool index may indicate that the wireless device may send (e.g., transmit) the one or more second PUCCH resources to the base station via the second TRP.

Figure 26B:
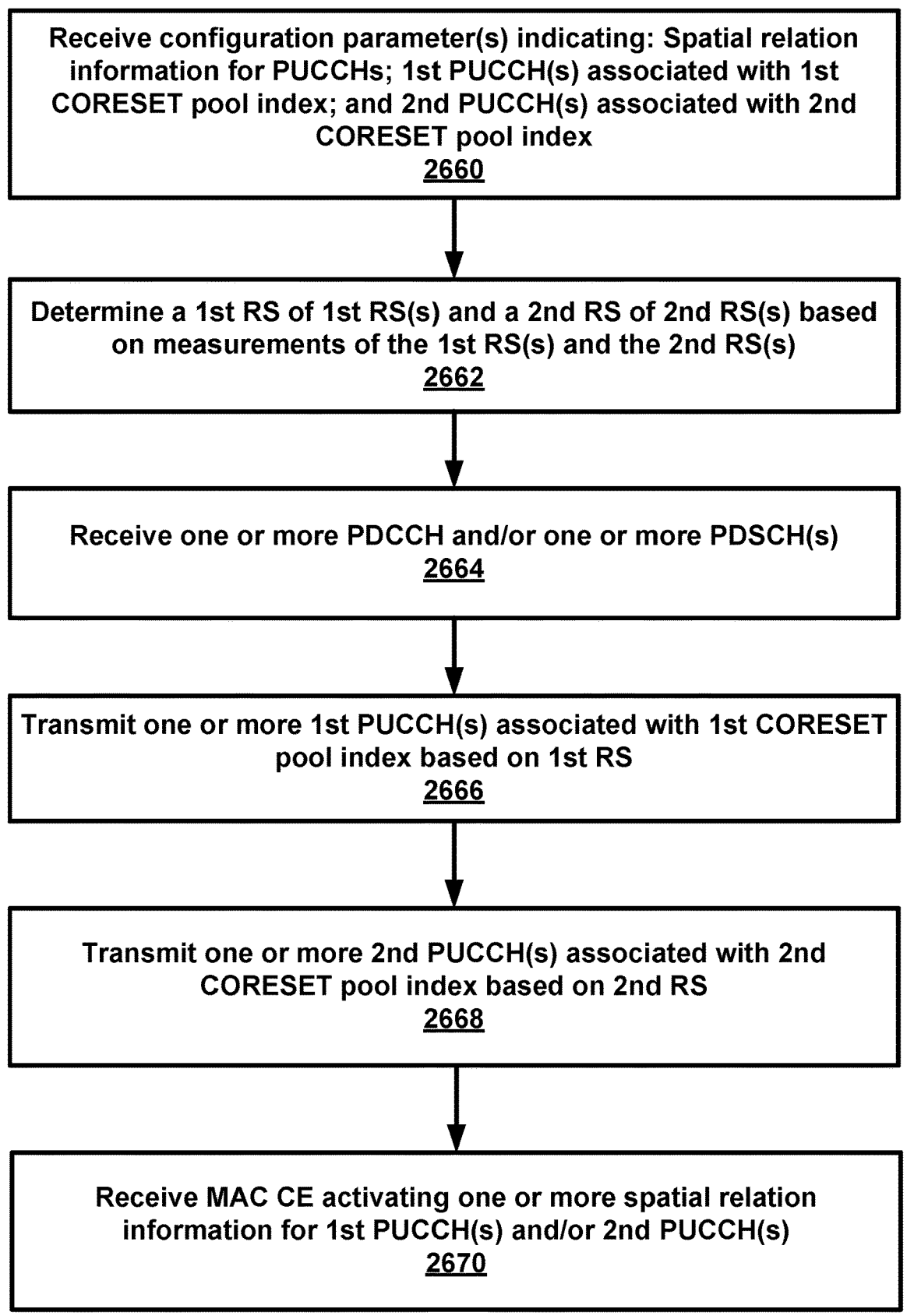
FIG. 26B and FIG. 26C show example methods of beam determination procedures with multiple nodes.
Figure 26C:
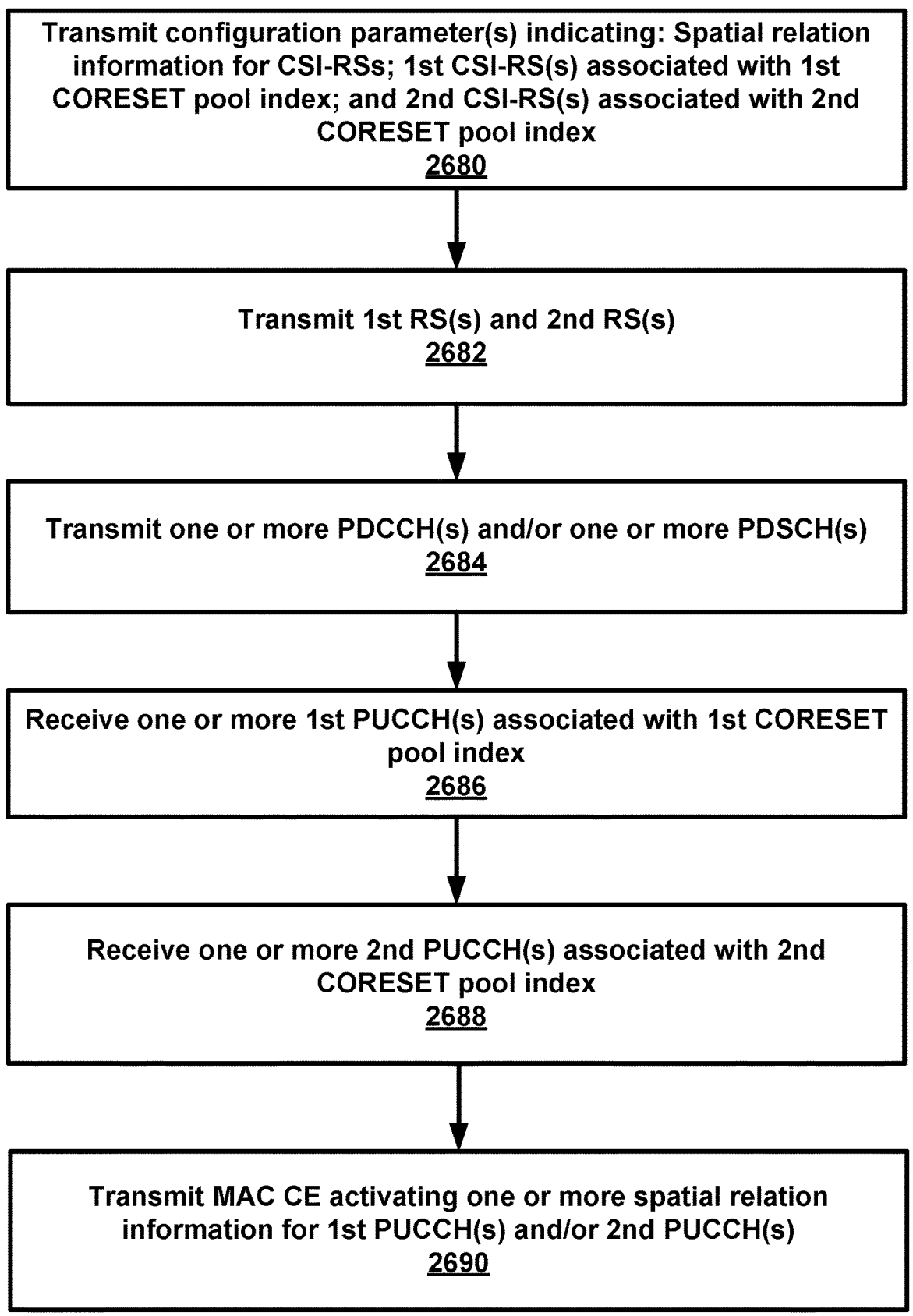

FIG. 26B and FIG. 26C show example methods of beam determination procedures. The beam determination procedures may be for PUCCHs with multiple TRPs. A wireless device may receive one or more configuration parameters from a base station (e.g., at step 2660 as shown in FIG. 26B). A device (e.g., the base station, a relay, another wireless device, etc.) may send (e.g., transmit) the one or more configuration parameters (e.g., at step 2680 as shown in FIG. 26C). The configuration parameters may indicate a plurality of spatial relation information for PUCCH resources. The configuration parameters may indicate a plurality of TCI states for PUCCH resources. The configuration parameters may indicate one or more first PUCCH resources associated with a first CORESET pool index. The configuration parameters may indicate one or more second PUCCH resources associated with a second CORESET pool index. The device (e.g., the base station) may send (e.g., transmit) to the wireless device the first RSs and the second RSs (or an indication of the first RSs and the second RSs) (e.g., at step 2682 as shown in FIG. 26C). The wireless device may receive the first RSs and the second RSs (or an indication of the first RSs and the second RSs). The wireless device may determine a first RS of the first RSs and a second RS of the second RSs based on measurements of the first RSs and the second RSs (e.g., at step 2662 as shown in FIG. 26B).

The wireless device may receive one or more PDCCH transmissions and/or one or more PDSCH transmissions (e.g., at step 2664 as shown in FIG. 26B). The one or more PDCCH transmissions may comprise/carry one or more DCI. The wireless device may send (e.g., transmit), to the base station, one or more first PUCCH resources. The wireless device may send (e.g., transmit) the one or more first PUCCH resources, to the base station, based on the first RS (e.g., at step 2666 as shown in FIG. 26B). The one or more first PUCCH resources may be associated with the first CORESET pool index. The device (e.g., base station) may receive, from the wireless device, one or more first PUCCH resources (e.g., at step 2686 as shown in FIG. 26C). The device (e.g., base station) may receive the one or more first PUCCH resources associated with the first CORESET pool index. The wireless device may send (e.g., transmit), to the base station, one or more second PUCCH resources. The wireless device may send (e.g., transmit) the one or more second PUCCH resources, to the base station, based on the second RS (e.g., at step 2668 as shown in FIG. 26B). The one or more second PUCCH resources may be associated with the second CORESET pool index. The device (e.g., base station) may receive, from the wireless device, one or more second PUCCH resources (e.g., at step 2688 as shown in FIG. 26C). The device (e.g., base station) may receive the one or more second PUCCH resources associated with the second CORESET pool index.

The device (e.g., base station) may send (e.g., transmit) the MAC CE command to activate the one or more spatial relation information, of the plurality of spatial relation information for the one or more first PUCCH resources and/or the one or more second PUCCH resources (e.g., at step 2690 of FIG. 26C). The device (e.g., base station) may send (e.g., transmit) the MAC CE command to activate the one or more TCI states, of the plurality of TCI states, for the one or more first PUCCH resources and/or the one or more second PUCCH resources. The wireless device may receive, from the base station, the MAC CE command to activate the one or more spatial relation information, of the plurality of spatial relation information for the one or more first PUCCH resources and/or the one or more second PUCCH resources (e.g., at step 2670 as shown in FIG. 26B). The wireless device may receive, from the base station, the MAC CE command to activate the one or more TCI states, of the plurality of TCI states, for the one or more first PUCCH resources and/or the one or more second PUCCH resources.

A wireless device may receive a DCI triggering an aperiodic CSI-RS(s) transmission. The wireless device may determine a downlink beam for reception of the aperiodic CSI-RS(s) based on a CORESET with a lowest identity. The wireless device may receive, for example, the aperiodic CSI-RS(s) with a same spatial domain transmission filter as used for reception of the CORESET with the lowest identity. The wireless device may determine the downlink beam for reception of the aperiodic CSI-RS(s) based on a TCI state with a lowest identify of TCI states for a PDSCH transmission (e.g., activated by a MAC CE). The wireless device may receive, for example, the aperiodic CSI-RS(s) with a same spatial domain transmission filter as used for reception of the PDSCH with the TCI state with the lowest identity. By implementing at least some technologies and beam determination procedures, the wireless device may not receive the aperiodic CSI-RS(s) (or periodic CSI-RS(s) or semi persistent CSI-RS(s)) from the second TRP (e.g., TRP1) based on the CORESET with the lowest identity of the first TRP (e.g., TRP0). By implementing at least some technologies and beam management procedures, the wireless device may not receive the aperiodic CSI-RS(s) (or periodic CSI-RS(s) or semi persistent CSI-RS(s)) from the second TRP (e.g., TRP1) based the TCI state with the lowest identity for PDSCH of first TRP (e.g., TRP0). This potential failure to receive one or more messages may significantly reduce the performance and reliability of the multiple TRPs system. Beam management procedure(s) may be enhanced, for example, by improving multiple TRPs system to increase the performance and reliability of reception of the aperiodic CSI-RS(s) (or periodic CSI-RS(s) or semi persistent CSI-RS(s)) of communication systems with multiple TRPs.

Figure 27:
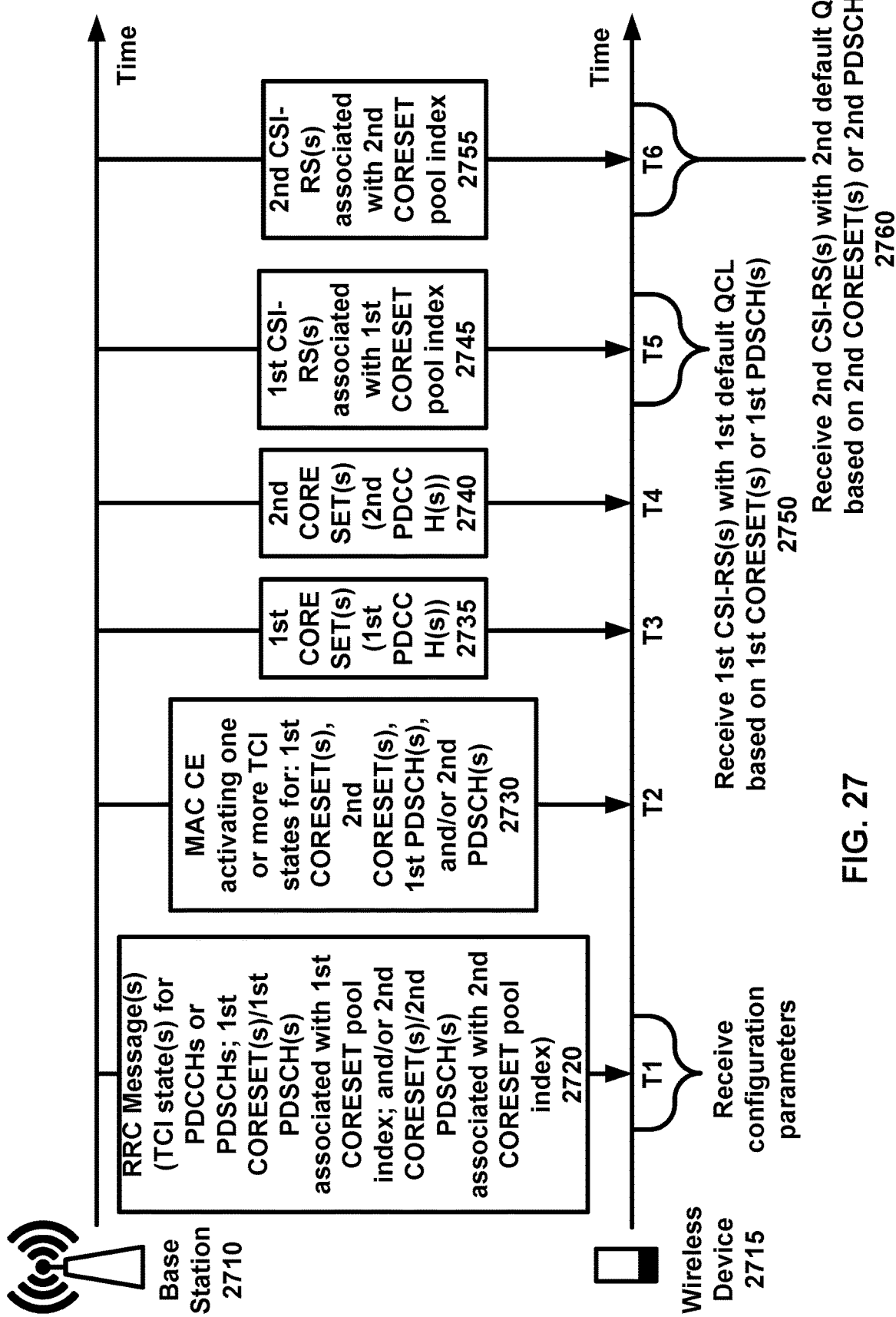
FIG. 27 shows an example of beam determination procedures with multiple nodes.

FIG. 27 shows an example of beam determination procedures. The beam determination procedures may be for CSI-RSs with multiple TRPs. A wireless device (e.g., wireless device 2715) may receive, from a base station (e.g., wireless device 2710), one or more RRC messages (e.g., RRC messages 2720) comprising configuration parameters (e.g., at time T1 as shown in FIG. 27). The base station may send (e.g., transmit), to the wireless device, one or more RRC messages comprising configuration parameters. The configuration parameters may indicate a plurality of TCI states for PDCCHs and/or PDSCHs. The configuration parameters may indicate one or more first PDCCHs (or one or more first CORESETs) associated with a first CORESET pool index. The configuration parameters may indicate one or more first PDSCHs associated with the first CORESET pool index. The configuration parameters may indicate one or more second PDCCHs (or one or more second CORESETs) associated with a second CORESET pool index. The configuration parameters may indicate one or more second PDSCHs associated with the second CORESET pool index. The association between the one or more first PDCCHs (or the one or more first CORESETs) and the first CORESET pool index may indicate that the one or more first PDCCHs (or the one or more first CORESETs) are configured with the same first CORESET pool index. The association between the one or more first PDSCHs and the first CORESET pool index may indicate that the one or more first PDSCHs are configured with the same first CORESET pool index. The association between the one or more second PDCCHs (or the one or more second CORESETs) and the second CORESET pool index may indicate that the one or more second PDCCHs (or the one or more second CORESETs) are configured with the same second CORESET pool index. The association between the one or more second PDSCHs and the second CORESET pool index may indicate that the one or more second PDSCHs are configured with the same second CORESET pool index. The first CORESET pool index may correspond to a first TRP. The second CORESET pool index may correspond to a second TRP. The wireless device may receive a MAC CE (e.g., MAC CE 2730) activating one or more TCI states, of the plurality of TCI states, for one or more of: the one or more first PDCCH transmissions (or the one or more first CORESETs), the one or more second PDCCH transmissions (or the one or more second CORESETs), the one or more first PDSCH transmissions, or the one or more second PDSCH transmissions (e.g., at time T2 as shown in FIG. 27). The wireless device may receive the one or more first PDCCH transmissions (or the one or more first CORESETs), from the base station, via the first TRP (e.g., at time T3 as shown in FIG. 27). The wireless device may receive the one or more second PDCCH transmissions (or the one or more second CORESETs) from the base station via the second TRP (e.g., at time T4 as shown in FIG. 27). The base station may send (e.g., transmit) the one or more first PDCCH transmissions (or the one or more first CORESETs), to the wireless device, via the first TRP. The base station may send (e.g., transmit) the one or more second PDCCH transmissions (or the one or more second CORESETs), to the wireless device, via the second TRP.

The one or more first PDCCH transmissions (or the one or more first CORESETs) may trigger one or more first CSI-RSs. The one or more first CSI-RSs may be associated with the first CORESET pool index. The one or more second PDCCH transmissions (or the one or more second CORESETs) may trigger one or more second CSI-RSs. The one or more second CSI-RSs may be associated with the second CORESET pool index. The one or more first CSI-RSs and the one or more second CSI-RSs may, for example, be aperiodic CSI-RSs. The wireless device may receive the one or more first CSI-RSs (e.g., CSI-RSs 2745) from the base station via the first TRP (e.g., at time T5 as shown in FIG. 27). The base station may send (e.g., transmit) the one or more first CSI-RSs (e.g., CSI-RSs 2745), to the wireless device, via the first TRP. The wireless device may receive the one or more second CSI-RSs from the base station via the second TRP (e.g., at time T6 as shown in FIG. 27). The base station may send (e.g., transmit) the one or more second CSI-RSs (e.g., CSI-RSs 2755), to the wireless device, via the second TRP. A time offset between an end of a last symbol of the one or more first PDCCHs (and/or the one or more second PDCCHs) and a beginning of a first symbol of the one or more first CSI-RSs (and/or the one or more second CSI-RSs) may be less than a time threshold (e.g., the wireless device reported threshold beamSwitchTiming or beamSwitchTiming indicated by the configuration parameters). The wireless device may receive the one or more first CSI-RSs with a first default quasi collocation (QCL). The wireless device may receive the one or more first CSI-RSs with a first default QCL based on the one or more first CORESETs (or the one or more first PDSCHs) (e.g., as shown at element 2750 of FIG. 27). The wireless device may receive the one or more first CSI-RSs with a first default QCL based on the one or more first CORESETs (or the one or more first PDSCHs). The wireless device may receive the one or more first CSI-RSs, for example, based on (e.g., after or in response to) the time offset being less than the time threshold. The wireless device may receive the one or more first CSI-RSs based on a CORESET with a lowest identity of the one or more first CORESETs. The wireless device may receive the one or more first CSI-RSs, for example, based on (e.g., after or in response to) the time offset being less than the time threshold. The wireless device may receive the one or more first CSI-RSs, for example, based on a TCI state with a lowest identity of the one or more TCI states, activated by the MAC CE, for the one or more first PDSCHs. The wireless device may receive the one or more first CSI-RSs based on a TCI state with a lowest identity of the one or more TCI states. The wireless device may receive the one or more first CSI-RSs, for example, after or in response to the time offset being less than the time threshold. The wireless device may receive the one or more second CSI-RSs with a second default quasi collocation (QCL) based on the one or more second CORESETs (or based on the one or more second PDSCHs) (e.g., as shown at element 2760 of FIG. 27). The wireless device may receive the one or more second CSI-RSs with a second default quasi collocation (QCL) based on the one or more second CORESETs (or based on the one or more second PDSCHs). The wireless device may receive the one or more second CSI-RSs with a second default quasi collocation (QCL), for example, based on (e.g., after or in response to) the time offset being less than the time threshold. The wireless device may receive the one or more second CSI-RSs based on a CORESET with a lowest identity of the one or more second CORESETs. The wireless device may receive the one or more second CSI-RSs, for example, based on (e.g., after or in response to) the time offset being less than the time threshold. The wireless device may receive the one or more second CSI-RSs based on a TCI state with a lowest identity of the one or more TCI states, activated by the MAC CE, for the one or more second PDSCHs, for example, based on (e.g., after or in response to) the time offset being less than the time threshold.

A wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may receive a random access response, for example, based on (e.g., after or in response to) the sending (e.g., transmitting) the preamble. The wireless device may send (e.g., transmit), based on the random access response, a transport block of the random access procedure. The transport block may indicate the second RS and/or the second CORESET pool index.

The receiving the configuration parameters may comprise receiving one or more RRC messages comprising the configuration parameters in one or more states of: an RRC idle state; an RRC connected state; or an RRC inactive state. The wireless device may receive the one or more RRC messages comprising one or more system information blocks comprising the configuration parameters. The first CORESET pool index may correspond to a first TRP. The second CORESET pool index may correspond to a second TRP. The first RSs may comprise one or more first synchronization signal and physical broadcast channel (SS/PBCH) blocks. The first RSs may comprise one or more first CSI-RSs. The second RSs may comprise one or more second SS/PBCH blocks. The second RSs may comprise one or more second CSI-RSs. The measurements may comprise one or more measurements of reference signal received power (RSRP) values. The measurements may comprise one or more measurements of reference signal received quality (RSRQ) values (or of SINR values).

The determining the first RS of the first RSs and the second RS of the second RSs based on the measurements may comprise determining the first RS and the second RS, for example, based on (e.g., after or in response to) the RSRP value of the first RS and the second RS being equal to or greater than a threshold value. The determining the first RS of the first RSs and the second RS of the second RSs based on the measurements may comprise determining the first RS and the second RS, for example, based on (e.g., after or in response to) the SINR value of the first RS and the second RS being equal to or greater than a threshold value. The configuration parameters may indicate the threshold value. The configuration parameters may indicate an association relationship between a random access occasion and an RS of the first RSs and the second RSs. The configuration parameters may indicate an association relationship between a preamble and the RS via the random access occasion. The wireless device may determine the preamble associated with the first RS based on the association relationship. The random access response may comprise an uplink grant. The uplink grant may be used to schedule one or more uplink resources for the transport block. The sending (e.g., transmitting), based on the random access response, the transport block may comprise sending (e.g., transmitting) the transport block based on the uplink grant. The transport block may indicate an identity of the wireless device. The identity may comprise one of: a cell radio network temporary identifier (C-RNTI); or a wireless device contention resolution identity. The transport block may indicate one or more of: an index of the second RS; an RSRP value of the second RS; an RSRQ value of the second RS; or the second CORESET pool index. The wireless device may receive a second transport block, of the random access procedure via a physical downlink shared channel, for contention resolution, based on (e.g., for example, after or in response to) sending (e.g., transmitting) the transport block.

The receiving the second transport block for contention resolution may comprise receiving the second transport block based on one or more of: the first RS; the second RS; or the first RS and the second RS. The configuration parameters may indicate one or more of: a plurality of TCI states; a plurality of spatial relation information; one or more first CORESETs associated with the first CORESET pool index; one or more second CORESETs associated with the second CORESET pool index; one or more first PDSCHs associated with the first CORESET pool index; one or more second PDSCHs associated with the second CORESET pool index; one or more first CSI-RSs associated with the first CORESET pool index; one or more second CSI-RSs associated with the second CORESET pool index; one or more first PUCCH resources associated with the first CORESET pool index; or one or more second PUCCH resources associated with the second CORESET pool index. The wireless device may receive the one or more first CORESETs, associated with the first CORESET pool index, based on the first RS. The wireless device may receive the one or more second CORESETs, associated with the second CORESET pool index, based on the second RS. The wireless device may receive the one or more first PDSCHs, associated with the first CORESET pool index, based on the first RS. The wireless device may receive the one or more second PDSCHs, associated with the second CORESET pool index, based on the second RS. The wireless device may receive the one or more first CSI-RSs, associated with the first CORESET pool index, based on the first RS. The wireless device may receive the one or more second CSI-RSs, associated with the second CORESET pool index, based on the second RS. The wireless device may send (e.g., transmit) the one or more first PUCCH resources, associated with the first CORESET pool index, based on the first RS. The wireless device may send (e.g., transmit) the one or more second PUCCH resources, associated with the second CORESET pool index, based on the second RS.

The base station may send (e.g., transmit) the one or more first CORESETs associated with the first CORESET pool index. The base station may send (e.g., transmit) the one or more second CORESETs associated with the second CORESET pool index. The base station may send (e.g., transmit) the one or more first PDSCHs associated with the first CORESET pool index. The base station may send (e.g., transmit) the one or more second PDSCHs associated with the second CORESET pool index. The base station may send (e.g., transmit) the one or more first CSI-RSs associated with the first CORESET pool index. The base station may send (e.g., transmit) the one or more second CSI-RSs associated with the second CORESET pool index. The base station may receive the one or more first PUCCH resources associated with the first CORESET pool index. The base station may receive the one or more second PUCCH resources associated with the second CORESET pool index.

A wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block may indicate the second RS and/or the second CORESET pool index. The wireless device may receive a random access response, of the random access procedure, for example, based on (e.g., after or in response to) the sending (e.g., transmitting) the preamble and/or the transport block.

A wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS and the second RS, of a random access procedure. The preamble may indicate one or more of: the first RS, the second RS, the first CORESET pool index, or the second CORESET pool index. The wireless device may receive a random access response, of the random access procedure, for example, based on (e.g., after or in response to) the sending (e.g., transmitting) the preamble.

A wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block indicates the second RS and/or the second CORESET pool index. The preamble may indicate one or more of: the first RS, the second RS, the first CORESET pool index, or the second CORESET pool index. The wireless device may receive the one or more first CORESETs based on the first RS; and/or the one or more second CORESETs based on the second RS. The wireless device may receive the one or more first CORESETs and/or the one or more second CORESETs for example, based on (e.g., after or in response to) one or more TCI states not being configured, by radio resources messages, for: one or more first CORESETs associated with the first CORESET pool index; and one or more second CORESETs associated with the second CORESET pool index. The wireless device may receive the one or more first CORESETs based on the first RS; and/or the one or more second CORESETs based on the second RS. The wireless device may receive the one or more first CORESETs and/or the one or more second CORESETs, for example, based on (e.g., after or in response to): the configuration parameters indicating one or more TCI states for the one or more first CORESETs associated with the first CORESET pool index and the one or more second CORESETs associated with the second CORESET pool index. The wireless device may receive the one or more first CORESETs based on the first RS; and/or the one or more second CORESETs based on the second RS, for example, before receiving a MAC CE activating one or more TCI states for the one or more first CORESETs and the one or more second CORESETs.

A wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block indicates the second RS and/or the second CORESET pool index. The preamble may indicate one or more of: the first RS, the second RS, the first CORESET pool index, or the second CORESET pool index. The wireless device may receive the one or more first PDSCH transmissions based on the first RS; and/or the one or more second PDSCH transmissions based on the second RS. The wireless device may receive the one or more first PDSCH transmissions and/or the one or more second PDSCH transmissions, for example, based on (e.g., after or in response to) the configuration parameters indicating one or more TCI states for: one or more first PDSCHs associated with the first CORESET pool index; and one or more second PDSCHs associated with the second CORESET pool index. Additionally or alternatively, the wireless device may receive the one or more first PDSCH transmissions based on the first RS; and/or the one or more second PDSCH transmissions based on the second RS, for example, before receiving a MAC CE activating one or more TCI states for: the one or more first PDSCHs; and the one or more second PDSCHs.

A wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block indicates the second RS and/or the second CORESET pool index. The preamble may indicate one or more of: the first RS, the second RS, the first CORESET pool index, or the second CORESET pool index. The wireless device may receive the one or more first CSI-RSs based on the first RS; and/or the one or more second CSI-RSs based on the second RS. The wireless device may receive the one or more first CSI-RSs and/or the one or more second CSI-RSs, for example, based on (e.g., after or in response to) the configuration parameters indicating one or more TCI states for: one or more first CSI-RSs associated with the first CORESET pool index; and one or more second CSI-RSs associated with the second CORESET pool index. The wireless device may receive: the one or more first CSI-RSs based on the first RS; and/or the one or more second CSI-RSs based on the second RS, for example, before receiving a MAC CE activating one or more TCI states for: the one or more first CSI-RSs (or first PDCCHs or first PDSCHs); and the one or more second CSI-RSs (or second PDCCHs or second PDSCHs). The wireless device may receive the one or more first CSI-RSs based on the first RS; and/or the one or more second CSI-RSs based on the second RS. The wireless device may receive the one or more first CSI-RSs and/or the one or more second CSI-RSs, for example, based on (e.g., after or in response to) the configuration parameters indicating one or more TCI states for: one or more first PDCCHs associated with the first CORESET pool index; and one or more second PDCCHs associated with the second CORESET pool index. The wireless device may receive: the one or more first CSI-RSs based on the first RS; and/or the one or more second CSI-RSs based on the second RS, for example, before receiving a MAC CE activating one or more TCI states for: the one or more first PDCCHs; and the one or more second PDCCHs. The wireless device may receive the one or more first CSI-RSs and/or the one or more second CSI-RSs, for example, based on (e.g., after or in response to) the configuration parameters indicating one or more TCI states for: one or more first PDSCHs associated with the first CORESET pool index; and one or more second PDSCHs associated with the second CORESET pool index. The wireless device may receive: the one or more first CSI-RSs based on the first RS; and/or the one or more second CSI-RSs based on the second RS, for example, before receiving a MAC CE activating one or more TCI states for: the one or more first PDSCHs; and the one or more second PDSCHs.

A wireless device may receive configuration parameters from a base station. The configuration parameters may indicate first RSs associated with a first CORESET pool index. The configuration parameters may indicate second RSs associated with a second CORESET pool index. The wireless device may determine a first RS of the first RSs and a second RS of the second RSs based on measurements of the first RSs and the second RSs. The wireless device may send (e.g., transmit) a preamble, associated with the first RS, of a random access procedure. The preamble may indicate the first RS and/or the first CORESET pool index. The wireless device may send (e.g., transmit) a transport block of the random access procedure. The transport block indicates the second RS and/or the second CORESET pool index. The preamble may indicate one or more of: the first RS, the second RS, the first CORESET pool index, or the second CORESET pool index. The wireless device may send (e.g., transmit) the one or more first PUCCH resources based on the first RS; and/or the one or more second PUCCH resources based on the second RS. The wireless device may send (e.g., transmit) the one or more first PUCCH resources and/or the one or more second PUCCH resources, for example, before receiving a MAC CE activating one or more spatial relation information (or one or more TCI states) for: one or more first PUCCH resources associated with the first CORESET pool index; and one or more second PUCCH resources associated with the second CORESET pool index. The wireless device may send (e.g., transmit) the one or more first PUCCH resources based on the first RS; and/or the one or more second PUCCH resources based on the second RS, for example, before receiving a MAC CE activating one or more TCI states for: one or more first PUCCH resources associated with the first CORESET pool index; and one or more second PUCCH resources associated with the second CORESET pool index.

A wireless device may receive configuration parameters from a base station. The configuration parameters may indicate TCI states for CORESETs. The configuration parameters may indicate one or more first CORESETs associated with a first CORESET pool index. The configuration parameters may indicate one or more second CORESETs associated with a second CORESET pool index. The base station may send (e.g., transmit) a MAC CE activating: one or more first TCI sates, of the TCI states, for the one or more first CORESETs; and/or one or more second TCI sates, of the TCI states, for the one or more second CORESETs. The base station may send (e.g., transmit) one or more downlink control information (DCI) triggering: one or more first channel state information reference signals (CSI-RSs) associated with the first CORESET pool index; and/or one or more second CSI-RSs associated with the second CORESET pool index. The wireless device may receive a MAC CE activating: one or more first TCI sates, of the TCI states, for the one or more first CORESETs; and/or one or more second TCI sates, of the TCI states, for the one or more second CORESETs. The wireless device may receive one or more downlink control information (DCI) triggering: one or more first channel state information reference signals (CSI-RSs) associated with the first CORESET pool index; and/or one or more second CSI-RSs associated with the second CORESET pool index. The wireless device may receive the one or more first CSI-RSs based on a CORESET with a lowest identity of the one or more first CORESETs; and/or the one or more second CSI-RSs based on a CORESET with a lowest identity of the one or more second CORESETs. The wireless device may receive the one or more first CSI-RSs and/or the one or more second CSI-RSs for example, based on (e.g., after or in response to) an offset value being equal to or less than a time threshold. The offset value may be between an end of a last symbol of a physical downlink control channel comprising the one or more DCI and a beginning of a first symbol of the one or more first CSI-RSs and/or the one or more second CSI-RSs.

A wireless device may receive configuration parameters from a base station. The configuration parameters may indicate TCI states for PDSCHs. The configuration parameters may indicate one or more first PDSCHs associated with a first CORESET pool index. The configuration parameters may indicate one or more second PDSCHs associated with a second CORESET pool index. The base station may send (e.g., transmit) a MAC CE activating: one or more first TCI sates, of the TCI states, for the one or more first PDSCHs; and/or one or more second TCI sates, of the TCI states, for the one or more second PDSCHs. The base station may send (e.g., transmit) one or more downlink control information (DCI) triggering: one or more first channel state information reference signals (CSI-RSs) associated with the first CORESET pool index; and/or one or more second CSI-RSs associated with the second CORESET pool index. The wireless device may receive a MAC CE activating: one or more first TCI sates, of the TCI states, for the one or more first PDSCHs; and/or one or more second TCI sates, of the TCI states, for the one or more second PDSCHs. The wireless device may receive one or more DCI triggering: one or more first CSI-RSs associated with the first CORESET pool index; and/or one or more second CSI-RSs associated with the second CORESET pool index. The wireless device may receive the one or more first CSI-RSs based on a TCI state with a lowest identity of the one or more first TCI states; and/or the one or more second CSI-RSs based on a TCI state with a lowest identity of the one or more second TCI states. The wireless device may receive the one or more first CSI-RSs and/or the one or more second CSI-RSs, for example, based on (e.g., after or in response to) an offset value being equal to or less than a time threshold. The offset value may be between an end of a last symbol of a physical downlink control channel comprising the one or more DCI and a beginning of a first symbol of the one or more first CSI-RSs and/or the one or more second CSI-RSs.

A wireless device may perform a method comprising multiple operations. The wireless device may receive configuration parameters indicating a first CORESET pool index associated with: first reference signals (RSs); and first PUCCH resources. The wireless device may receive the configuration parameters from a base station. The first PUCCH resources may comprise one or more first scheduling request (SR) resources. The first CORESET pool index may correspond to a first TRP. The first RSs may comprise at least one of: one or more first synchronization signal blocks (SSBs) or one or more first channel sate information reference signals (CSI-RSs). The wireless device may also receive configuration parameters indicating a second CORESET pool index associated with: second RSs; and second PUCCH resources. The second PUCCH resources may comprise one or more second SR resources. The second CORESET pool index may correspond to a second TRP. The second RSs may comprise at least one of: one or more second synchronization signal blocks (SSBs) or one or more second channel sate information reference signals (CSI-RSs). The wireless device may determine a reference signal (RS), from the first RSs and the second RSs, based on at least one power measurement of the RS. The at least one power measurement may comprise at least one of: a measurement of reference signal received power (RSRP) values, or a measurement of reference signal received quality (RSRQ) values. The wireless device may determine the RS, from the first RSs and the second RSs, based on the at least one power measurement of the RS, by determining that an RSRP value or an RSRP value of the RS satisfies a threshold value. For example, the wireless device may determine that the RSRP value or the RSRP value of the RS is equal to or greater than the threshold value. The configuration parameters received by the wireless device may indicate the threshold value. The configuration parameters received by the wireless device may also indicate a first association between a random access occasion and the RS, and a second association between a preamble and the RS. The wireless device may transmit, based on the second association, the preamble associated with the RS. The wireless device may select the first PUCCH resources, from the first PUCCH resources and the second PUCCH resources, based on: the RS being from the first RSs, and the first CORESET pool index being associated with the first PUCCH resources. The wireless device may transmit, via a spatial domain filter determined associated with the RS, a PUCCH resource of the first PUCCH resources. The spatial domain filter determined based on the RS may be used by the wireless device for receiving the RS. The wireless device may determine, based on at least one power measurement of the first RSs and the second RSs, an RS of the first RSs and an RS of the second RSs. The wireless device may transmit a preamble, associated with the RS of the first RSs, associated with a random access procedure. The wireless device may receive configuration parameters by receiving one or more radio resource control (RRC) messages. The one or more RRC messages received by the wireless device may comprise the configuration parameters in one of: an RRC idle state, an RRC connected state, or an RRC inactive state. The wireless device may receive the one or more RRC messages by receiving one or more system information blocks comprising the configuration parameters. The wireless device may receive configuration parameters associated with beam failure detection procedure. The wireless device may receive configuration parameters associated with beam failure recovery procedure. The configuration parameters received by the wireless device may indicate one or more of: a plurality of TCI states; a plurality of spatial relation information; one or more first CORESETs associated with the first CORESET pool index; one or more second CORESETs associated with the second CORESET pool index; one or more first PDSCHs associated with the first CORESET pool index; one or more second PDSCHs associated with the second CORESET pool index; one or more first CSI-RSs associated with the first CORESET pool index; one or more second CSI-RSs associated with the second CORESET pool index; one or more first PUCCHs associated with the first CORESET pool index; or one or more second PUCCHs associated with the second CORESET pool index. The wireless device may receive, based on the first RS, the one or more first CORESETs associated with the first CORESET pool index. The wireless device may receive, based on the second RS, the one or more second CORESETs associated with the second CORESET pool index. The wireless device may receive, based on the first RS, the one or more first PDSCHs associated with the first CORESET pool index. The wireless device may receive, based on the second RS, the one or more second PDSCHs associated with the second CORESET pool index. The wireless device may receive, based on the first RS, the one or more first CSI-RSs associated with the first CORESET pool index. The wireless device may receive, based on the second RS, the one or more second CSI-RSs associated with the second CORESET pool index. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may perform a method comprising multiple operations. The wireless device may receive configuration parameters indicating first RSs associated with a first CORESET pool index. The first CORESET pool index may correspond to a first TRP. The first RSs may comprise at least one of: one or more first synchronization signal blocks (SSBs), or one or more first channel sate information reference signals (CSI-RSs). The wireless device may receive the configuration parameters from a base station. The wireless device may also receive configuration parameters indicating second RSs associated with a second CORESET pool index. The second CORESET pool index may correspond to a second transmission reception point (TRP). The second RSs may comprise at least one of: one or more second synchronization signal blocks (SSBs), or one or more second channel sate information reference signals (CSI-RSs). The wireless device may receive configuration parameters associated with beam failure detection procedure. The wireless device may receive configuration parameters associated with beam failure recovery procedure. The wireless device may determine a first RS of the first RSs and a second RS of the second RSs. The wireless device may determine the first RS of the first RSs and the second RS of the second RSs based on at least one measurement of the first RSs and the second RSs. The wireless device may transmit a preamble, associated with the first RS, associated with a random access procedure. The preamble may indicate the first RS and the first CORESET pool index. The wireless device may also transmit a transport block, associated with the random access procedure. The transport block transmitted by the wireless device may indicate the second RS and the second CORESET pool index. The wireless device may receive a random access response, associated with the random access procedure, after the transmitting the preamble and the transport block. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may perform a method comprising multiple operations. The wireless device may receive configuration parameters indicating a first CORESET pool index associated with: first reference signals (RSs); and first physical downlink shared channels (PDSCHs). The wireless device may also receive configuration parameters indicating a second CORESET pool index associated with: second RSs; and second PDSCHs. The wireless device may receive the configuration parameters from a base station. The configuration parameters received by the wireless device may also indicate at least one of: a plurality of TCI states; a plurality of spatial relation information; one or more first CORESETs associated with the first CORESET pool index; one or more second CORESETs associated with the second CORESET pool index; one or more first CSI-RSs associated with the first CORESET pool index; one or more second CSI-RSs associated with the second CORESET pool index; one or more first PUCCHs associated with the first CORESET pool index; or one or more second PUCCHs associated with the second CORESET pool index. The wireless device may determine an RS from the first RSs and the second RSs. The wireless device may determine an RS, from the first RSs and the second RSs, based on at least one power measurement of the first RSs and the second RSs. The wireless device may select the first PDSCHs from the first PDSCHs and the second PDSCHs. The wireless device may select the first PDSCHs, from the first PDSCHs and the second PDSCHs based on: the RS being from the first RSs, and the first CORESET pool index being associated with the first PDSCHs. The wireless device may receive a PDSCH of the first PDSCHs. The wireless device may receive a PDSCH of the first PDSCHs via a spatial domain filter determined associated with the RS. The wireless device may receive, based on the RS, the first CORESET associated with the first CORESET pool index. The wireless device may receive, based on the RS, the first CSI-RSs associated with the first CORESET pool index. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may perform a method comprising multiple operations. The wireless device may receive configuration parameters indicating first RSs associated with a first CORESET pool index. The wireless device may also receive configuration parameters indicating second RSs associated with a second CORESET pool index. The wireless device may receive the configuration parameters from a base station. The wireless device may determine a first RS of the first RSs and a second RS of the second RSs. The wireless device may determine a first RS of the first RSs and a second RS of the second RSs based on at least one measurement of the first RSs and the second RSs. The wireless device may receive a random access response based on (e.g., in response to) the preamble. The wireless device may also receive a random access response after transmitting a preamble, associated with the first RS, of a random access procedure. The wireless device may transmit, based on the random access response, a transport block, associated with the random access procedure. The transport block, associated with the random access procedure, may indicate the second RS and the second CORESET pool index. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may perform a method comprising multiple operations. The wireless device may receive configuration parameters indicating first RSs associated with a first CORESET pool index. The wireless device may also receive configuration parameters indicating second RSs associated with a second CORESET pool index. The wireless device may determine, based on at least one measurement of the first RSs and the second RSs, a first RS of the first RSs and a second RS of the second RSs. The wireless device may transmit a preamble, associated with the first RS and the second RS, associated with a random access procedure. The preamble transmitted by the wireless device may indicate the first CORESET pool index and the second CORESET pool index. The wireless device may receive a random access response based on (e.g., in response to) the preamble. The wireless device may also receive a random access response, associated with the random access procedure, after transmitting the preamble. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   receiving, by a wireless device, configuration parameters indicating:
      a first control resource set (CORESET) pool index associated with:
         first reference signals (RSs); and
         first physical uplink control channel (PUCCH) resources; and
      a second CORESET pool index associated with:
         second RSs; and
         second PUCCH resources;
   determining a reference signal (RS), from the first RSs and the second RSs, based on at least one power measurement of the RS;
   selecting the first PUCCH resources, from the first PUCCH resources and the second PUCCH resources, based on:
      the RS being from the first RSs; and
      the first CORESET pool index being associated with the first PUCCH resources; and
   transmitting, via a spatial domain filter associated with the RS, a PUCCH resource of the first PUCCH resources.

2. The method of claim 1, further comprising:
   determining, based on at least one power measurement of the first RSs and the second RSs, an RS of the first RSs and an RS of the second RSs; and
   transmitting a preamble, associated with the RS of the first RSs, associated with a random access procedure.

3. The method of claim 1, wherein the receiving the configuration parameters comprises the wireless device receiving one or more radio resource control (RRC) messages comprising the configuration parameters in one of:
   an RRC idle state;
   an RRC connected state; or
   an RRC inactive state.

4. The method of claim 3, wherein the receiving the one or more RRC messages comprises receiving one or more system information blocks comprising the configuration parameters.

5. The method of claim 1, wherein the at least one power measurement comprises at least one of:
   one or more measurements of reference signal received power (RSRP) values; or
   one or more measurements of reference signal received quality (RSRQ) values.

6. The method of claim 4, wherein the determining the RS, from the first RSs and the second RSs, based on the at least one power measurement comprises determining that an RSRP value or an RSRQ value of the RS satisfies a threshold value indicated by the configuration parameters.

7. The method of claim 1, wherein the configuration parameters further indicate:
   a first association between a random access occasion and the RS; and
   a second association between a preamble and the RS.

8. The method of claim 7, further comprising transmitting, based on the second association, the preamble associated with the RS.

9. The method of claim 1, further comprising:
   receiving, via the spatial domain filter, the RS.

10. A method comprising:
    receiving, by a wireless device, configuration parameters indicating:
       first reference signals (RSs) associated with a first control resource set (CORESET) pool index; and
       second RSs associated with a second CORESET pool index;
    determining, based on at least one measurement of the first RSs and the second RSs, a first reference signal (RS) of the first RSs and a second RS of the second RSs;
    transmitting:
       a preamble, associated with the first RS, associated with a random access procedure; and
       a transport block, associated with the random access procedure, indicating the second RS and the second CORESET pool index; and
    receiving a random access response, associated with the random access procedure, after the transmitting the preamble and the transport block.

11. The method of claim 10, wherein the preamble indicates the first RS and the first CORESET pool index.

12. The method of claim 10, wherein the receiving the configuration parameters comprises the wireless device receiving configuration parameters associated with beam failure detection or beam failure recovery.

13. The method of claim 10, wherein the first CORESET pool index corresponds to a first transmission reception point (TRP).

14. The method of claim 10, wherein the second CORESET pool index corresponds to a second transmission reception point (TRP).

15. The method of claim 10, wherein the first RSs comprise at least one of:
    one or more first synchronization signal blocks (SSBs); or
    one or more first channel sate information reference signals (CSI-RSs).

16. The method of claim 10, wherein the second RSs comprise at least one of:
    one or more second synchronization signal blocks (SSBs); or
    one or more second channel sate information reference signals (CSI-RSs).

17. A method comprising:
    receiving, by a wireless device, configuration parameters indicating:

a first control resource set (CORESET) pool index associated with:
   first reference signals (RSs); and
   first physical downlink shared channels (PDSCHs); and
a second CORESET pool index associated with:
   second RSs; and
   second PDSCHs;
determining a reference signal (RS), from the first RSs and the second RSs, based on at least one power measurement of the first RSs and the second RSs;
selecting the first PDSCHs, from the first PDSCHs and the second PDSCHs, based on:
   the RS being from the first RSs; and
   the first CORESET pool index being associated with the first PDSCHs; and
receiving, via a spatial domain filter associated with the RS, a PDSCH of the first PDSCHs.

18. The method of claim 17, wherein the configuration parameters further indicate at least one of:
   a plurality of transmission configuration indication (TCI) states;
   a plurality of spatial relation information;
   a first CORESET associated with the first CORESET pool index;
   a first channel state information reference signal (CSI-RS) associated with the first CORESET pool index; or
   a first physical uplink control channel (PUCCH) associated with the first CORESET pool index.

19. The method of claim 18, further comprising receiving: based on the RS, the first CORESET associated with the first CORESET pool index.

20. The method of claim 18, further comprising receiving: based on the RS, the first CSI-RS associated with the first CORESET pool index.

* * * * *